(12) United States Patent
Alluboyina et al.

(10) Patent No.: US 10,845,997 B2
(45) Date of Patent: Nov. 24, 2020

(54) JOB MANAGER FOR DEPLOYING A BUNDLED APPLICATION

(71) Applicant: Robin Systems, Inc., San Jose, CA (US)

(72) Inventors: Ravi Kumar Alluboyina, Santa Clara, CA (US); Tushar Doshi, Santa Clara, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 169 days.

(21) Appl. No.: 15/870,083

(22) Filed: Jan. 12, 2018

(65) Prior Publication Data

US 2019/0220205 A1    Jul. 18, 2019

(51) Int. Cl.
    *G06F 9/46*      (2006.01)
    *G06F 3/06*      (2006.01)
    *G06F 9/50*      (2006.01)

(52) U.S. Cl.
    CPC ............ *G06F 3/0619* (2013.01); *G06F 3/065* (2013.01); *G06F 3/067* (2013.01); *G06F 3/0665* (2013.01); *G06F 9/5033* (2013.01)

(58) Field of Classification Search
    None
    See application file for complete search history.

(56) References Cited

U.S. PATENT DOCUMENTS

| | | | |
|---|---|---|---|
| 4,310,883 A | 1/1982 | Clifton | |
| 5,602,993 A | 2/1997 | Stromberg | |
| 6,014,669 A | 1/2000 | Slaughter | |
| 6,052,797 A | 4/2000 | Ofek | |
| 6,119,214 A | 9/2000 | Dirks | |
| 6,157,963 A | 12/2000 | Courtright, II | |
| 6,161,191 A | 12/2000 | Slaughter | |
| 6,298,478 B1 | 10/2001 | Nally | |
| 6,301,707 B1 | 10/2001 | Carroll | |

(Continued)

FOREIGN PATENT DOCUMENTS

WO    WO2017008675    1/2017

OTHER PUBLICATIONS

Du et al. "Differential Snapshot Algorithms based on Hadoop MapReduce", 2015 IEEE, pp. 1203-1208.*

(Continued)

*Primary Examiner* — Van H Nguyen
(74) *Attorney, Agent, or Firm* — David R. Stevens; Stevens Law Group

(57) ABSTRACT

A new snapshot of a storage volume is created by instructing computing nodes to suppress write requests. A snapshot of the application may be created and used to rollback or clone the application. Clones snapshots of storage volumes may be gradually populated with data from prior snapshots to reduce loading on a primary snapshot. Changes to application state may be written to a remove storage volume that may be mounted to a new instance or clone of the application to recreate its state. Jobs to create and execute a bundled application may be referenced with a simulated file system that generates reads to hosts only when the job log file is actually read. A job manager creates jobs according to the manifests and executes phases of these jobs with respect to target nodes of the distributed computing system.

18 Claims, 30 Drawing Sheets

(56) References Cited

U.S. PATENT DOCUMENTS

| | | | |
|---|---|---|---|
| 6,311,193 B1 | 10/2001 | Sekido | |
| 6,851,034 B2 | 2/2005 | Challenger | |
| 6,886,160 B1 | 4/2005 | Lee | |
| 6,895,485 B1 | 5/2005 | Dekoning | |
| 6,957,221 B1 | 10/2005 | Hart | |
| 7,096,465 B1 | 8/2006 | Dardinski | |
| 7,111,055 B2 | 9/2006 | Falkner | |
| 7,171,659 B2 | 1/2007 | Becker | |
| 7,246,351 B2 | 7/2007 | Bloch | |
| 7,305,671 B2 | 12/2007 | Davidov | |
| 7,461,374 B1 | 12/2008 | Balint | |
| 7,590,620 B1 | 9/2009 | Pike | |
| 7,698,698 B2 | 4/2010 | Skan | |
| 7,721,283 B2 | 5/2010 | Kovachka | |
| 7,734,859 B2 | 6/2010 | Daniel | |
| 7,738,457 B2 | 6/2010 | Nordmark | |
| 7,779,091 B2 | 8/2010 | Wilkinson | |
| 7,797,693 B1 | 9/2010 | Gustafson | |
| 7,984,485 B1 | 7/2011 | Rao | |
| 8,037,471 B2 | 10/2011 | Keller | |
| 8,121,874 B1 | 2/2012 | Guheen | |
| 8,171,141 B1 | 5/2012 | Offer | |
| 8,219,821 B2 | 7/2012 | Zimmels | |
| 8,261,295 B1 | 9/2012 | Risbood | |
| 8,326,883 B2 * | 12/2012 | Pizzorni | G06F 8/60 707/795 |
| 8,392,498 B2 | 3/2013 | Berg | |
| 8,429,346 B1 | 4/2013 | Chen | |
| 8,464,241 B2 | 6/2013 | Hayton | |
| 8,505,003 B2 | 8/2013 | Bowen | |
| 8,527,544 B1 | 9/2013 | Colgrove | |
| 8,601,467 B2 | 12/2013 | Hofhansl | |
| 8,620,973 B1 | 12/2013 | Veeraswamy | |
| 8,666,933 B2 * | 3/2014 | Pizzorni | G06Q 10/10 707/602 |
| 8,745,003 B1 | 6/2014 | Patterson | |
| 8,775,751 B1 | 7/2014 | Pendharkar | |
| 8,782,632 B1 | 7/2014 | Chigurapati | |
| 8,788,634 B2 | 7/2014 | Krig | |
| 8,832,324 B1 | 9/2014 | Hodges | |
| 8,886,806 B2 | 11/2014 | Tung | |
| 8,909,885 B2 | 12/2014 | Corbett | |
| 8,966,198 B1 | 2/2015 | Harris | |
| 9,134,992 B2 | 9/2015 | Wong | |
| 9,146,769 B1 | 9/2015 | Shankar | |
| 9,148,465 B2 | 9/2015 | Gambardella | |
| 9,152,337 B2 | 10/2015 | Kono | |
| 9,167,028 B1 | 10/2015 | Bansal | |
| 9,280,591 B1 | 3/2016 | Kharatishvili | |
| 9,330,155 B1 | 5/2016 | Bono | |
| 9,336,060 B2 * | 5/2016 | Nori | H04L 41/0806 |
| 9,342,444 B2 | 5/2016 | Minckler | |
| 9,367,301 B1 | 6/2016 | Serrano | |
| 9,390,128 B1 | 7/2016 | Seetala | |
| 9,436,693 B1 | 9/2016 | Lockhart | |
| 9,521,198 B1 | 12/2016 | Agarwala | |
| 9,569,274 B2 * | 2/2017 | Tarta | G06F 9/5072 |
| 9,600,193 B2 * | 3/2017 | Ahrens | G06F 3/0619 |
| 9,619,389 B1 | 4/2017 | Roug | |
| 9,635,132 B1 | 4/2017 | Lin | |
| 9,667,470 B2 | 5/2017 | Prathipati | |
| 9,747,096 B2 | 8/2017 | Searle | |
| 9,870,366 B1 | 1/2018 | Duan | |
| 9,892,265 B1 | 2/2018 | Tripathy | |
| 9,998,955 B1 | 6/2018 | MacCarthaigh | |
| 10,019,459 B1 | 7/2018 | Agarwala | |
| 10,042,628 B2 | 8/2018 | Thompson | |
| 10,061,520 B1 | 8/2018 | Zhao | |
| 10,191,778 B1 | 1/2019 | Yang | |
| 10,241,774 B2 * | 3/2019 | Spivak | G06F 9/5055 |
| 10,282,229 B2 | 5/2019 | Wagner | |
| 10,353,634 B1 | 7/2019 | Greenwood | |
| 10,430,434 B2 * | 10/2019 | Sun | G06F 3/0661 |
| 2004/0153703 A1 | 8/2004 | Vigue | |
| 2004/0221125 A1 | 11/2004 | Ananthanarayanan | |
| 2005/0065986 A1 | 3/2005 | Bixby | |
| 2005/0216895 A1 | 9/2005 | Tran | |
| 2006/0085674 A1 | 4/2006 | Ananthamurthy | |
| 2007/0006015 A1 | 1/2007 | Rao | |
| 2007/0067583 A1 | 3/2007 | Zohar | |
| 2007/0260842 A1 | 11/2007 | Faibish | |
| 2007/0277056 A1 | 11/2007 | Varadarajan | |
| 2007/0288791 A1 | 12/2007 | Allen | |
| 2008/0068899 A1 | 3/2008 | Ogihara | |
| 2008/0189468 A1 | 8/2008 | Schmidt | |
| 2008/0270592 A1 | 10/2008 | Choudhary | |
| 2009/0144497 A1 | 6/2009 | Withers | |
| 2009/0172335 A1 | 7/2009 | Kulkarni | |
| 2009/0307249 A1 | 12/2009 | Koifman | |
| 2010/0161941 A1 | 6/2010 | Vyshetsky | |
| 2010/0162233 A1 | 6/2010 | Ku | |
| 2010/0211815 A1 | 8/2010 | Mankovskii | |
| 2010/0274984 A1 | 10/2010 | Inomata | |
| 2010/0299309 A1 | 11/2010 | Maki | |
| 2010/0306495 A1 | 12/2010 | Kumano | |
| 2010/0332730 A1 | 12/2010 | Royer | |
| 2011/0083126 A1 | 4/2011 | Bhakta | |
| 2011/0188506 A1 | 8/2011 | Arribas | |
| 2011/0208928 A1 | 8/2011 | Chandra | |
| 2011/0246420 A1 | 10/2011 | Wang | |
| 2011/0276951 A1 | 11/2011 | Jain | |
| 2012/0005557 A1 | 1/2012 | Mardiks | |
| 2012/0066449 A1 | 3/2012 | Colgrove | |
| 2012/0102369 A1 | 4/2012 | Hiltunen | |
| 2012/0216052 A1 | 8/2012 | Dunn | |
| 2012/0226667 A1 | 9/2012 | Volvovski | |
| 2012/0240012 A1 | 9/2012 | Weathers | |
| 2012/0265976 A1 | 10/2012 | Spiers | |
| 2012/0311671 A1 | 12/2012 | Wood | |
| 2012/0331113 A1 | 12/2012 | Jain | |
| 2013/0054552 A1 | 2/2013 | Hawkins | |
| 2013/0054932 A1 | 2/2013 | Acharya | |
| 2013/0080723 A1 | 3/2013 | Sawa | |
| 2013/0282662 A1 | 10/2013 | Kumarasamy | |
| 2013/0339659 A1 | 12/2013 | Bybell | |
| 2013/0346709 A1 | 12/2013 | Wang | |
| 2014/0006465 A1 | 1/2014 | Davis | |
| 2014/0047263 A1 | 2/2014 | Coatney | |
| 2014/0047341 A1 | 2/2014 | Breternitz | |
| 2014/0047342 A1 | 2/2014 | Breternitz | |
| 2014/0058871 A1 | 2/2014 | Marr | |
| 2014/0059527 A1 | 2/2014 | Gagliardi | |
| 2014/0059528 A1 | 2/2014 | Gagliardi | |
| 2014/0108483 A1 * | 4/2014 | Tarta | G06F 9/5072 709/201 |
| 2014/0130040 A1 | 5/2014 | Lemanski | |
| 2014/0195847 A1 | 7/2014 | Webman | |
| 2014/0245319 A1 * | 8/2014 | Fellows | G06F 9/5072 718/104 |
| 2014/0282596 A1 | 9/2014 | Bourbonnais | |
| 2015/0046644 A1 | 2/2015 | Karp | |
| 2015/0067031 A1 | 3/2015 | Acharya | |
| 2015/0074358 A1 | 3/2015 | Flinsbaugh | |
| 2015/0112951 A1 | 4/2015 | Narayanamurthy et al. | |
| 2015/0134857 A1 | 5/2015 | Hahn | |
| 2015/0149605 A1 | 5/2015 | de la Iglesia | |
| 2015/0186217 A1 | 7/2015 | Eslami | |
| 2015/0278333 A1 | 10/2015 | Hirose | |
| 2015/0326481 A1 | 11/2015 | Rector | |
| 2015/0379287 A1 | 12/2015 | Mathur | |
| 2016/0011816 A1 | 1/2016 | Aizman | |
| 2016/0042005 A1 | 2/2016 | Liu | |
| 2016/0124775 A1 | 5/2016 | Ashtiani | |
| 2016/0197995 A1 | 7/2016 | Lu | |
| 2016/0259597 A1 | 9/2016 | Worley | |
| 2016/0283261 A1 | 9/2016 | Nakatsu | |
| 2016/0357456 A1 | 12/2016 | Iwasaki | |
| 2016/0357548 A1 | 12/2016 | Stanton | |
| 2017/0060710 A1 | 3/2017 | Ramani | |
| 2017/0060975 A1 | 3/2017 | Akyureklier | |
| 2017/0149843 A1 | 5/2017 | Amulothu | |
| 2017/0168903 A1 | 6/2017 | Dornemann | |
| 2017/0192889 A1 | 7/2017 | Sato | |
| 2017/0214550 A1 | 7/2017 | Kumar | |

(56) References Cited

U.S. PATENT DOCUMENTS

| | | |
|---|---|---|
| 2017/0235649 A1 | 8/2017 | Shah |
| 2017/0242719 A1 | 8/2017 | Tsirkin |
| 2017/0244557 A1 | 8/2017 | Riel |
| 2017/0244787 A1 | 8/2017 | Rangasamy |
| 2017/0322954 A1 | 11/2017 | Horowitz |
| 2017/0337492 A1 | 11/2017 | Chen |
| 2017/0371551 A1 | 12/2017 | Sachdev |
| 2018/0006896 A1 | 1/2018 | MacNamara |
| 2018/0024889 A1 | 1/2018 | Verma |
| 2018/0046553 A1 | 2/2018 | Okamoto |
| 2018/0082053 A1 | 3/2018 | Brown |
| 2018/0107419 A1 | 4/2018 | Sachdev |
| 2018/0113625 A1 | 4/2018 | Sancheti |
| 2018/0113770 A1 | 4/2018 | Hasanov |
| 2018/0136931 A1 | 5/2018 | Hendrich |
| 2018/0137306 A1 | 5/2018 | Brady |
| 2018/0159745 A1 | 6/2018 | Byers |
| 2018/0165170 A1 | 6/2018 | Hegdal |
| 2018/0218000 A1 | 8/2018 | Setty |
| 2018/0246745 A1 | 8/2018 | Aronovich |
| 2018/0247064 A1 | 8/2018 | Aronovich |
| 2018/0276215 A1 | 9/2018 | Chiba |
| 2018/0285164 A1 | 10/2018 | Hu |
| 2018/0285223 A1 | 10/2018 | McBride |
| 2018/0285353 A1 | 10/2018 | Ramohalli |
| 2018/0287883 A1 | 10/2018 | Joshi |
| 2018/0302335 A1 | 10/2018 | Gao |
| 2018/0329981 A1 | 11/2018 | Gupte |
| 2018/0364917 A1 | 12/2018 | Ki |
| 2018/0375728 A1 | 12/2018 | Gangil |
| 2019/0065061 A1 | 2/2019 | Kim |
| 2019/0065323 A1 | 2/2019 | Dhamdhere |
| 2019/0073132 A1 | 3/2019 | Zhou |
| 2019/0073372 A1 | 3/2019 | Venkatesan |
| 2019/0079928 A1 | 3/2019 | Kumar |
| 2019/0089651 A1 | 3/2019 | Pignataro |
| 2019/0109756 A1 | 4/2019 | Lebdeh |
| 2019/0156023 A1 | 5/2019 | Gerebe |
| 2019/0163460 A1 | 5/2019 | Kludy |
| 2019/0188094 A1 | 6/2019 | Ramamoorthi |
| 2019/0190803 A1 | 6/2019 | Joshi |
| 2019/0199601 A1 | 6/2019 | Lynar |
| 2019/0213085 A1 | 7/2019 | Alluboyina |
| 2019/0215313 A1 | 7/2019 | Doshi |
| 2019/0220266 A1 | 7/2019 | Doshi |
| 2019/0220315 A1 | 7/2019 | Vallala |
| 2019/0235895 A1 | 8/2019 | Ovesea |
| 2019/0250849 A1 | 8/2019 | Compton |
| 2019/0278624 A1 | 9/2019 | Bade |
| 2019/0324666 A1 | 10/2019 | Kusters |
| 2020/0019414 A1 | 1/2020 | Byard |
| 2020/0034193 A1 | 1/2020 | Jayaram |
| 2020/0083909 A1 | 3/2020 | Kusters |

OTHER PUBLICATIONS

Zhang et al. "Multi-level Selective Deduplication for VM Snapshots in Cloud Storage", 2012 IEEE, pp. 550-557.*

Brinkmann et al. "Snapshots and Continuous Data Replication in Cluster Storage Environments", 2008 IEEE, pp. 3-10.*

Segment map, Google, Feb. 4, 2019.

Fast and Secure Append-Only storage with Infinite Capacity, Zheng, Aug. 27, 2003.

User Mode and Kernel Mode, Microsoft, Apr. 19, 2017.

Precise memory leak detection for java software using container profiling, XU, Jul. 2013.

Mogi et al., "Dynamic Parity Stripe Reorganizations for RAID5 Disk Arrays," 1994, IEEE, pp. 17-26.

Syed et al, "The Container Manager Pattern", ACM, pp. 1-9 (Year 2017).

Rehmann et al., "Performance of Containerized Database Management Systems", ACM, pp. 1-6 (Year 2018).

Awada et al, " Improving Resource Efficiency of Container-instance Clusters on Clouds", IEEE, pp. 929-934 (Year 2017).

Stankovski et al, "Implementing Time-Critical Functionalities with a Distributed Adaptive Container Architecture", ACM, pp. 1-5 (Year 2016).

Dhakate et al, "Distributed Cloud Monitoring Using Docker as Next Generation Container Virtualization Technology" IEEE, pp. 1-5 (Year 2015).

Crameri et al, "Staged Deployment in Mirage, an Integrated Software Upgrade Testing and Distribution System", ACM, pp. 221-236 (Year: 2007).

Cosmo et al, "Packages Upgrades in Foss Distributions: Details and Challenges", AC 2008).

Burg et al, "Atomic Upgrading of Distributed Systems", ACM, pp. 1-5 (Year: 2008).

Souer et al, "Component Based Architecture forWeb Content Management: Runtime Deployable Web Manager Component Bundles", IEEE, pp. 366-369 (Year: 2008).

Weingartner et al, "A distributed autonomic management framework for cloud computing orchestration." In 2016 IEEE World Congress on Services (Year: 2016).

* cited by examiner

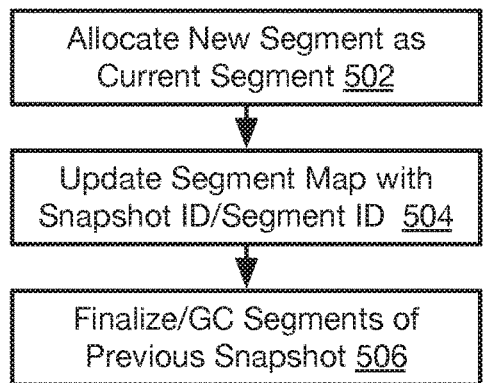
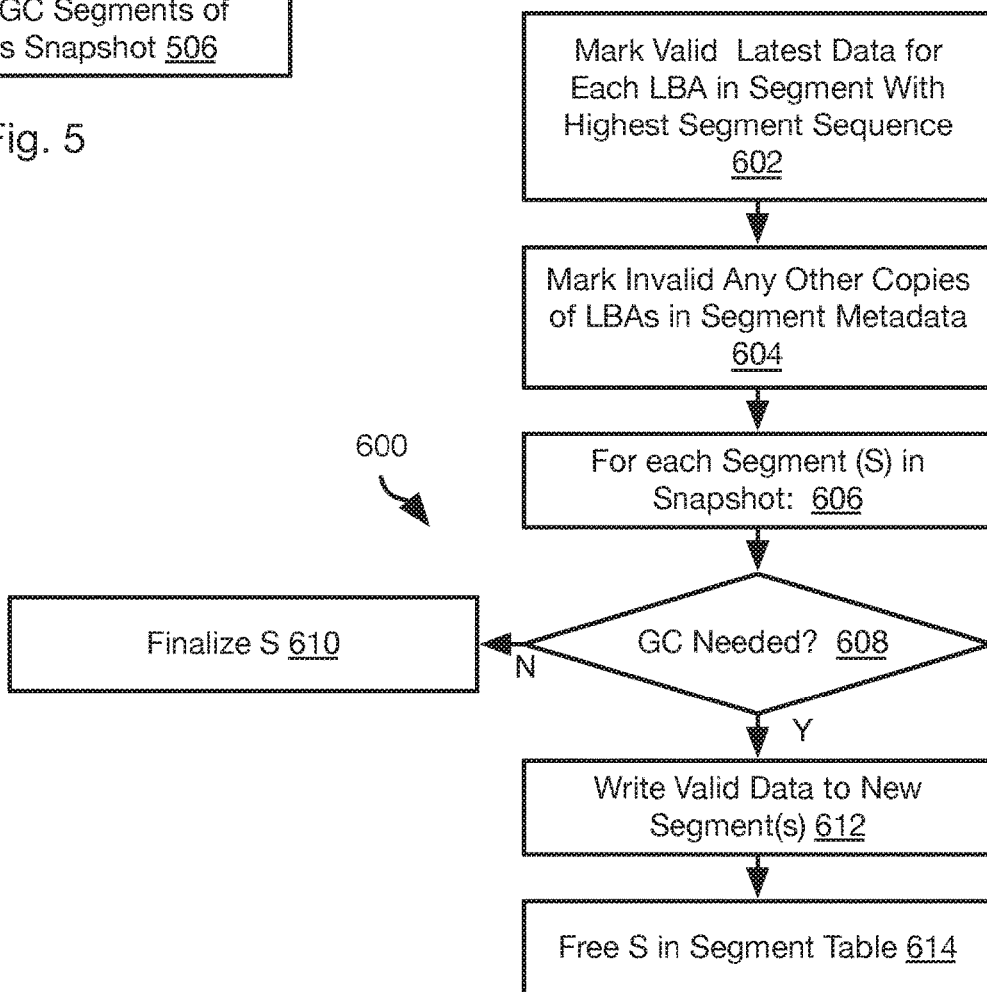
Fig. 5
Fig. 6

JOB MANAGER FOR DEPLOYING A BUNDLED APPLICATION

BACKGROUND

Field of the Invention

This invention relates to orchestration of roles in an application instantiated in a distributed storage and computation system.

Background of the Invention

In many contexts, it is helpful to be able to return a database or distributed application to an original state or some intermediate state. In this manner, changes to the distributed application or other database configuration parameters may be tested without fear of corrupting critical data.

The systems and methods disclosed herein provide an improved approach for creating snapshots of a database and returning to a previous snapshot.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 5 is a process flow diagram of a method for processing a snapshot instruction by a storage node in accordance with an embodiment of the present invention;

FIG. 6 is a process flow diagram of a method for performing garbage collection on segments in accordance with an embodiment of the present invention;

DETAILED DESCRIPTION

Figure 1:
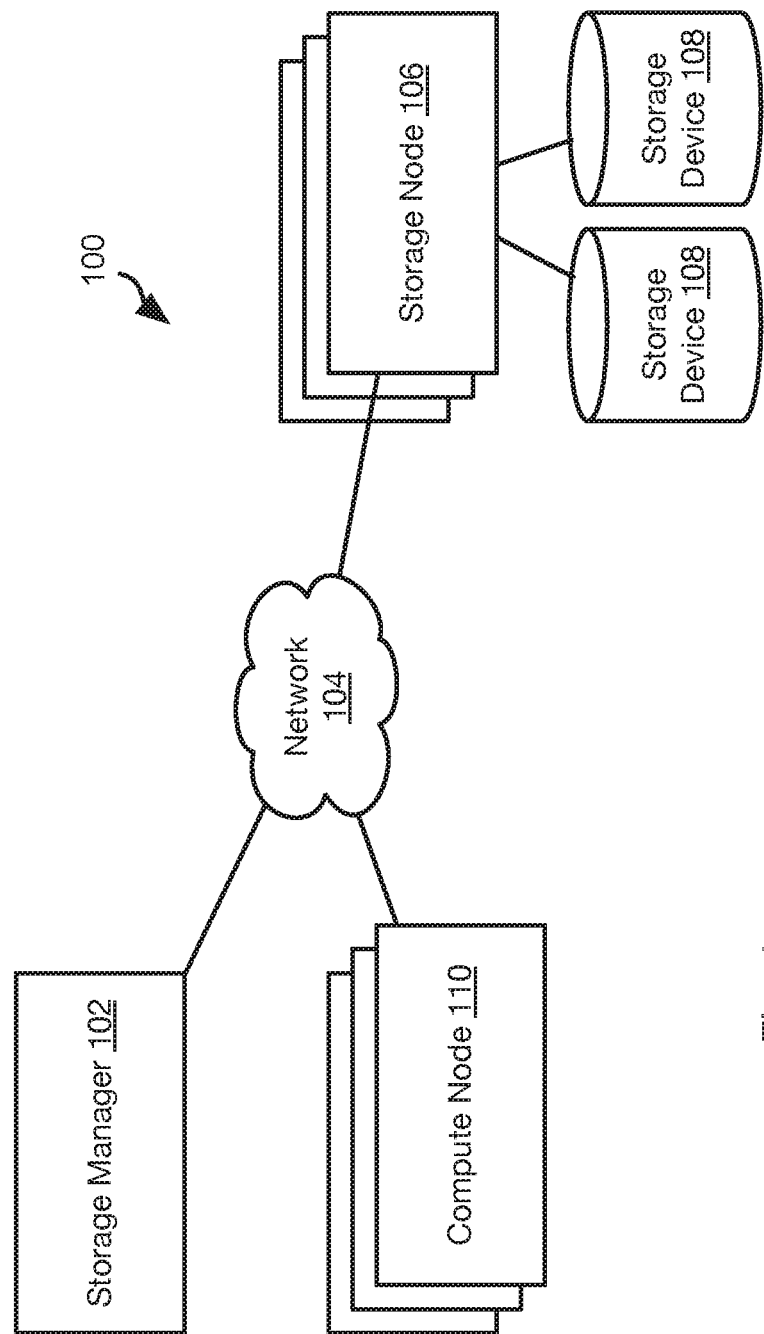
FIG. 1 is a schematic block diagram of a network environment for implementing methods in accordance with an embodiment of the present invention.

Referring to FIG. 1, the methods disclosed herein may be performed using the illustrated network environment 100. The network environment 100 includes a storage manager 102 that coordinates the creation of snapshots of storage volumes and maintains records of where snapshots are stored within the network environment 100. In particular, the storage manager 102 may be connected by way of a network 104 to one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the memory devices 108 of the storage nodes 108.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

Figure 2:
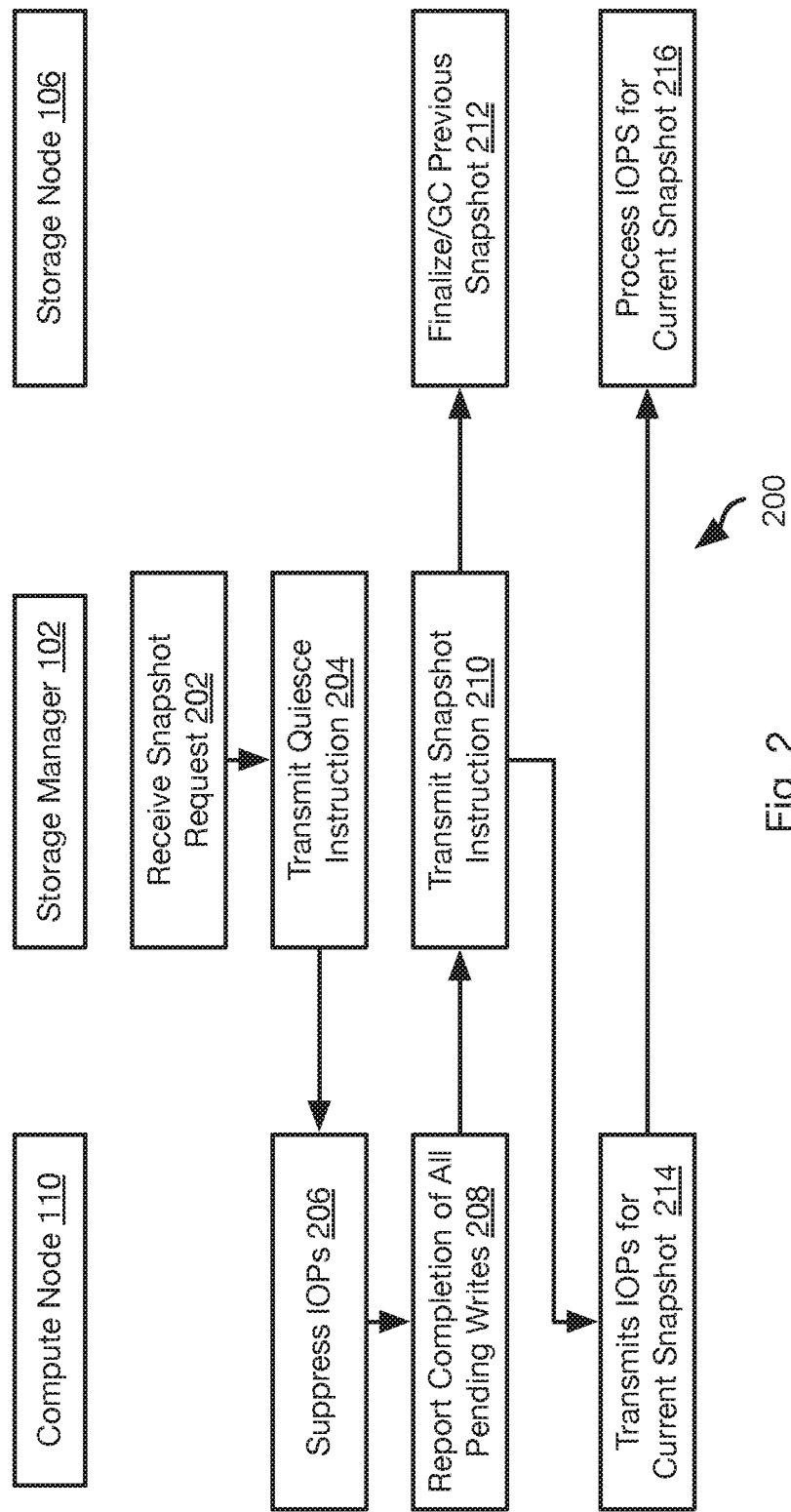
FIG. 2 is a process flow diagram of a method for coordinating snapshot creation with compute nodes and storage nodes in accordance with an embodiment of the present invention.

Referring to FIG. 2, the illustrated method 200 may be performed in order to invoke the creation of a new snapshot. Other than a current snapshot, which is still subject to change, a snapshot captures the state of a storage volume at a moment in time and is not altered in response to subsequent writes to the storage volume.

The method 200 includes receiving, by the storage manager 102 a request to create a new snapshot for a storage volume. A storage volume as referred to herein may be a virtual storage volume that may divided into individual slices. For example, storage volumes as described herein may be 1 TB and be divided into 1 GB slices. In general, a slice and its snapshot are stored on a single storage node 106, whereas a storage volume may have the slices thereof stored by multiple storage nodes 106.

The request received at step 202 may be received from a human operator or generated automatically, such as according to backup scheduler executing on the storage manager 102 or some other computing device. The subsequent steps of the method 200 may be executed in response to receiving 202 the request The method 200 may include transmitting 204 a quiesce instruction to all compute nodes 110 that are associated with the storage volume. For example, all compute nodes 110 that have pending write requests to the storage volume. In some embodiments, the storage manager 102 may store a mapping of compute nodes 110 to a particular storage volume used by the compute nodes 110. Accordingly, step 204 may include sending 204 the quiesce instruction to all of these compute nodes. Alternatively, the instruction may be transmitted 204 to all compute nodes 110 and include an identifier of the storage volume. The compute nodes 110 may then suppress any write instructions referencing that storage volume.

The quiesce instruction instructs the compute nodes 110 that receive it to suppress 206 transmitting write requests to the storage nodes 106 for the storage volume referenced by the quiesce instruction. The quiesce instruction may further cause the compute nodes 110 that receive it to report 208 to the storage manager 102 when no write requests are pending for that storage volume, i.e. all write requests issued to one or more storage nodes 106 and referencing slices of that storage volume have been acknowledged by the one or more storage nodes 106.

In response to receiving the report of step 208 from one or more compute nodes, e.g. all compute nodes that are mapped to the storage node that is the subject of the snapshot request of step 202, the storage manager 102 transmits 210 an instruction to the storage nodes 106 associated with the storage volume to create a new snapshot of that storage volume. Step 210 may further include transmitting 210 an instruction to the compute nodes 110 associated with the storage volume to commence issuing write commands to the storage nodes 106 associated with the storage volume. In some embodiments, the instruction of step 110 may include an identifier of the new snapshot. Accordingly, subsequent input/output operations (IOPs) transmitted 214 from the compute nodes may reference that snapshot identifier. Likewise, the storage node 106 may associate the snapshot identifier with data subsequently written to the storage volume, as described in greater detail below.

In response to receiving 210 the instruction to create a new snapshot, each storage node 106 finalizes 212 segments associated with the current snapshot, which may include performing garbage collection, as described in greater detail below. In addition, subsequent IOPs received by the storage node may also be processed 216 using the new snapshot as the current snapshot, as is also described in greater detail below.

Figure 3:
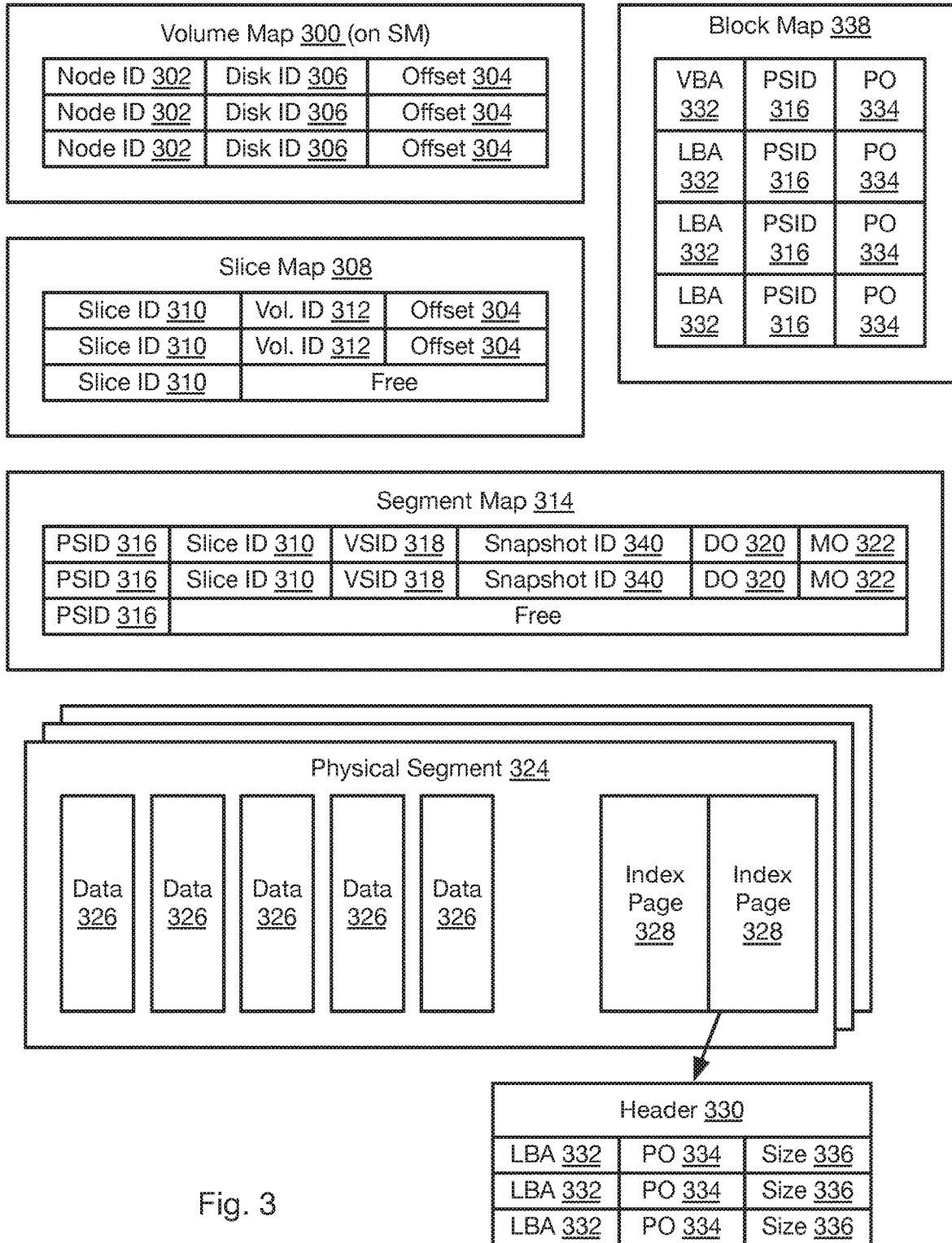
FIG. 3 is a schematic diagram illustrating the storage of data within a storage node in accordance with an embodiment of the present invention.

Referring to FIG. 3, the method by which slices are allocated, reassigned, written to, and read from may be understood with respect to the illustrated data storage scheme. The data of the storage scheme may be stored in transitory or persistent memory of the storage node 106, such as in the storage devices 108.

For each logical volume, the storage manager 102 may store and maintain a volume map 300. For each slice in the logical volume, the volume map may include an entry including a node identifier 302 identifying the storage node 106 to which the slice is assigned and an offset 304 within the logical volume at which the slice begins. In some embodiments, slices are assigned both to a storage node 106 and a specific storage device hosted by the storage node 106. Accordingly, the entry may further include a disk identifier of the storage node 106 referencing the specific storage device to which the slice is assigned.

The remaining data structures of FIG. 3 are stored on each storage node 106. The storage node 106 may store a slice map 308. The slice map 308 may include entries including a local slice identifier 310 that uniquely identifies each slice of the storage node 106, e.g. each slice of each storage device hosted by the storage node 106. The entry may further include a volume identifier 312 that identifies the logical volume to which the local slice identifier 310 is assigned. The entry may further include the offset 304 within the logical volume of the slice of the logical volume assigned to the storage node 106.

In some embodiments, an entry in the slice map 308 is created for a slice of the logical volume only after a write request is received that references the offset 304 for that slice. This further supports the implementation of overprovisioning such that slices may be assigned to a storage node 106 in excess of its actual capacity since the slice is only tied up in the slice map 308 when it is actually used.

The storage node 106 may further store and maintain a segment map 314. The segment map 314 includes entries either including or corresponding to a particular physical segment identifier (PSID) 316. For example, the segment map 314 may be in an area of memory such that each address in that area corresponds to one PSID 316 such that the entry does not actually need to include the PSID 316. The entries of the segment map 314 may further include a slice identifier 310 that identifies a local slice of the storage node 106 to which the PSID 316 has been assigned. The entry may further include a virtual segment identifier (VSID) 318. As described in greater detail below, each time a segment is assigned to logical volume and a slice of a logical volume, it may be assigned a VSID 318 such that the VSIDs 318 increase in value monotonically in order of assignment. In this manner, the most recent PSID 316 assigned to a logical volume and slice of a logical volume may easily be determined by the magnitude of the VSIDs 318 mapped to the PSIDs 316. In some embodiments, VSIDs 318 are assigned in a monotonically increasing series for all segments assigned to volume ID 312. In other embodiments, each offset 304 and its corresponding slice ID 310 is assigned VSIDs separately, such that each slice ID 310 has its own corresponding series of monotonically increasing VSIDs 318 assigned to segments allocated to that slice ID 310.

The entries of the segment map 314 may further include a data offset 320 for the PSID 316 of that entry. As described in greater detail below, when data is written to a segment it may be written at a first open position from a first end of the segment. Accordingly, the data offset 320 may indicate the location of this first open position in the segment. The data offset 320 for a segment may therefore be updated each time data is written to the segment to indicate where the new first open position is.

The entries of the segment map 314 may further include a metadata offset 322. As described in detail below, for each write request written to a segment, a metadata entry may be stored in that segment at a first open position from a second end of the segment opposite the first end. Accordingly, the metadata offset 322 in an entry of the segment map 314 may indicate a location of this first open position of the segment corresponding to the entry.

Each PSID 316 corresponds to a physical segment 324 on a device hosted by the storage node 106. As shown, data payloads 326 from various write requests are written to the physical segment 324 starting from a first end (left) of the physical segment. The physical segment may further store index pages 328 such that index pages are written starting from a second end (right) of the physical segment 324.

Each index page 328 may include a header 330. The header 330 may be coded data that enables identification of a start of an index page 328. The entries of the index page 328 each correspond to one of the data payloads 326 and are written in the same order as the data payloads 326. Each entry may include a logical block address (LBA) 332. The LBA 332 indicates an offset within the logical volume to which the data payload corresponds. The LBA 332 may indicate an offset within a slice of the logical volume. For example, inasmuch as the PSID 316 is mapped to a slice ID 310 that is mapped to an offset 304 within a particular volume ID 312, maps 308 and 314, and an LBA 332 within the slice may be mapped to the corresponding offset 304 to obtain a fully resolved address within the logical volume.

In some embodiments, the entries of the index page 328 may further include a physical offset 334 of the data payload 326 corresponding to that entry. Alternatively or additionally, the entries of the index page 328 may include a size 336 of the data payload 326 corresponding to the entry. In this manner, the offset to the start of a data payload 326 for an entry may be obtained by adding up the sizes 336 of previously written entries in the index pages 328.

The metadata offset 322 may point to the last index page 328 (furthest from right in illustrated example) and may further point to the first open entry in the last index page 328. In this manner, for each write request, the metadata entry for that request may be written to the first open position in the last index page 328. If all of the index pages 328 are full, a new index page 328 may be created and stored at the first open position from the second end and the metadata for the write request may be added at the first open position in that index page 328.

The storage node 106 may further store and maintain a block map 338. A block map 338 may be maintained for each logical volume and/or for each slice offset of each logical volume, e.g. for each local slice ID 310 which is mapped to a slice offset and logical volume by slice map 308. The entries of the block map 338 map include entries corresponding to each LBA 332 within the logical volume or slice of the logical volume. The entries may include the LBA 332 itself or may be stored at a location within the block map corresponding to an LBA 332.

The entry for each LBA 332 may include the PSID 316 identifying the physical segment 324 to which a write request referencing that LBA was last written. In some embodiments, the entry for each LBA 332 may further indicate the physical offset 334 within that physical segment 324 to which the data for that LBA was written. Alternatively, the physical offset 334 may be obtained from the index pages 328 of that physical segment. As data is written to an LBA 332, the entry for that LBA 332 may be overwritten to indicate the physical segment 324 and physical offset 334 within that segment 324 to which the most recent data was written.

In embodiments implementing multiple snapshots for a volume and slice of a volume, the segment map 314 may additionally include a snapshot ID 340 identifying the snapshot to which the PSID 316 has been assigned. In particular, each time a segment is allocated to a volume and slice of a volume, the current snapshot identifier for that volume and slice of a volume will be included as the snapshot ID 340 for that PSID 316.

In response to an instruction to create a new snapshot for a volume and slice of a volume, the storage node 106 will store the new current snapshot identifier, e.g. increment the previously stored current snapshot ID 340, and subsequently allocated segments will include the current snapshot ID 340. PSIDs 316 that are not filled and are allocated to the previous snapshot ID 340 may no longer be written to. Instead, they may be finalized or subject to garbage collection (see FIGS. 5 and 6).

Figure 4:
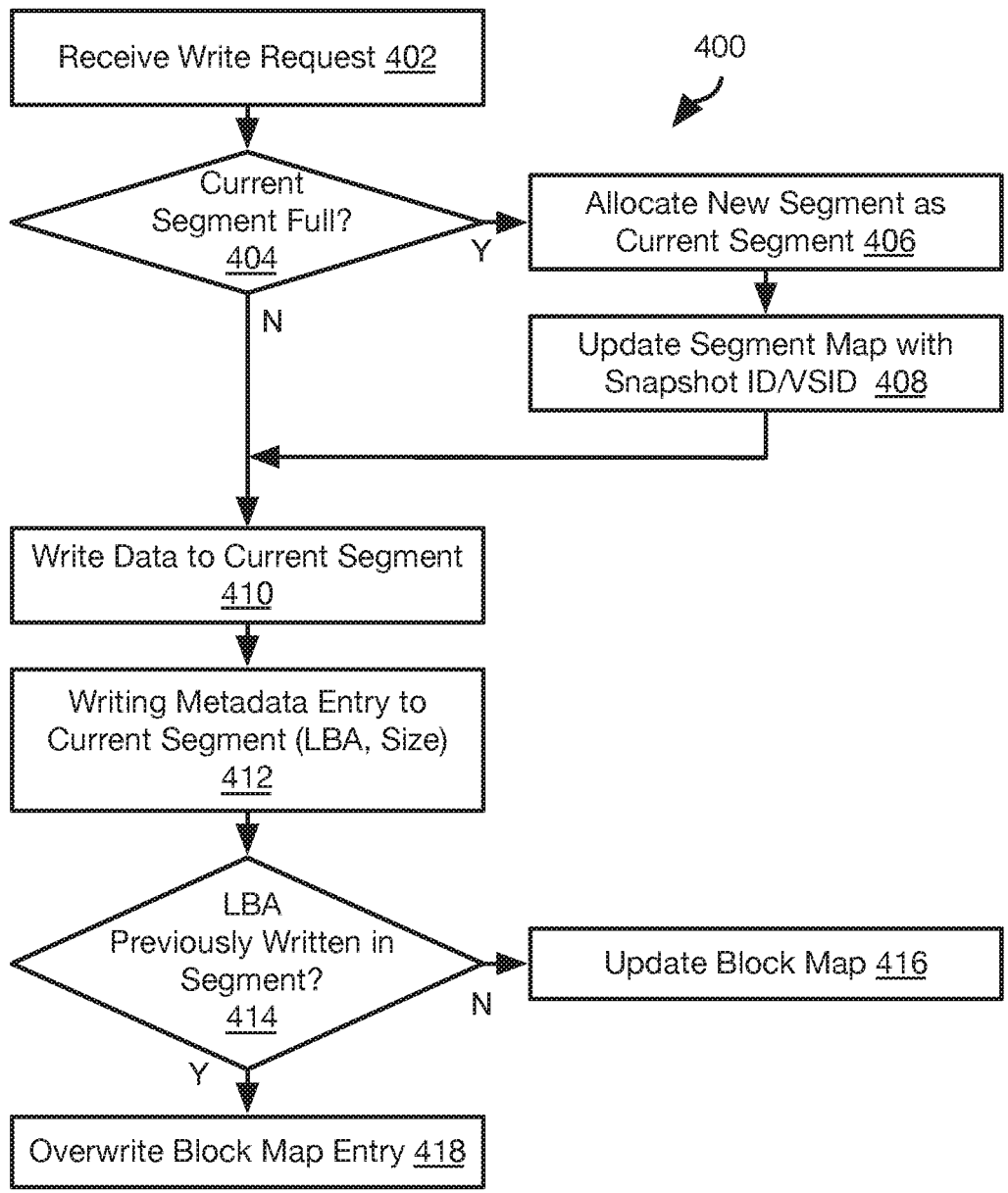
FIG. 4 is a process flow diagram of a method for processing write requests in a storage node in accordance with an embodiment of the present invention.

FIG. 4 illustrates a method 400 for executing write instructions by a storage node 106, such as write instructions received from an application executing on a compute node 110.

The method 400 includes receiving 402 a write request. The write request may include payload data, payload data size, and an LBA as well as fields such as a slice identifier, a volume identifier, and a snapshot identifier. Where a slice identifier is included, the LBA may be an offset within the slice, otherwise the LBA may be an address within the storage volume.

The method 400 may include evaluating 404 whether a PSID 316 is allocated to the snapshot referenced in the write request and whether the physical segment 324 corresponding to the PSID 316 ("the current segment") has space for the payload data. In some embodiments, as write requests are performed with respect to a PSID 316, the amount of data written as data 326 and index pages 328 may be tracked, such as by way of the data offset 320 and metadata offset 322 pointers. Accordingly, if the amount of previously-written data 326 and the number of allocated index pages 328 plus the size of the payload data and its corresponding metadata entry exceeds the capacity of the current segment it may be determined to be full at step 404.

If the current segment is determined 404 to be full, the method 400 may include allocating 406 a new PSID 316 as the current PSID 316 and its corresponding physical segment 324 as the current segment for the snapshot referenced in the write request. In some embodiments, the status of PSIDs 316 of the physical storage devices 108 may be flagged in the segment map 314 as allocated or free as a result of allocation and garbage collection, which is discussed below. Accordingly, a free PSID 316 may be identified in the segment map 314 and flagged as allocated.

The segment map 314 may also be updated 408 to include a slice ID 310 and snapshot ID 340 mapping the current PSID 316 to the snapshot ID, volume ID 312, and offset 304 included in the write request. Upon allocation, the current PSID 316 may also be mapped to a VSID (virtual segment identifier) 318 that will be a number higher than previously VSIDs 318 such that the VSIDs increase monotonically, subject, of course, to the size limit of the field used to store the VSID 318. However, the size of the field may be sufficiently large that it is not limiting in most situations.

The method 400 may include writing 410 the payload data to the current segment. As described above, this may include writing 410 payload data 326 to the free location closest to the first end of the current segment.

The method 400 may further include writing 412 a metadata entry to the current segment. This may include writing the metadata entry (LBA, size) to the first free location closest to the second end of the current segment. Alternatively, this may include writing the metadata entry to the first free location in an index page 328 that has room for it or creating a new index page 328 located adjacent a previous index page 328. Steps 410, 412 may include updating one or more pointers or table that indicates an amount of space available in the physical segment, such as a pointer 320 to the first free address closest to the first end and a pointer 322 to the first free address closest to the second end, which may be the first free address before the last index page 328 and/or the first free address in the last index page. In particular, these pointers may be maintained as the data offset 320 and metadata offset in the segment map 314 for the current PSID 316.

The method 400 may further include updating 416 the block map 338 for the current snapshot. In particular, for each LBA 332 referenced in the write request, an entry in the block map 338 for that LBA 332 may be updated to reference the current PSID 316. A write request may write to a range of LBAs 332. Accordingly, the entry for each LBA 332 in that range may be updated to refer to the current PSID 316.

Updating the block map 338 may include evaluating 414 whether an entry for a given LBA 332 referenced in the write request already exists in the block map 338. If so, then that entry is overwritten 418 to refer to the current PSID 316. If not, an entry is updated 416 in the block map 318 that maps the LBA 332 to the current PSID 316. In this manner, the block map 338 only references LBAs 332 that are actually written to, which may be less than all of the LBAs 332 of a storage volume or slice. In other embodiments, the block map 338 is of fixed size and includes and entry for each LBA 332 regardless of whether it has been written to previously. The block map 338 may also be updated to include the physical offset 334 within the current segment to which the data 326 from the write request was written.

In some embodiments, the storage node 106 may execute multiple write requests in parallel for the same LBA 332. Accordingly, it is possible that a later write can complete first and update the block map 338 whereas a previous write request to the same LBA 332 completes later. The data of the previous write request is therefore stale and the block map 338 should not be updated.

Suppressing of updating the block map 338 may be achieved by using the VSIDs 318 and physical offset 334. When executing a write request for an LBA, the VSID 318 mapped to the segment 324 and the physical offset 334 to which the data is to be, or was, written may be compared to the VSID 318 and offset 334 corresponding to the entry in the block map 338 for the LBA 332. If the VSID 318 mapped in the segment map 314 to the PSID 316 in the entry of the block map 338 corresponding to the LBA 332, then the block map 338 will not be updated. Likewise, if the VSID 318 corresponding to the PSID 316 in the block map 338 is the same as the VSID 318 for the write request and the physical offset 334 in the block map 338 is higher than the offset 334 to which the data of the write request is to be or was written, the block map 338 will not be updated for the write request.

As a result of steps 414-418, the block map 338 only lists the PSID 316 where the valid data for a given LBA 332 is stored. Accordingly, only the index pages 328 of the physical segment 324 mapped to the PSID 316 listed in the block map 338 need be searched to find the data for a given LBA 332. In instances where the physical offset 334 is stored in the block map 338, no searching is required.

FIG. 5 illustrates a method 500 executed by a storage node 106 in response to the new snapshot instruction of step 210 for a storage volume. The method 500 may be executed in response to an explicit instruction to create a new snapshot or in response to a write request that includes a new snapshot ID 340. The method 500 may also be executed with respect to a current snapshot that is still being addressed by new write requests. For example, the method 500 may be executed periodically or be triggered based on usage.

The method 500 may include allocating 502 a new PSID 316 and its corresponding physical segment 324 as the current PSID 316 and current segment for the storage volume, e.g., by including a slice ID 310 corresponding to a volume ID 312 and offset 304 included in the new snapshot instruction or the write request referencing the new snapshot ID 340. Allocating 502 a new segment may include updating 504 an entry in the segment map 314 that maps the current PSID 316 to the snapshot ID 340 and a slice ID 310 corresponding to a volume ID 312 and offset 304 included in the new snapshot instruction.

As noted above, when a PSID 316 is allocated, the VSID 318 for that PSID 316 may be a number higher than all VSIDs 318 previously assigned to that volume ID 312, and possibly to that slice ID 310 (where slices have separate series of VSIDs 318). The snapshot ID 340 of the new snapshot may be included in the new snapshot instruction or the storage node 106 may simply assign a new snapshot ID that is the previous snapshot ID 340 plus one.

The method 500 may further include finalizing 506 and performing garbage collection with respect to PSIDs 316 mapped to one or more previous snapshots IDs 340 for the volume ID 312 in the segment map 314, e.g., PSIDs 316 assigned to the snapshot ID 340 that was the current snapshot immediately before the new snapshot instruction was received.

FIG. 6 illustrates a method 600 for finalizing and performing garbage collection with respect to segment IDs 340 for a snapshot ("the subject snapshot"), which may include the current snapshot or a previous snapshot. The method 600 may include marking 602 as valid latest-written data for an LBA 332 in the PSID 316 having the highest VSID 318 in the segment map 314 and to which data was written for that LBA 332. Marking 602 data as valid may include making an entry in a separate table that lists the location of valid data or entries for metadata in a given physical segment 324 or setting a flag in the metadata entries stored in the index pages 328 of a physical segment 324, e.g., a flag that indicates that the data referenced by that metadata is invalid or valid.

Note that the block map 338 records the PSID 316 for the latest version of the data written to a given LBA 332. Accordingly, any references to that LBA 332 in the physical segment 324 of a PSID 316 mapped to a lower-numbered VSID 318 may be marked 604 as invalid. For the physical segment 324 of the PSID 316 in the block map 338 for a given LBA 332, the last metadata entry for that LBA 332 may be found and marked as valid, i.e. the last entry referencing the LBA 332 in the index page 328 that is the last index page 328 including a reference to the LBA 332. Any other references to the LBA 332 in the physical segment 324 may be marked 604 as invalid. Note that the physical offset 334 for the LBA 332 may be included in the block map 334, so all metadata entries not corresponding to that physical offset 334 may be marked as invalid.

The method 600 may then include processing 606 each segment ID S of the PSIDs 316 mapped to the subject snapshot according to steps 608-620. In some embodiments, the processing of step 606 may exclude a current PSID 316, i.e. the last PSID 302 assigned to the subject snapshot. As described below, garbage collection may include writing valid data from a segment to a new segment. Accordingly, step 606 may commence with the PSID 316 having the lowest-valued VSID 318 for the subject snapshot. As any segments 324 are filled according to the garbage collection process, they may also be evaluated to be finalized or subject to garbage collection as described below.

The method 600 may include evaluating 608 whether garbage collection is needed for the segment ID S. This may include comparing the amount of valid data in the physical segment 324 for the segment ID S to a threshold. For example, if only 40% of the data stored in the physical segment 324 for the segment ID S has been marked valid, then garbage collection may be determined to be necessary. Other thresholds may be used, such as value between 30% and 80%. In other embodiments, the amount of valid data is compared to the size of the physical segment 324, e.g., the segment ID S is determined to need garbage collection if the amount of valid data is less than X % of the size of the physical segment 324, where X is a value between 30 and 80, such as 40.

If garbage collection is determined 608 not to be needed, the method 600 may include finalizing 610 the segment ID S. Finalizing may include flagging the segment ID S in the segment map 314 as full and no longer available to be written to. This flag may be stored in another table that lists finalized PSIDs 316.

If garbage collection is determined 608 to be needed, then the method 600 may include writing 612 the valid data to a new segment. For example, if the valid data may be written to a current PSID 316, i.e. the most-recently allocated PSID 316 for the subject snapshot, until its corresponding physical segment 324 full. If there is no room in the physical segment 324 for the current PSID 316, step 612 may include assigning a new PSID 316 as the current PSID 316 for the subject snapshot. The valid data, or remaining valid data, may then be written to the physical segment 324 corresponding to the current PSID 316 for the subject snapshot.

Note that writing 612 the valid data to the new segment may be processed in the same manner as for any other write request (see FIG. 4) except that the snapshot ID used will be the snapshot ID 340 of the subject snapshot, which may not be the current snapshot ID. In particular, the manner in which the new PSID 316 is allocated to the subject snapshot may be performed in the same manner described above with respect to steps 406-48 of FIG. 4. Likewise, the manner in which the valid data is written to the current segment may be performed in the same manner as for steps 410-412 of FIG. 4. In some embodiments, writing of valid data to a new segment as part of garbage collection may also include updating the block map with the new location of the data for an LBA 332, such as according to steps 414-418 of FIG. 4. When the physical segment 324 of the current PSID 316 is found to be full, it may itself be subject to the process 600 by which it is finalized or subject to garbage collection.

After the valid data is written to a new segment, the method 600 may further include freeing 614 the PSID S in the segment map 314, e.g., marking the entry in segment map 314 corresponding to PSID S as free.

The process of garbage collection may be simplified for PSIDs 316 that are associated with the subject snapshot in the segment map 314 but are not listed in the block map 338 with respect to any LBA 332. The physical segments 324 of such PSIDs 316 do not store any valid data. Entries for such PSIDs 316 in the segment map 314 may therefore simply be deleted and marked as free in the segment map 314

Figure 7:
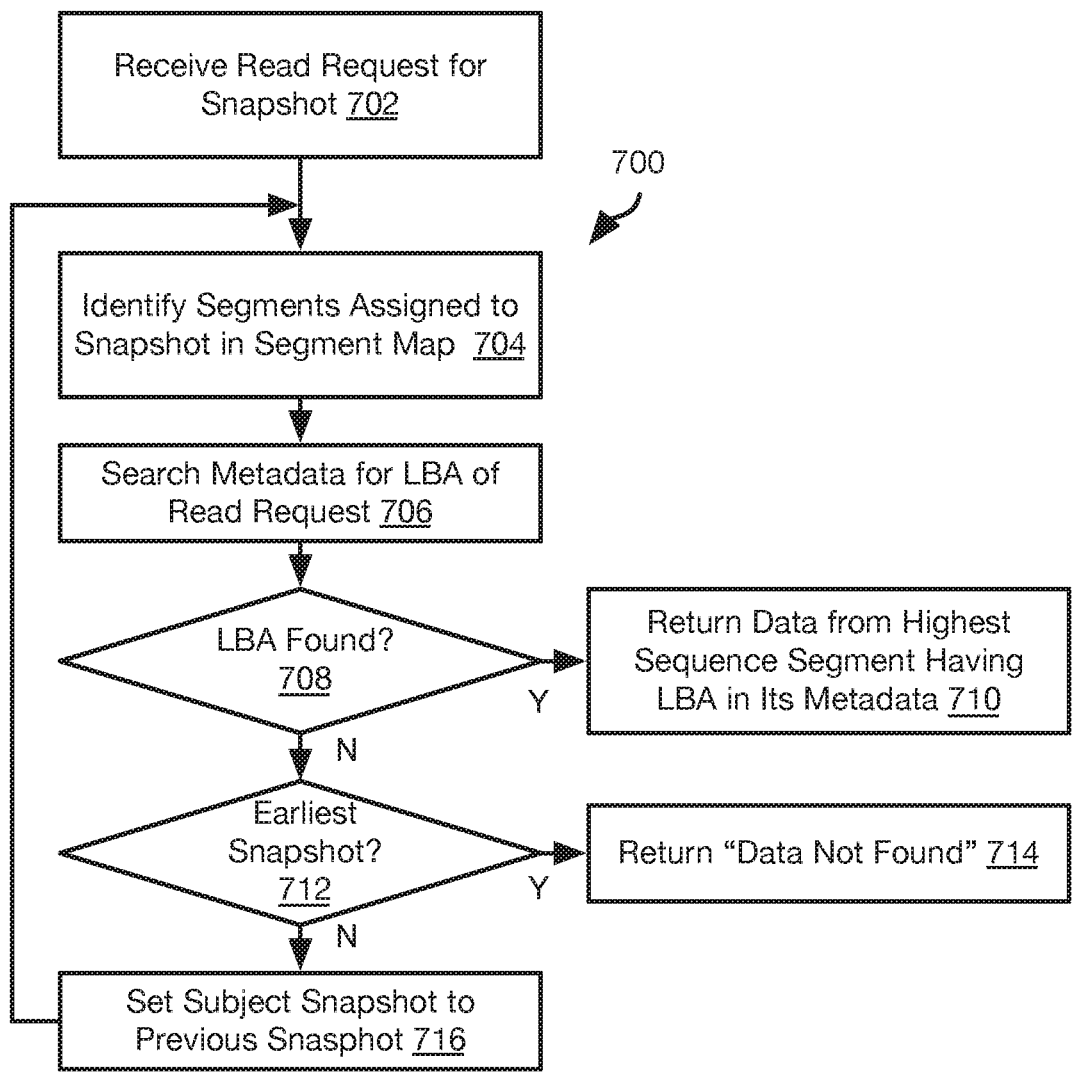
FIG. 7 is a process flow diagram of a method for reading data from a snapshot in accordance with an embodiment of the present invention.

FIG. 7 illustrates a method 700 that may be executed by a storage node 106 in response to a read request. The read request may be received from an application executing on a compute node 110. The read request may include such information as a snapshot ID, volume ID (and/or slice ID), LBA, and size (e.g. number of 4 KB blocks to read).

The following steps of the method 700 may be initially executed using the snapshot ID 340 included in the read request as "the subject snapshot," i.e., the snapshot that is currently being processed to search for requested data. The method 700 includes receiving 702 the read request by the storage node 106 and identifying 704 one or more PSIDs 316 in the segment map 314 assigned to the subject snapshot and searching 706 the metadata entries for these PSIDs 316 for references to the LBA 332 included in the read request.

The searching of step 706 may be performed in order of decreasing VSID 318, i.e. such that the metadata entries for the last allocated PSID 316 is searched first. In this manner, if reference to the LBA 332 is found, the metadata of any previously-allocated PSIDs 316 does not need to be searched.

Searching 706 the metadata for a PSID 316 may include searching one or more index pages 328 of the physical segment 324 corresponding to the PSID 316. As noted above, one or more index pages 328 are stored at the second end of the physical segment 324 and entries are added to the index pages 328 in the order they are received. Accordingly, the last-written metadata including the LBA 332 in the last index page 328 (furthest from the second end of the physical segment 324) in which the LBA 332 is found will correspond to the valid data for that LBA 332. To locate the data 326 corresponding to the last-written metadata for the LBA 332 in the physical segment 324, the sizes 336 for all previously-written metadata entries may be summed to find a start address in the physical segment 324 for the data 326. Alternatively, if the physical offset 334 is included, then the data 326 corresponding to the metadata may be located without summing the sizes 336.

If reference to the LBA 332 is found 708 in the physical segment 324 for any of the PSIDs 316 allocated to the subject snapshot, the data 326 corresponding to the last-written metadata entry including that LBA 332 in the physical segment 324 mapped to the PSID 316 having the highest VSID 318 of all PSIDs 316 in which the LBA is found will be returned 710 to the application that issued the read request.

If the LBA 332 is not found in the metadata entries for any of the PSIDs 316 mapped to subject snapshot, the method 700 may include evaluating 712 whether the subject snapshot is the earliest snapshot for the storage volume of the read request on the storage node 106. If so, then the data requested is not available to be read and the method 700 may include returning 714 a "data not found" message or otherwise indicating to the requesting application that the data is not available.

If an earlier snapshot than the subject snapshot is present for the storage volume on the storage node 106, e.g., there exists at least one PSID 316 mapped to a snapshot ID 340 that is lower than the snapshot ID 340 of the subject snapshot ID, then the immediately preceding snapshot ID 340 will be set 716 to be the subject snapshot and processing will continue at step 704, i.e. the PSIDs 316 mapped to the subject snapshot will be searched for the LBA 332 in the read request as described above.

The method 700 is particularly suited for reading data from snapshots other than the current snapshot that is currently being written to. In the case of a read request from the current snapshot, the block map 338 may map each LBA 332 to the PSID 316 in which the valid data for that LBA 332 is written. Accordingly, for such embodiments, step 704 may include retrieving the PSID 332 for the LBA 332 in the write request from the block map 338 and only searching 706 the metadata corresponding to that PSID 316. Where the block map 338 stores a physical offset 334, then the data is retrieved from that physical offset within the physical segment 314 of the PSID 336 mapped to the LBA 332 of the read request.

In some embodiments, the block map 332 may be generated for a snapshot other than the current snapshot in order to facilitate executing read requests, such as where a large number of read requests are anticipated in order to reduce latency. This may include searching the index pages 328 of the segments 324 allocated to the subject snapshot and its preceding snapshots to identify, for each LBA 332 to which data has been written, the PSID 316 having the highest VSID 318 of the PSIDs 316 having physical segments 324 storing data written to the each LBA 332. This PSID 316 may then be written to the block map 318 for the each LBA 332. Likewise, the physical offset 334 of the last-written data for that LBA 332 within the physical segment 324 for that PSID 316 may be identified as described above (e.g., as described above with respect to steps 704-716).

Figure 8:
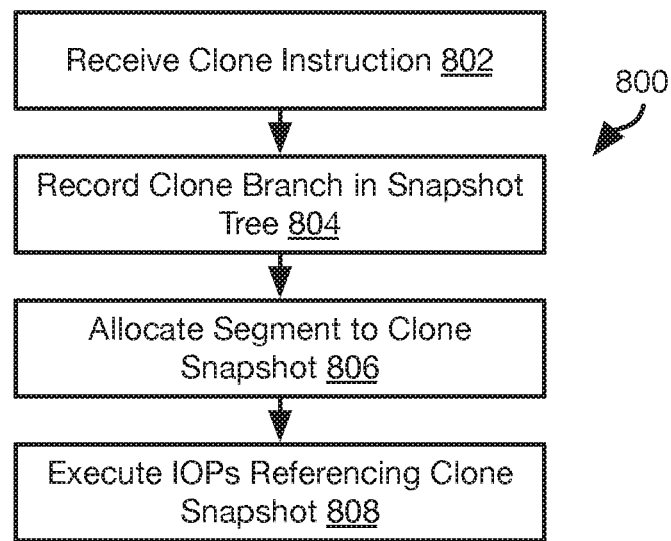
FIG. 8 is a process flow diagram of a method for cloning a snapshot in accordance with an embodiment of the present invention.

Referring to FIG. 8, in some instances it may be beneficial to clone a storage volume. This may include capturing a current state of a principal copy of a storage volume and making changes to it without affecting the principal copy of the storage volume. For purposes of this disclosure a "principal copy" or "principal snapshot" of a storage volume refers to an actual production copy that is part of a series of snapshots that is considered by the user to be the current, official, or most up-to-date copy of the storage volume. In contrast, a clone snapshot is a snapshot created for experimentation or evaluation but changes to it are not intended by the user to become part of the production copy of the storage volume. Stated differently, only one snapshot may be a principal snapshot with respect to an immediately preceding snapshot, independent of the purpose of the snapshot. Any other snapshots that are immediate descendants of the immediately preceding snapshot are clone snapshots.

The illustrated method 800 may be executed by the storage manager 102 and one or more storage nodes 106 in order to implement this functionality. The method 800 may include receiving 802 a clone instruction and executing the remaining steps of the method 800 in response to the clone instruction. The clone instruction may be received by the storage manager 102 from a user or be generated according to a script or other program executing on the storage manager 102 or a remote computing device in communication with the storage manager 102.

Figure 9:
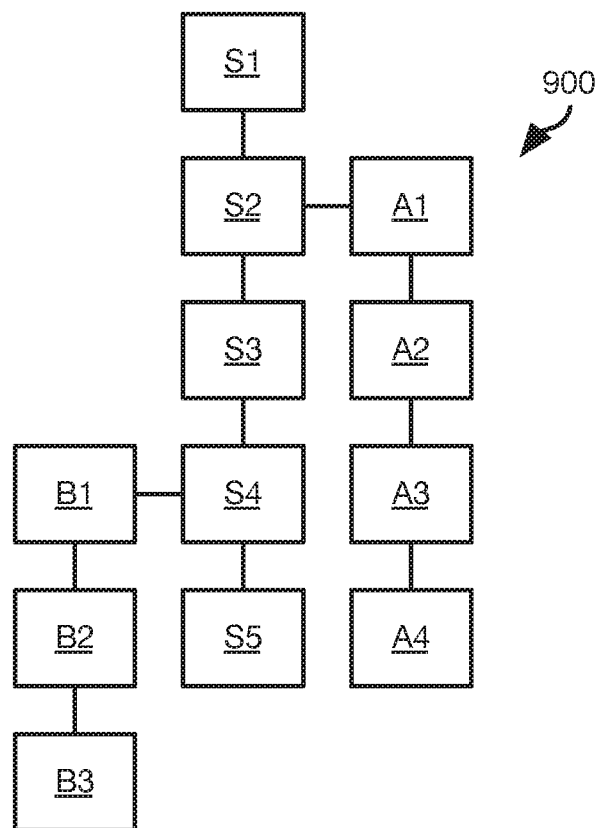
FIG. 9 illustrates a snapshot hierarchy created in accordance with an embodiment of the present invention.

The method 800 may include recording 804 a clone branch in a snapshot tree. For example, referring to FIG. 9, in some embodiments, for each snapshot that is created for a storage volume, the storage manager 102 may create a node S1-S5 in a snapshot hierarchy 900. In response to a clone instruction, the storage manager 102 may create a clone snapshot and branch to a node A1 representing the clone snapshot. In the illustrated example, a clone instruction was received with respect to the snapshot of node S2. This resulted in the creation of clone snapshot represented by node A1 that branches from node S2. Note node S3 and its descendants are also connected to node S2 in the hierarchy.

In some embodiments, the clone instruction may specify which snapshot the clone snapshot is of In other embodiments, the clone instruction may be inferred to be a snapshot of a current snapshot. In such embodiments, a new principal snapshot may be created and become the current snapshot. The previous snapshot will then be finalized and be subject to garbage collection as described above. The clone will then branch from the previous snapshot. In the illustrated example, if node S2 represented the current snapshot, then a new snapshot represented by node S3 would be created. The snapshot of node S2 would then be finalized and subject to garbage collection and clone snapshot represented by A1 would be created and node A1 would be added to the hierarchy as a descendent of node S2.

In some embodiments, the clone node A1, and possibly its descendants A2 to A4 (representing subsequent snapshots of the clone snapshot), may be distinguished from the nodes S1 to S5 representing principal snapshots, such as by means of a flag, a classification of the connection between the node A1 and node S2 that is its immediate ancestor, or by storing data defining node A1 in a separate data structure.

Following creation of a clone snapshot, other principal snapshots of the storage volume may be created and added to represented in the hierarchy by one or more nodes S2 to S5. A clone may be created of any of these snapshots and represented by additional clone nodes. In the illustrated example, node B1 represents a clone snapshot of the snapshot represented by node S4. Subsequent snapshots of the clone snapshot are represented by nodes B1 to B3.

Referring again to FIG. 8, the creation of a clone snapshot on the storage node 106 may be performed in the identical manner as for any other snapshot, such as according to the methods of FIGS. 2 through 6. In particular, one or more segments 806 may be allocated to the clone snapshot on storage nodes 106 storing slices of the cloned storage volume and mapped to the clone snapshot. IOPs referencing the clone snapshot may be executed 808, such as according to the method 400 of FIG. 4.

In some instances, it may be desirable to store a clone snapshot on a different storage node 106 than the principal snapshots. Accordingly, the method 800 may include allocating 806 segments to the clone snapshot on the different storage node 106. This may be invoked by sending a new snapshot instruction referencing the clone snapshot (i.e., an identifier of the clone snapshot) to the different storage node 106 and instructing one or more compute nodes 110 to route IOPs for the clone snapshot to the different storage node 106.

The storage node 102 may store in each node of the hierarchy, data identifying one or more storage nodes 106 that store data for the snapshot represented by that node of the hierarchy. For example, each node may store or have associated therewith one or more identifiers of storage nodes 106 that store a particular snapshot ID for a particular volume ID. The node may further map one or more slice IDs (e.g., slice offsets) of a storage volume to one storage nodes 106 storing data for that slice ID and the snapshots for that slice ID.

Figure 10:
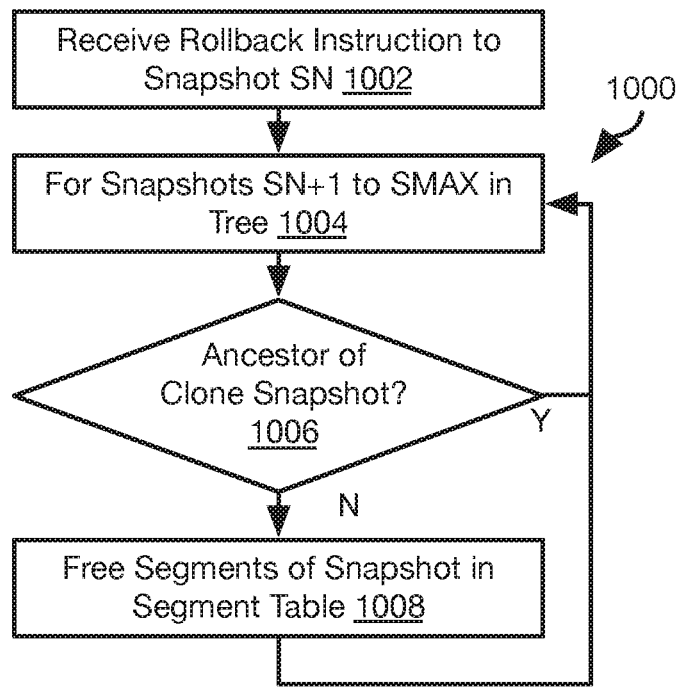
FIG. 10 is a process flow diagram of a method for rolling back to a prior snapshot in accordance with an embodiment of the present invention.

Referring to FIG. 10, one of the benefits of snapshots is the ability to capture the state of a storage volume such that it can be restored at a later time. FIG. 10 illustrates a method 1000 for rolling back a storage volume to a previous snapshot, particularly for a storage volume having one or more clone snapshots.

The method 1000 includes receiving 1002, by the storage manager 102, an instruction to rollback a storage volume to a particular snapshot SN. The method 1000 may then include processing 1004 each snapshot that is a represented by a descendent node of the node representing snapshot SN in the snapshot hierarchy, i.e. snapshots SN+1 to SMAX, where SMAX is the last principal snapshot that is a descendent of snapshot SN (each "descendent snapshot"). For each descendent snapshot, processing 1004 may include evaluating 1006 whether the each descendent is an ancestor of a node representing a clone snapshot. If not, then the storage manager 102 may instruct all storage nodes 106 storing segments mapped to the descendent snapshot to free 1008 these segments, i.e. delete entries from the segment map referencing the descendent snapshot and marking corresponding PSIDs 316 as free in the segment map 314.

If the descendent snapshot is found 1006 to be an ancestor of a clone snapshot, then step 1008 is not performed and the snapshot and any segments allocated to it are retained.

Figure 11:
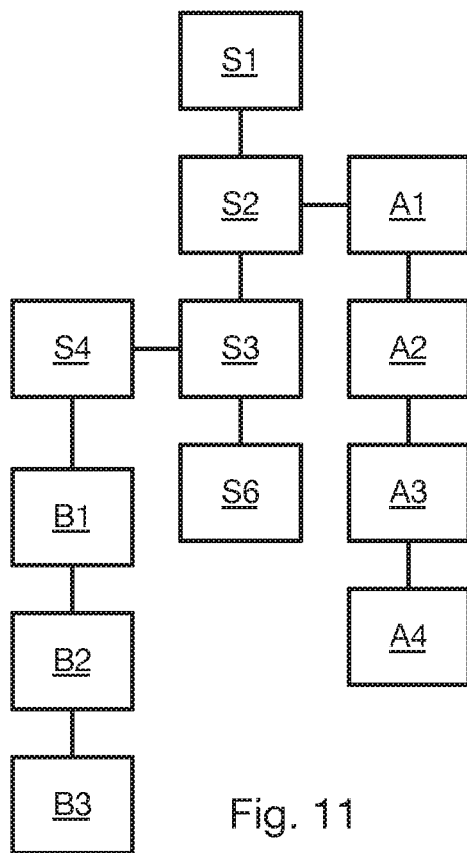
FIG. 11 illustrates the snapshot hierarchy of FIG. 9 as modified according to the method of FIG. 10 in accordance with an embodiment of the present invention.

FIG. 11 illustrates the snapshot hierarchy following execution of the method 1000 with respect to the snapshot represented by node S3. As is apparent, snapshot S5 has been removed from the hierarchy and any segments corresponding to these snapshots will have been freed on one or more storage nodes 106.

However, since node S4 is an ancestor of clone node B1, it is not removed and segments corresponding to it are not freed on one or more storage nodes in response to the roll back instruction. Inasmuch as each snapshot contains only data written to the storage volume after it was created, previous snapshots may be required to recreate the storage volume. Accordingly, the snapshots of nodes S3 to S1 are needed to create the snapshot of the storage volume corresponding to node B1.

Subsequent principal snapshots of the storage volume will be added as descendants of the node to which the storage volume was rolled back. In the illustrated example, a new principal snapshot is represented by node S6 that is an immediate descendent of node S3. Node S4 is only present due to clone node B1 and therefore may itself be classified as a clone node in the hierarchy in response to the rollback instruction of step 1002.

Note that FIG. 11 is a simple representation of a hierarchy. There could be any number of clone snapshots, clones of clone snapshots and descendent snapshots of any of these snapshots represented by nodes of a hierarchy. Accordingly, to roll back to a particular snapshot of a clone, the method 1000 is the same, except that descendants of the clone snapshot are treated the same as principal snapshots and clones of any of these descendants are treated the same as a clone snapshot.

Figure 12:
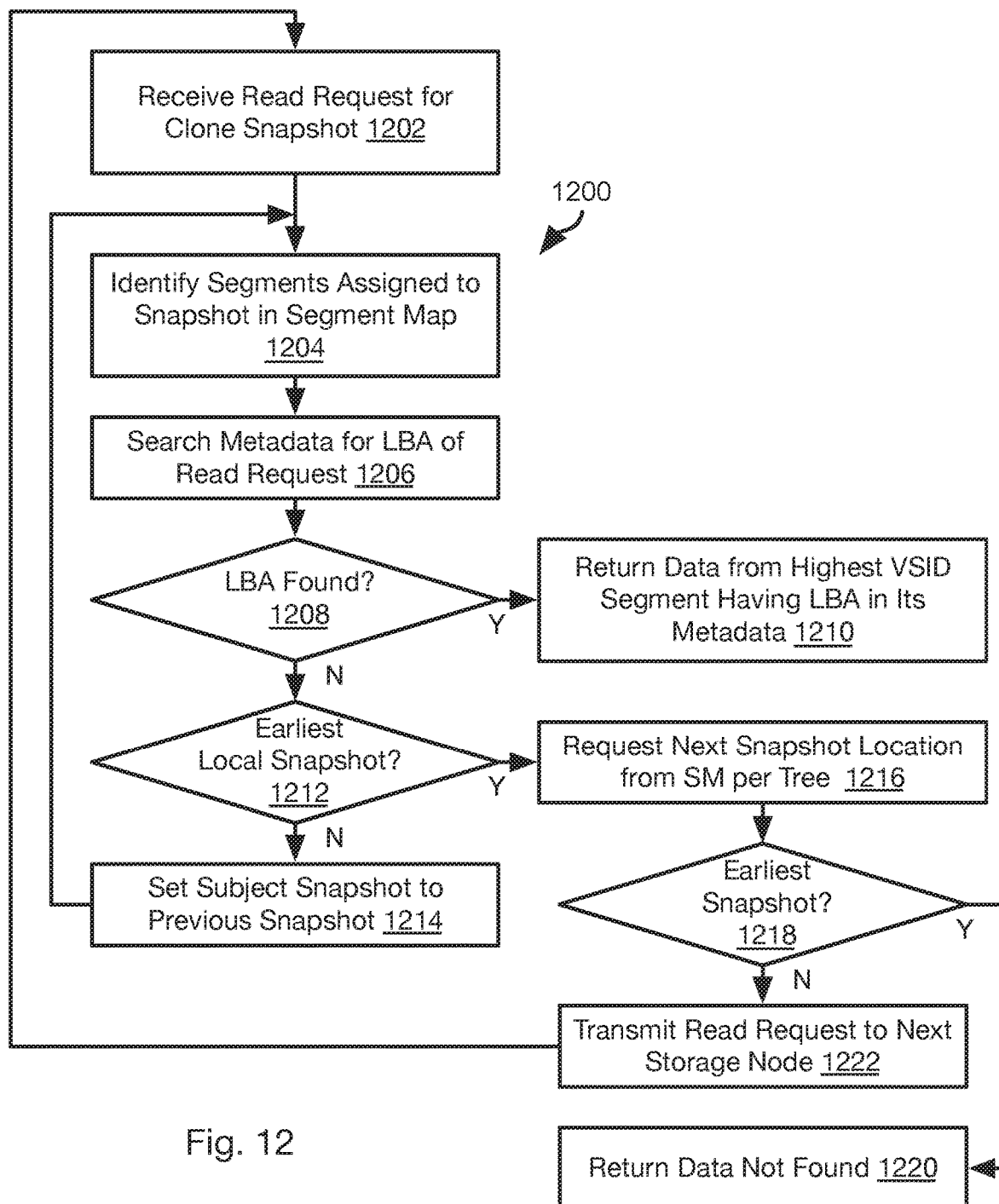
FIG. 12 is a process flow diagram of a method for reading from a clone snapshot in accordance with an embodiment of the present invention.

Referring to FIG. 12, the illustrated method 1200 may be used to execute a read request with respect to a storage volume that is represented by a hierarchy generated as described above with respect to FIGS. 8 through 11. The illustrated method 1200 may also be executed with respect to a storage volume that includes only principal snapshots that are distributed across multiple storage nodes, i.e., all the segments corresponding to snapshots of the same slice of the storage volume are not located on the same storage node 106. In that case, the hierarchy stored on the storage manager 102 stores the location of the segments for each snapshot and therefore enables them to be located.

The method 1200 may be executed by a storage node 106 ("the current storage node") with information retrieved from the storage manager 102 as noted below. The method 1200 may include receiving 1202 a read request, which may include such information as a snapshot ID, volume ID (and/or slice ID), LBA, and size (e.g. number of 4 KB blocks to read).

Note that the read request may be issued by an application executing on a compute node 110. The compute node 110 may determine which storage node 106 to transmit the read request using information from the storage manager 102. For example, the compute node 110 may transmit a request to obtain an identifier for the storage node 102 storing data for a particular slice and snapshot of a storage volume. The storage manager may then obtain an identifier and/or address for the storage node 106 storing that snapshot and slice of the storage volume from the hierarchical representation of the storage volume and return it to the requesting compute node 110. For example, the storage manager 102 may retrieve this information from the node in the hierarchy representing the snapshot included in the read request.

In response to the read request, the current storage node performs the algorithm illustrated by subsequent steps of the method 1200. In particular, the method 1200 may include identifying 1204 segments assigned to the snapshot ID of the read request in the segment ("the subject snapshot").

The method 1200 may include searching 1206 the metadata of the segments identified in step 1204 for the LBA of the read request. If the LBA is found, the data from the highest numbered segment having the LBA in its metadata is returned, i.e. the data that corresponds to the last-written metadata entry including the LBA.

If the LBA is not found in any of the segments mapped to subject snapshot, then the method 1200 may include evaluating 1212 whether the subject snapshot is the earliest snapshot on the current storage node. If not, then steps processing continues at step 1204 with the previous snapshot set 1214 as the subject snapshot.

Steps 1204-1214 may be performed in the same manner as for steps 704-714 of the method 700, including the various modifications and variations described above with respect to the method 700.

In contrast to the method 700, if the LBA is not found in any of the segments corresponding to the subject snapshot for any of the snapshots evaluated, then the method 1200 may include requesting 1216 a location, e.g. storage node identifier, where an earlier snapshot for the volume ID or slice ID is stored. In response to this request, the storage manager 102 determines an identifier of a storage node 106 storing the snapshot corresponding to the immediate ancestor of the earliest snapshot stored on the current storage node in the hierarchy. The storage manager 102 may determine an identifier of the storage node 106 relating to the immediate-ancestor snapshot and that stores data for a slice ID and volume ID of the read request as recorded for the ancestor nearest ancestor node in the hierarchy of the node corresponding to the earliest snapshot stored on the current storage node.

If the current storage node is found 1218 to be the earliest snapshot for the storage volume ID and/or slice ID of the read request, then the data the storage manager 102 may report this fact to the storage node, which will then return 1220 a message indicating that the requested LBA is not available for reading, such as in the same manner as step 714 of the method 700.

If another storage node stores an earlier snapshot for the volume ID and/or slice ID of the read request, then the read request may be transmitted 1222 to this next storage node by either the current storage node or the storage manager 102. The processing may then continue at step 1202 with the next storage node as the current storage node. The read request transmitted at step 1222 may have a snapshot ID set to the latest snapshot ID for the storage volume ID and or slice ID of the original read request.

The method 1200 may be performed repeatedly across multiple storage nodes 106 until the earliest snapshot is encountered or the LBA of the read request is located.

Figure 13:
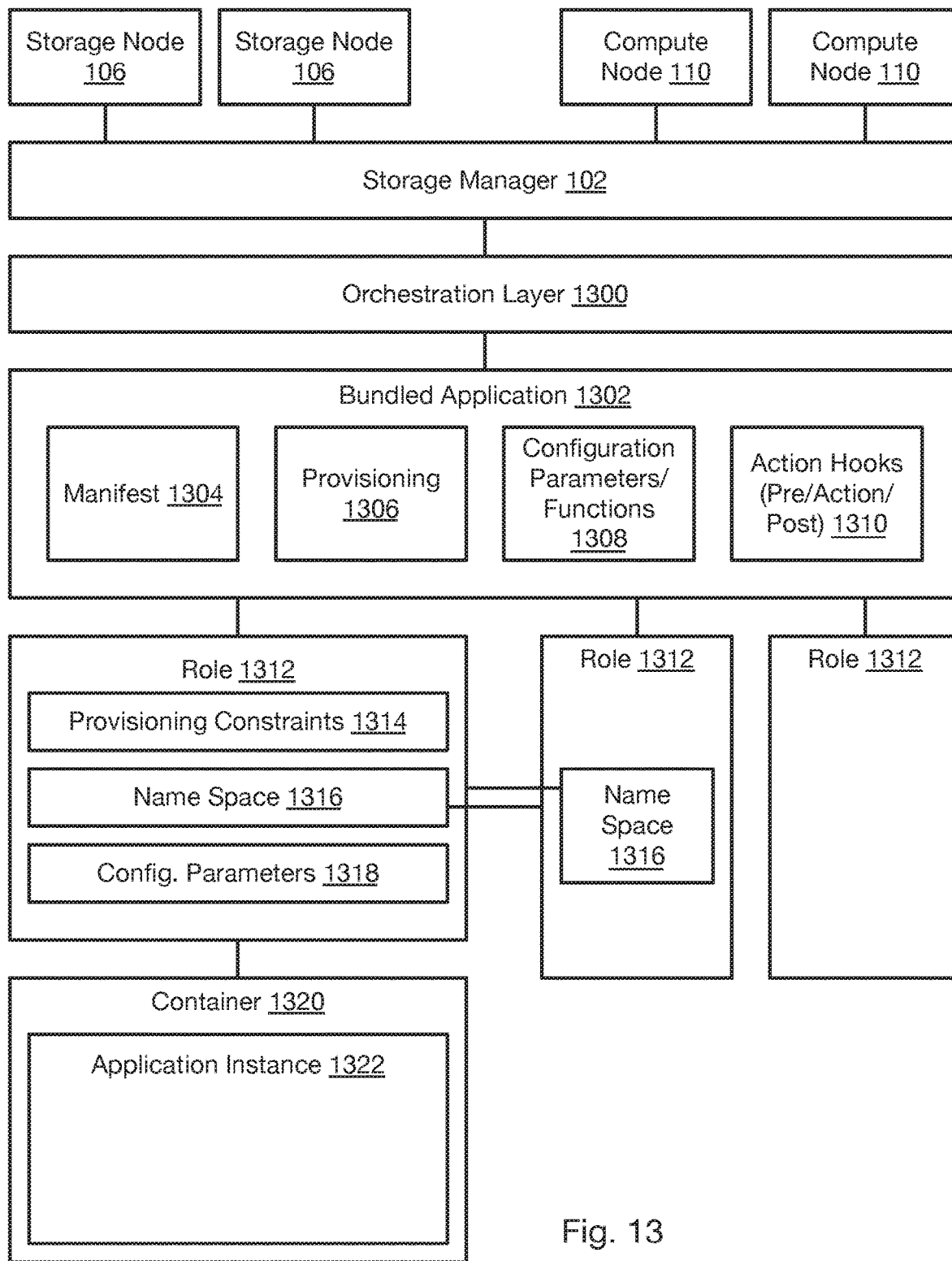
FIG. 13 is a schematic block diagram of components for implementing orchestration of multi-role applications in accordance with an embodiment of the present invention.

Referring to FIG. 13, storage according to the above-described methods and systems may be incorporated into an application-orchestration approach. In the illustrates approach, an orchestration layer 1300 implements a bundled application 1302 including a plurality of roles. In the following description, "bundled application" refers to a bundle of applications as implemented using the orchestration layer. A "role" is an instance of an executable that is managed by the orchestration layer as described herein as part of the bundled application. Accordingly, a "role" may itself be a standalone application, such as a database, webserver, blogging application, or any other application. Examples of roles include the roles used to implement multi-role applications such as CASSANDRA, HADOOP, SPARK, DRUID, SQL database, ORACLE database, MONGODB database, WORDPRESS, and the like. For example, in HADOOP, roles may include one or more of a named node, data node, zookeeper, and AMBARI server.

The orchestration layer 1300 may implement a bundled application 1302 defining roles and relationships between roles as described in greater detail below. The bundled application 1302 may include a manifest 1304 that defines the roles of the bundled application 1302, which may include identifiers of roles and possibly a number of instances for each role identified. The manifest 1304 may define dynamic functions define how the number of instances of particular role may grow or shrink depending on usage. The orchestration layer 1300 may then create or remove instances for a role as described below as indicated by usage and one or more functions for that role. The manifest 1304 may define a topology of the bundled application 1302, i.e. the relationship between roles, such as services of a role that are accessed by another role.

The bundled application 1302 may include provisioning 1306. The provisioning 1306 defines the resources of storage nodes 106 and compute nodes 110 required to implement the bundle. The provisioning 1306 may define resources for the bundle as a whole or for individual roles. Resources may include a number of processors (e.g., processing cores), an amount of memory (e.g., RAM (random access memory), an amount of storage (e.g., GB (gigabytes) on a HDD (Hard Disk Drive) or SSD (Solid State Drive)). As described below, these resources may be provisioned in a virtualized manner such that the bundled application 1302 and individual roles 1312 are not informed of the actual location or processing and storage resources and are relieved from any responsibility for managing such resources. In particular, storage resources may be virtualized by the storage manager 102 using the methods described above such that storage volumes are allocated and used without requiring the bundled application 1302 or roles to manage the underlying storage nodes 106 and storage device 108 on which the data of the storage volumes is written.

Provisioning 1306 may include static specification of resources and may also include dynamic provisioning functions that will invoke allocation of resources in response to usage of the bundled application. For example, as a database fills up, additional storage volumes may be allocated. As usage of a bundled application increases, additional processing cores and memory may be allocated to reduce latency.

A bundled application 1302 may further include configuration parameters 1308. Configuration parameters may include variables and settings for each role of the bundle. The configuration parameters are defined by the developer of the role and therefore may include any example of such parameters for any application known in the art. The configuration parameters may be dynamic or static. For example, some parameters may be dependent on resources such as an amount of memory, processing cores, or storage. Accordingly, these parameters may be defined as a function of these resources. The orchestration layer will then update such parameters according to the function in response to changes in provisioning of those resources that are inputs to the function. For example, CASSANDRA defines a variable Max_Heap_Size that is normally set to half the memory limit. Accordingly, as the memory provisioned for a CASSANDRA role increases, the value of Max_Heap_Size may be increased to half the increased memory.

The bundled application 1302 may further include action hooks 1310 for various actions that may be taken with respect to the bundled application and/or particular roles of the bundled applications. Actions may include some or all of stopping, starting, restarting, taking snapshots, cloning, and rolling back to a prior snapshot. For each action, one or more action hooks may be defined. A hook is a programmable routine that is executed by the orchestration layer when the corresponding action is invoked. A hook may specify a script of commands or configuration parameters input to one or more roles in a particular order. Hooks for an action may include a pre-action hook (executed prior to implementing an action), an action hook (executed to actually implement the action), and a post action hook (executed following implementation of the action).

The bundled application 1302 may define a plurality of roles 1312. Each role may include one or more provisioning constraints. As noted above, the bundled application 1302 and roles 1312 are not aware of the underlying storage nodes 106 and compute nodes 110 inasmuch as these are virtualized by the storage manager 102 and orchestration layer 1300. Accordingly, any constraints on allocation of hardware resources may be included in the provisioning constraints 1314. As described in greater detail below, this may include constraints to create separate fault domains in order to implement redundancy and constraints on latency.

The role 1312 may define a name space 1316. A name space 1316 may include variables, functions, services, and the like implemented by a role. In particular, interfaces and services exposed by a role may be included in the name space. The name space may be referenced through the orchestration layer 1300 by an addressing scheme, e.g. <Bundle ID>.<Role ID>.<Name>. In some embodiments, references to the namespace 1316 of another role may be formatted and processed according to the JINJA template engine or some other syntax. Accordingly, each role 1312 may access the variables, functions, services, etc. in the name space 1316 of another role 1312 on order to implement a complex application topology. In some instances, credentials for authorizing access to a role 1312 may be shared by accessing the namespace 1316 of that role.

A role 1312 may further include various configuration parameters 1318 defined by the role, i.e. as defined by the developer that created the executable for the role. As noted above, these parameters 1318 may be set by the orchestration layer 1300 according to the static or dynamic configuration parameters 1308. Configuration parameters may also be referenced in the name space 1316 and be accessible (for reading and/or writing) by other roles 1312.

Each role 1312 may include a container 1320 executing an instance 1322 of the application for that role. The container 1320 may be a virtualization container, such as a virtual machine, that defines a context within which the application instance 1322 executes, facilitating starting, stopping, restarting, and other management of the execution of the application instance 1322.

Note that a bundled application 1302 as configured in the foregoing description may be instantiated and used or may be saved as a template that can be used and modified later.

Figure 14:
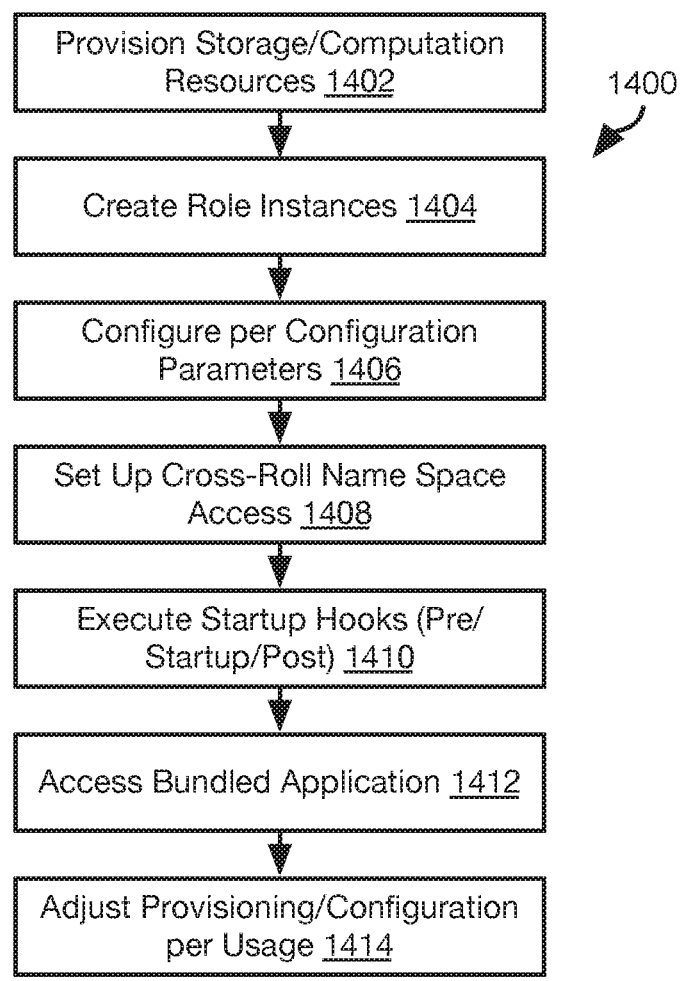
FIG. 14 is a process flow diagram of a method for orchestrating the deployment of a multi-role application in accordance with an embodiment of the present invention.

FIG. 14 illustrates a method 1400 for executing a bundled application 1302 using the orchestration layer 1300. The method 1400 may include provisioning 1402 storage and computation resources according to the provisioning 1306. This may include allocating storage volumes according to the storage requirements, assigning the storage volumes to storage nodes 106, and selecting a compute node 110 or storage node 106 providing the required computational resources (processor cores and memory).

The method 1400 may include creating 1404 role instances for the roles 1312 defined by the bundled application 1302. As described above, this may include creating a container 1320 and instantiating the application instance 1322 of the role 1312 within the container 1320. The order in which instances 1322 are created and started may be defined in the manifest 1304.

The method 1400 may include configuring 1406 each role according to the configuration parameters 1308, including executing any included functions to determine values for dynamic parameters. As noted above, starting a bundled application 1302 may further include setting up 1408 the roles 1312 to reference resources in the name space 1316 of another role 1312. For example, a webserver may be configured to access a database by referencing configuration parameters and services implemented by the database.

The method 1400 may further include executing 1410 any hooks 1310 defined for the initial startup of the bundled applications. Accordingly, pre-startup, startup, and post startup hooks may be executed. Some or all of the functions of steps 1402-1410 may be defined as part of the pre-startup hook. Other functions may also be performed prior to steps 1402-1408 as defined by a pre-startup hook.

The actual commencement of execution of the instances 1322 of the bundled application 1302 may be performed in an order specified by the startup hook and may include performing any attendant functions of these instances 1322 as specified by the startup hook. Following startup, one or more other actions may be performed as specified by the developer in the post-startup hook. These actions may invoke functions of the instances 1322 themselves or executed by the orchestration layer 1300 outside of the instances 1322, such as with respect to an operating system executing the containers 1320 for the instances 1322.

The bundled application 1302 may then be accessed 1412 in order to perform the programmed functionality of the application instances 1322. As usage occurs, processing resources will be loaded and storage may be filled. The method 1400 may further include adjusting 1414 provisioning according to this usage and may performed adjustment to configuration parameters of the roles 1312 according to this provisioning as defined by the provisioning 1306 and configuration functions 1308.

As noted above, instances of roles may also be created or removed according to usage. Accordingly, where indicate by the manifest 1304, instances 1322 for a role 1312 may be created according to steps 1402-1410 throughout execution of the bundled application 1302 as defined by one or more dynamic functions in the manifest 1304 for that role 1312.

Figure 15:
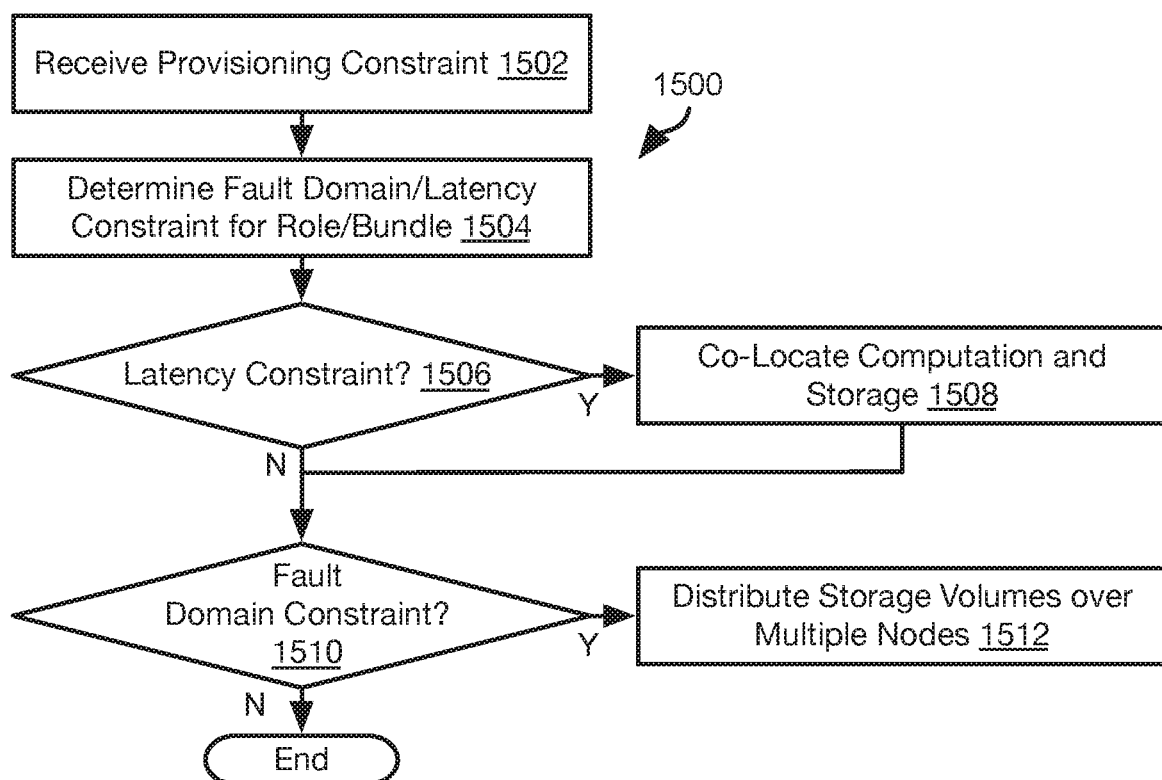
FIG. 15 is a process flow diagram of a method for implementing provisioning constraints in accordance with an embodiment of the present invention.

Referring to FIG. 15, the illustrated method 1500 may be used to implement provisioning constraints 1314 for a role 1312 or constraints for an entire bundled application 1302. The method 1500 may be executed by the orchestration layer 1300, storage manager 102, or a combination of the two.

The method 1500 may include receiving 1502 the provisioning constraint 1314 for one or more roles 1312 of the bundled application 1302 and determining 1504 whether the constraint 1314 specify one or both of a fault domain constraint and a latency constraint.

If a latency constraint is found 1506 to be included for a role 1312, then computational resources and storage resources to be provisioned for the role 1312 may be constrained 1508 to be co-located. In particular, latency may be specified in terms of (a) a minimum network delay, (b) a minimum network throughput, (c) an explicit constraint to place computation and storage resources in the same sub-network, or (d) an explicit constraint to place computation and storage resources on the same node, i.e. a hybrid compute and storage node 110, 106 that performs the functions of both types of nodes with a single computer.

This constraint may be used by the orchestration layer to assign computing and storage resources to roles 1312 and storage volumes of the bundled application. For example, one or more storage volumes for the role 1312 will be assigned to storage nodes 106 that can either (a) meet the latency requirement with respect to compute nodes 110 allocated to the role 1312 (b) also provide the computational resources required for the role 1312.

The orchestration layer 1300 may include a resource manager in that accounts for all of the compute storage requirements and constraints and creates a resource allocation plan. This plan describes the virtual nodes (containers 1320) that make up the bundled application 1302. Each virtual node has allocations of processor cores, memory and storage volumes. The resource manager determines the compute host (compute node 110 or hybrid node) for each virtual node and a set of devices for each storage volume of the virtual node. The orchestration layer 1300 sends this mapping of the storage volumes to physical devices to the storage manager 102, which implements the storage allocation.

If the constraint for a role 1312 is found 1510 to include a fault domain constraint, then storage volumes for the role 1312 may be distributed 1512 among the storage nodes 106 of the distributed storage system 100 according to this requirement. For example, if storage volume B is a redundant (e.g., replica or backup) copy of storage volume A, the fault domain constraint may indicate this fact. Accordingly, the storage manager 102 may assign storage volume B to a different storage node 106 than storage volume A. Various degrees of constraint may be specified. For example, a fault domain constraint may simply require a different storage device 108 but not require a different storage node 106. A fault domain constraint may require that storage nodes 106 to which storage volumes are assigned by in separate subnetworks, different geographic locations, or have some other degree of separation. Similar fault domain constraints may be specified for roles 1312, which may be constrained to execute on different compute nodes 110 in order to provide redundant services and reduce downtime.

The provisioning constraints 1502 based on fault domains and/or latency may be combined with one or more other constraints. For example, a performance constraint (IOPs/second) for a storage node may be imposed. Accordingly, only those compute nodes meeting the performance requirement and the fault domain and/or latency requirements will be selected for provisioning.

As noted above, provisioning 1306 may define a processing requirement, such as a number of processing cores and an amount of storage for a role. Accordingly, compute nodes 110 may be selected at step 1508 such that both the latency requirement and processing requirement are met.

Figure 16:
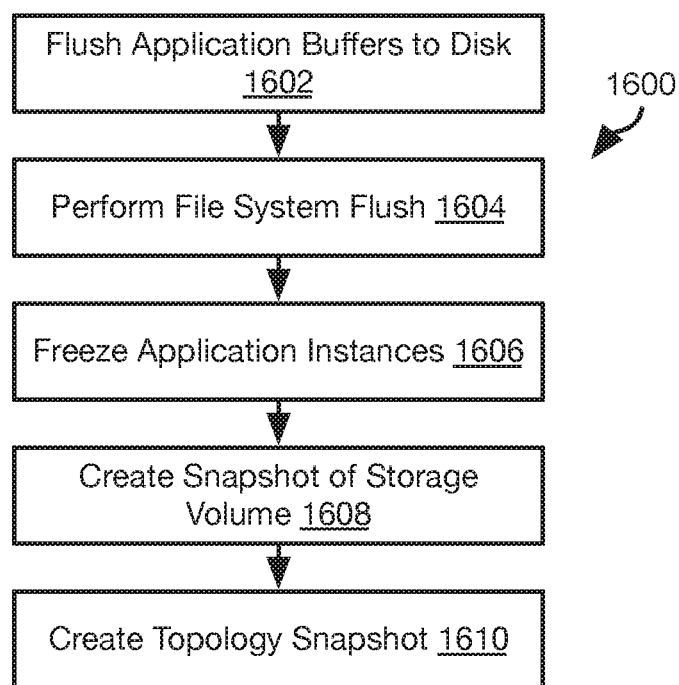
FIG. 16 is a process flow diagram of a method for creating a snapshot of a multi-role application in accordance with an embodiment of the present invention.

Referring to FIG. 16, the illustrated method 1600 may be executed by the orchestration layer 1302 with respect to a bundled application 1302 in order to create a snapshot of the bundled application 1302 that can be later restored (see the method 1700 of FIG. 17).

The method 1600 may include flushing 1602 application buffers to disk. In many instances, performance of an application is accelerated by maintaining data in a cache in memory, such that data in the cache is accessed and updated without requiring writing to a disk in many instances, as known in the art. Accordingly, this buffer may be flushed 1602 to disk by writing all valid data (i.e., not outdated due to a subsequent write) in the cache to the storage device 108 to which that data is addressed, e.g., to which the storage volume referenced by the data is assigned.

In a like manner, a file system flush may be performed 1604. Performing a file system flush may include ensuring that all IOPs pending to be performed by the file system have been executed, i.e. written to disk. As for step 1602, data written to a cache for the file system this is valid may be written to a storage device 108 to which the data is addressed, e.g., to which the storage volume referenced by the data is assigned.

The method 1600 may then include freezing 1606 the application instances 1322 of each role 1312. In particular, inasmuch as each instance 1322 is executing within container 1320, the containers 1320 for the roles 1312 may be instructed to pause execution of each instance 1322. This may include stopping execution and saving a state of execution of each instance 1322 (state variables, register contents, program pointers, function stack, etc.).

The method 1600 may further include creating 1608 a snapshot of storage volumes provisioned for the bundled application. This may include executing the method 200 of FIG. 2 or any of the above-described approaches for implementing a snapshot of a storage volume.

The method 1600 may further include creating 1610 a topology snapshot for the bundled application 1302. The topology of an application may include some or all of the following information as constituted at the time of executing step 1610 a listing of the roles 1312, which may include one or more instances 1322 of the same role 1322, relationships between application instances 1322 of roles 1312 (name space cross-references, configuration parameters), storage volumes assigned to roles 1312, or other information that describes the topology of the bundled application 1302. Applications may create metadata describing their state of operation. This data may also be saved as part of the topology snapshot.

After the snapshot is created according to the method 1600, the application instances may be resumed, with the application itself not suffering any down time in some embodiments. The bundled application 1302 may then continue to operate. If desired, the application may then be rolled back to the snapshot created according to the method 1600, as described below with respect to FIG. 17.

Figure 17:
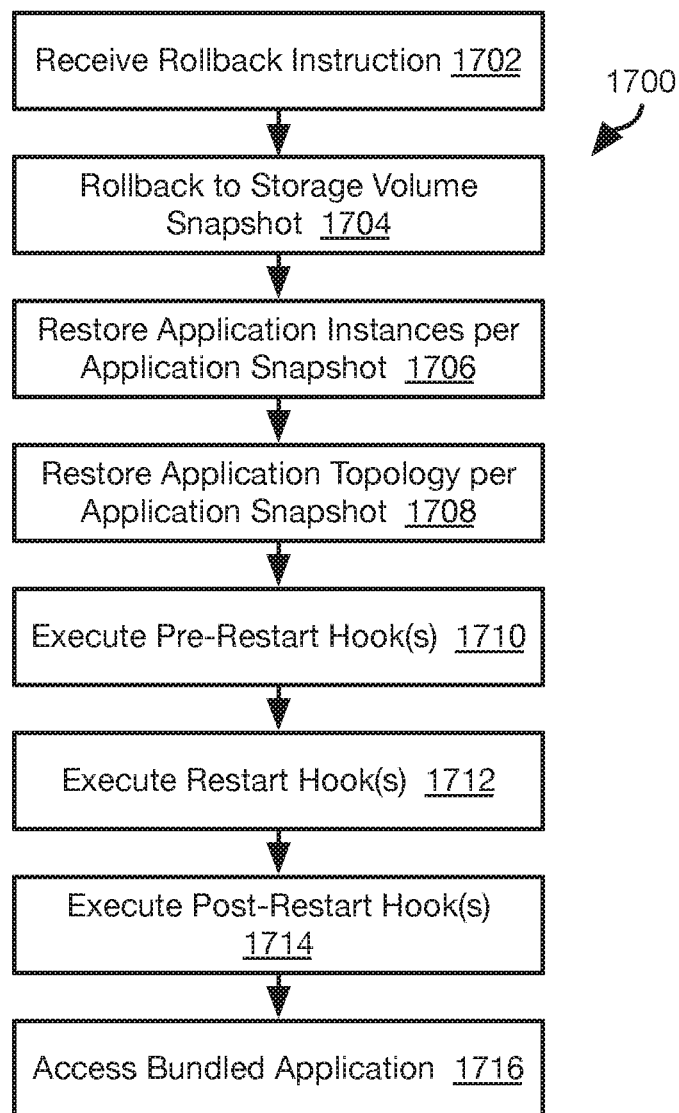
FIG. 17 is a process flow diagram of a method for rolling back a multi-role application in accordance with an embodiment of the present invention.

FIG. 17 illustrates a method 1700 for rolling back a bundled application 1302 to a snapshot, such as a snapshot created according to the method 1600. The method 1700 may be executed by one or both of the orchestration layer 1300 and the storage manager 102.

The method 1700 includes receiving 1702 a rollback instruction, such as from an administrator desiring to return to a stable version of the bundled application 1302. The remaining steps of the method 1300 may be executed in response to the rollback instruction.

The method 1700 may include rolling 1704 back storage volumes assigned to the bundled application 1302 to the snapshots created for the snapshot of the bundled application 1302 (e.g., at step 1608 of the method 1600). This may include executing the method 1000 of FIG. 10 or performing any other approach for rolling back a storage volume to a prior state.

The method 1700 may include restoring 1706 application instances from the application snapshot. As described above with respect to step 1606 of the method 1600, an application instance 1322 may be frozen. Accordingly, data describing a state of execution of the application instance 1322 may be reloaded into a container 1302 for that instance. If needed, the container for that application instance 1322 may be created and the instance 1322 loaded into it prior to loading the state of execution. This is particularly the case where the number of application instances has changed since the application snapshot was created.

The method 1700 may further include restoring 1708 the application topology saved for the bundled application at step 1610. Accordingly, relationships between application instances 1322 of roles 1312 (name space cross-references, configuration parameters), storage volumes assigned to roles 1312, or other information that describes the topology of the bundled application 1302 may be restored as it was at the time the application snapshot was created The method 1700 further include executing 1710, 1712, 1714 a pre-restart hook, restart hook, and post restart hook defined for the bundled application. As described above, each hook may be a routine defined by a developer to be executed for a particular action, restarting in this case. In step 1712, execution of the instances 1322 for the roles 1322 may be restarted, along with any other actions specified by the developer in the restart hook.

The bundled application 1302 as restored at steps 1704-1714 may then be accessed 1716 as defined by the programming of the application instances and the restored application topology.

Note that the snapshot of the bundled application 1302 may be restarted on different storage and compute nodes 106, 110 than those on which the bundled application 1302 was executing when the snapshot was created. Accordingly, the application snapshot may be restarted as a clone of the bundled application 1302 or moved to different hardware when executing the method 1700.

In some instances, the hooks of steps 1710, 1712, 1714 may be different when the application snapshot is being restarted as a clone as desired by a developer. For example, a developer may desire to scale the clone application to increase or decrease a number of databases, number of partitions of a database, or other aspect of the clone application. Accordingly, the hooks of steps 1710, 1712, 1714 may implement routines to implement this increase or decrease.

For example, some applications are able to automatically detect the number of partitions of a database. In such instances, some or all of the hooks 1710, 1712, 1714 may reduce the number of partitions in a database of the clone applications and rely on the application to discover this change. In other instances, some or all of the hooks 1710, 1712, 1714 may be programmed to configure an application to access the database with the reduced number of partitions where the application is unable to configure itself.

Figure 18A:
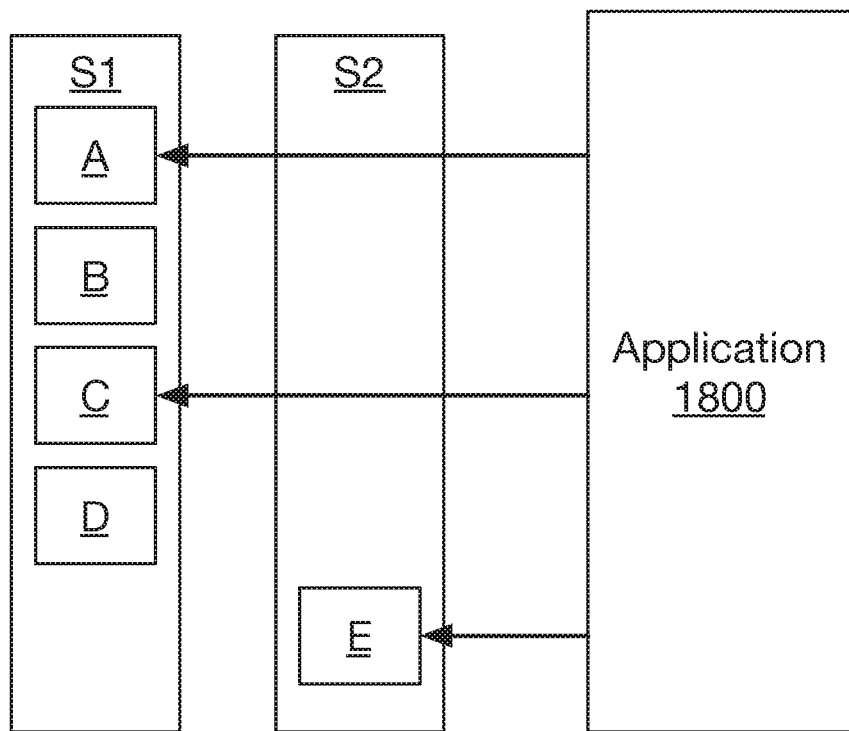
FIG. 18A is a diagram illustrating a thin clone in accordance with an embodiment of the present invention.
Figure 18B:
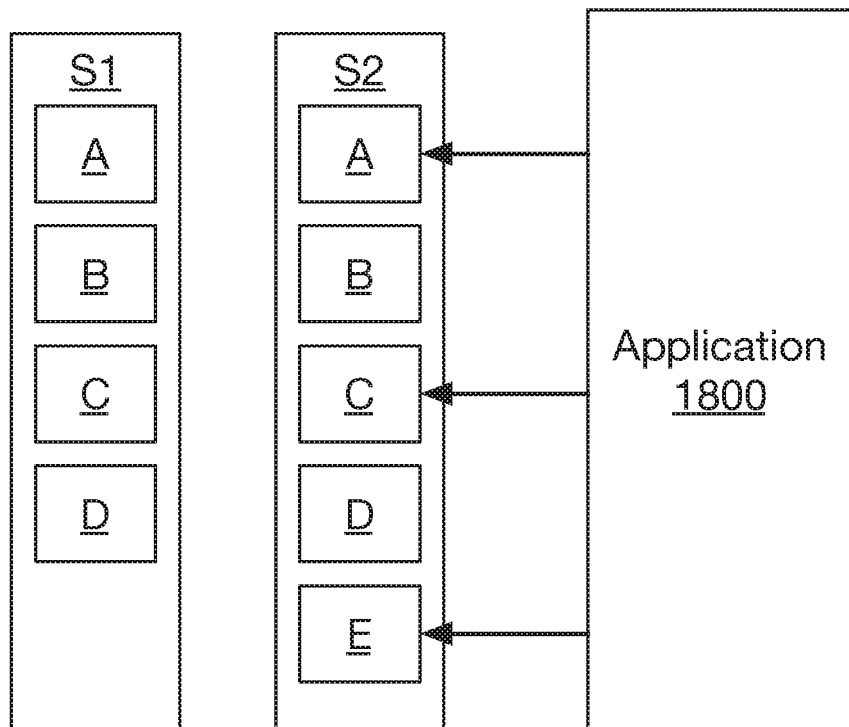
FIG. 18B is a diagram illustrating a thick clone in accordance with an embodiment of the present invention.

Referring to FIGS. 18A and 18B, a storage volume may be cloned in the form of a clone snapshot, such as according to the approach described above with respect to FIGS. 8 through 12.

FIG. 18A illustrates the approach of FIGS. 8 through 12, which is referred to herein as a "thin" clone. In this approach, a segment E allocated to the clone snapshot S2 after creation of the clone snapshot is written only to the clone snapshot. Segments A-D that were written to snapshot S1 prior to creation of clone snapshot S2 are not copied to snapshot S1. As noted above, snapshot S2 may be on a different storage node than snapshot S1. As described above with respect to FIG. 12, reads from an application 1800 for segments A-D will therefore be routed to the storage node storing snapshot S1. Reads for segment E can be processed locally.

This results in increase latency for these reads and increases loading of the storage node 106 storing snapshot S1. In the case where snapshot S1 is a production snapshot and snapshot S2 is only for testing, this loading may be undesirable. However, copying the segments A-D to snapshot S2 will also result in loading of the storage node 106 storing snapshot S1.

FIG. 18B illustrates a "thick" clone wherein the segments A-D are copied to snapshot S2. In this manner, all reads are handled by the storage node 106 storing the snapshot S2 and the production storage node 106 storing S1 is not loaded. However, the process of copying the segments A-D to snapshot S2 will also result in loading of the storage node 106 storing snapshot S1.

Figure 19:
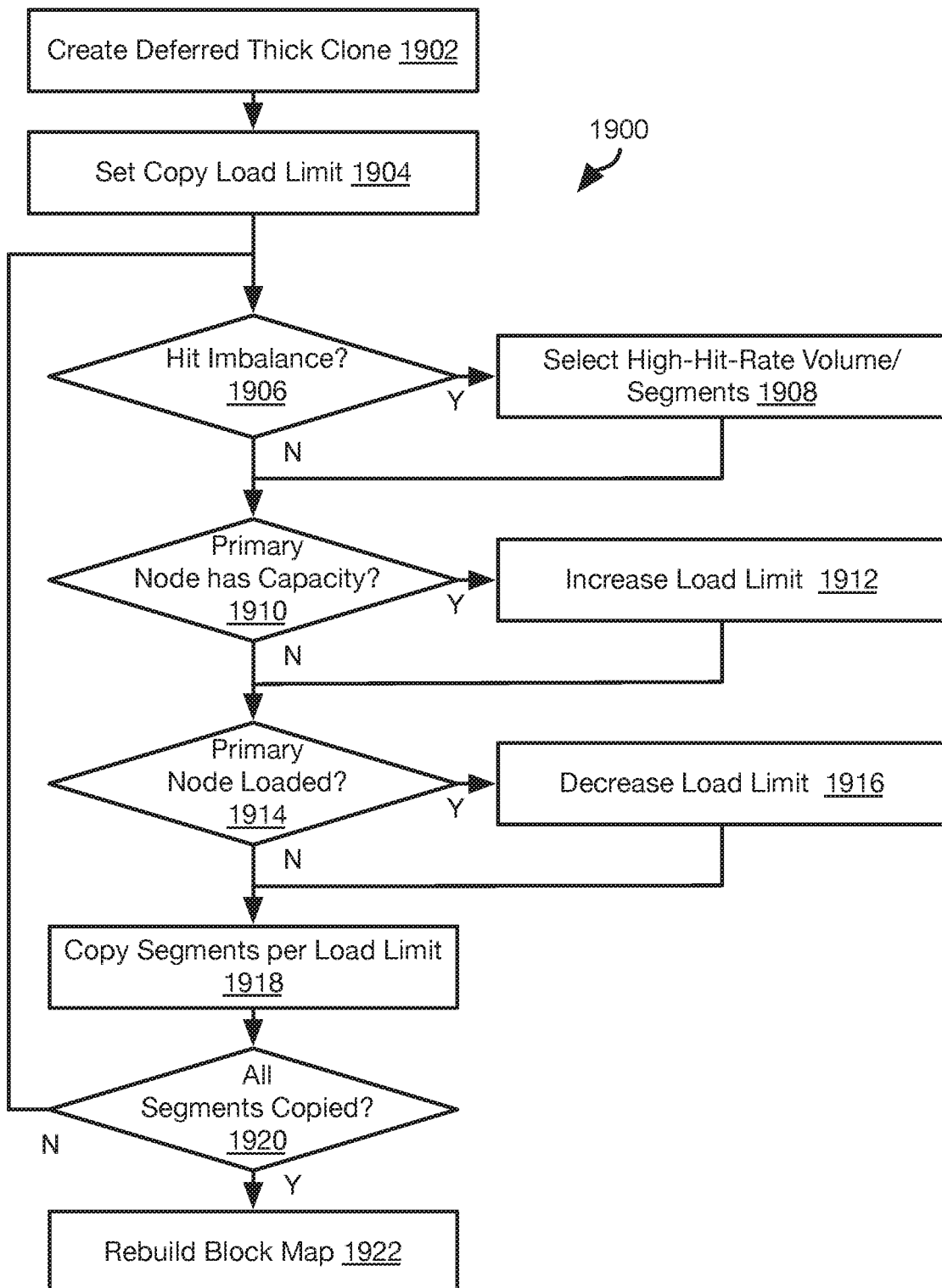
FIG. 19 is a process flow diagram of a method for implementing a deferred thick clone in accordance with an embodiment of the present invention.

FIG. 19 illustrates a method 1900 for implementing a "deferred thick clone" snapshot wherein segments of snapshot S1 are gradually copied to snapshot S2 while avoiding impacting performance of the production storage node 106 storing snapshot S1. The method 1900 may be executed by the storage node 106 storing the snapshot S2 ("the clone node") in cooperation with the storage node 106 storing the snapshot S1 ("the primary node"). The segments that are copied may have corresponding VSIDs as described above with respect to FIG. 3. The association of a VSID to a segment may maintained for the copy of the segment on the clone node. As described above, a storage volume may be divided into slices that may reside on different storage nodes 106. Accordingly, the method 1900 may be executed separately for each slice of the storage volume.

The method 1900 may include creating 1902 a deferred thick clone snapshot. This may include creating a thin clone snapshot (FIG. 8, FIG. 18A) S2. Creating 1902 a deferred thick clone snapshot may include allocating physical segments 324 and corresponding PSIDs 316 for each segment to be copied, such as prior to the segments being copied. In some embodiments, a user may instruct that a pre-existing thin clone snapshot is to be converted to a deferred thick clone snapshot according to the method 1900.

The segment map 314 may be updated to include the slice ID 310 (mapped to offset within cloned storage volume per slice map 308), and VSID 318, and possibly other information shown in FIG. 3, for each segment to be copied. The snapshot ID 340 in the segment map 340 may be set equal to S2, i.e. the snapshot identifier for the clone snapshot. The segment map 314 may be updated either prior to copying or each PSID 316 entry may be updated when the corresponding segment is copied to the physical segment 324 for that PSID 316.

The method 1900 may include setting 1904 a load limit, e.g., a limit on how much copying traffic the clone node may impose on the primary node. The load limit may be specified in terms of a number of bytes per second, a number of segments that may be copied at any one time, or other limits. The load limit may be time dependent. For example, at night or other periods of low usage, the load limit may be raised since production usage of the clone node will not be significantly impaired.

The load limit may also specify a maximum number of read IOPs that may be requested from the primary node in a given time period, e.g., maximum IOPs/second limit.

The method 1900 may include evaluating 1906 whether there is a hit imbalance for any of the segments that remain to be copied from the primary node to the clone node. In particular, if a large number of read requests are being routed to the primary node for a particular segment, then copying of that segment will reduce loading of the primary node and reduce latency for the clone node.

Accordingly, reads routed to the primary node may be tabulated for each segment referenced. Copying of segments may then be ordered according to the number of reads, with a segment having a higher number of reads being copied before a segment with a lower number. Where N segments may be in process of being copied simultaneously, then the N segments with the N highest read counts may be selected 1908 for copying first. Where no read imbalance exists, e.g., there is no significant difference in the number of reads per segment, the segments may be copied in order, e.g. in order of increasing VSIDs. What is significant may be a predetermined value. For example, where the highest read count is less than X percent of the average read count, the imbalance may be deemed insignificant, where X is a value between 1.1 and 2 or some other predetermined value greater than one.

In some instances, heavily used storage volumes and segments of a storage volume may be known by a developer based on the application topology, e.g., log files with heavy write usage and low read usage may be copied last whereas heavily read data may be read first. Accordingly, the ordering of copying of segments may be specified by a developer in order to copy those segments with a high hit rate first.

The method 1900 may include evaluating 1910 whether the primary node 1910 has spare capacity. For example, the primary node 1910 may transmit loading information, e.g. IOPs per second, to the clone node. For example, where this loading falls below a predetermined threshold, e.g. less than Y percent of the total IOP/second capacity of the primary node, then the load limit for copying segments may be increased 1912, where Y is predetermined value less than 100, such as 70. The amount of the load limit may be set to some predetermined function of the unused IOP/second capacity of the primary node, e.g. such that no more than Z percent of the capacity is used, such as Z=90 percent.

In a like manner, if the primary node is determined 1914 to be loaded, the load limit may be decreased, e.g. decreased such that the amount of unused capacity of the primary remains below an acceptable value, e.g., such that the load limit plus production loading of the primary node is less than Z percent.

Note that steps 1910-1916 may be performed at the storage device 108 level. Accordingly, loading of a storage device 108 is evaluated 1910, 1914 and the load limit increased 1912 or decreased 1916 based on the loading in the same manner described above.

Note also that the evaluations of steps 1906, 1910, 1914 may be performed at the container 1320 level. In particular, storage volumes allocated to instances 1322 that are generating higher read traffic relative to other instances 1322 may be copied before storage volumes allocated to the other instances 1322.

Copying of segments according to the load limit may be performed 1918. Steps 1906-1918 may be performed repeatedly until all segments are found 1920 to have been copied.

With reference to FIG. 3, Once all segments are copied the block map 338 may be rebuilt 1922 according to the copied segments. In particular, metadata (e.g., index pages 328) of the copied segments may be evaluated to determine the physical offset 334 of LBAs referenced in the copied segments. The entry for each LBA may then be updated to include the PSID 316 where the copied segments was written and the physical offset 334 for that LBA. As noted above, a block map 338 may be maintained for each slice of a logical storage volume. Accordingly, updating 1922 the block map may be performed for each slice referenced by the copied segments.

As noted above, the block map 338 indicates the location of the latest written data addressed to an LBA. Accordingly, references to an LBA 332 in a copied segment will not cause updating of the entry in the block map 338 for that LBA 332 where a later version of data has been written to that LBA 332.

For example, where a copied segment referencing an LBA 332 has a lower VSID than the VSID 318 mapped to the PSID 316 in the block map for that LBA 332, the entry for that LBA 332 in the block map 338 will not be updated for that copied segment.

The method 1900 may be performed in the context of cloning a bundled application 1302. Accordingly, the rollback method of FIG. 17 may be performed on different hardware then that on which the bundled application 1302 was executing when an application snapshot was created in order to create a clone of the bundled application. In such instances, storage volumes may be cloned as either thin clones, thick clones, or deferred thick clones. The clone application may therefore continue to access storage nodes 106 provisioned for the original bundled application 1302 until a deferred thick clone has completed copying of data from the original bundled application.

Figure 20:
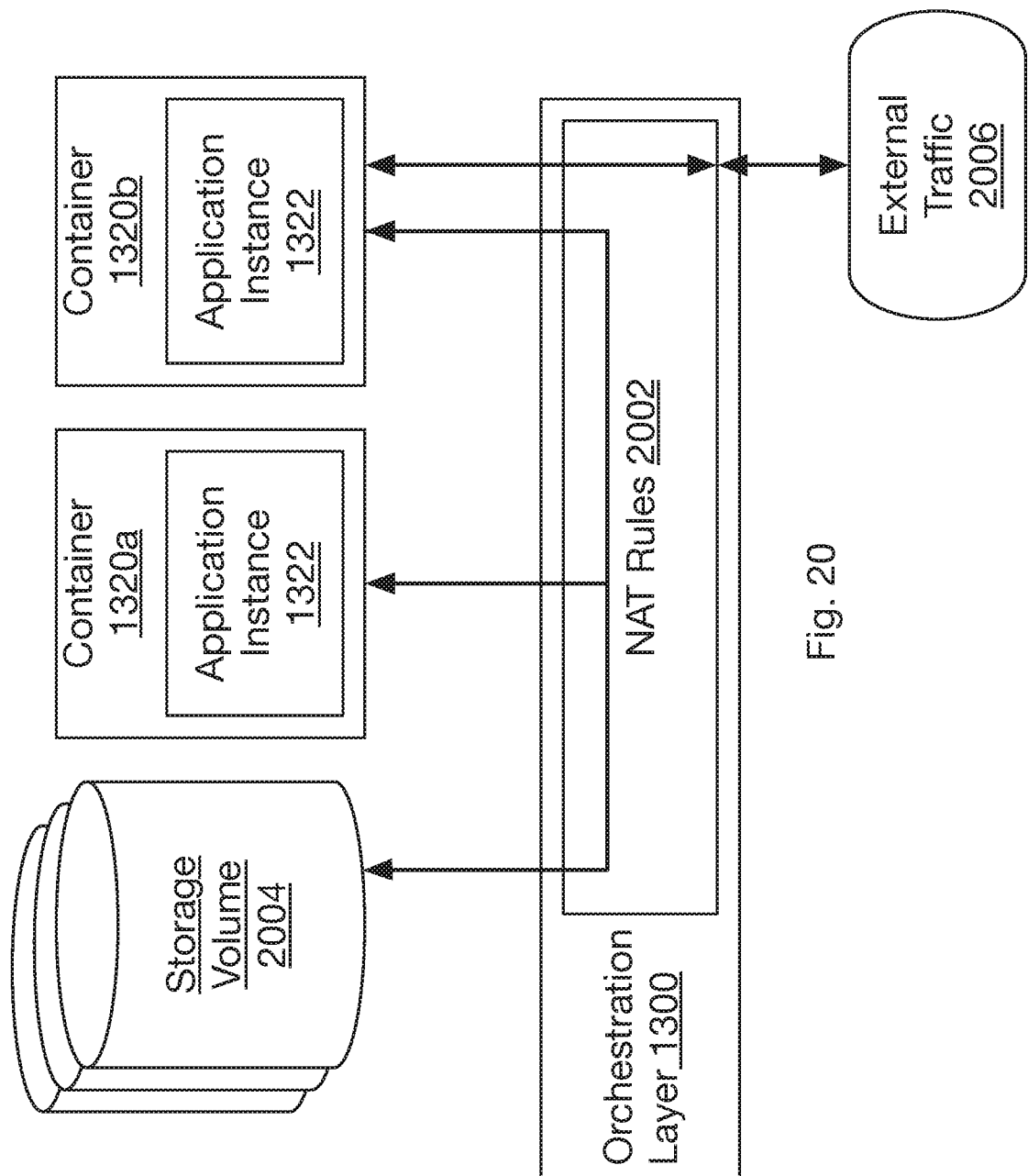
FIG. 20 is a diagram illustrating implantation of a fenced application clone in accordance with an embodiment of the present invention.

Referring to FIG. 20, a plurality of containers 1320a-1320b of a bundled application 1302 may have addresses assigned thereto that uniquely identify them. These addresses may be different and independent from the addresses (e.g., Internet Protocol (IP) addresses) of compute nodes 110 or hybrid nodes executing the containers 1320a-1320b. In the simplified illustration, there are only two containers 1320a-1320b. In some applications there may be tens or even hundreds of containers 1320a-1320b each with a corresponding container address.

Traffic between containers 1320a-1320b may be routed according to the addresses thereof, such as according to the approach described below with respect to FIG. 22. The orchestration layer 1300 may configure or implement network address translation (NAT) rules 2002 that may route packets addressed to a container based on references to the address of the container in the packets.

The containers 1320a-1320b may have one or more storage volumes 2004 mounted thereto. As described hereinabove, storage volumes may correspond to storage devices 108 on a different computer, such as on a remote storage node 106. Accordingly, read and write requests may be routed to the corresponding storage node 106, such as according to NAT rules 2002.

In many bundled applications, particularly HADOOP, there are many containers 1320a-1320b executing many roles and many instances of roles. Persistent data stored in the storage volumes 2004 of the containers 1320a-1320b may reference the addresses of one or more of the containers 1320a-1320b. These addresses may be stored throughout persistent data for the containers 1320a-1320b and precise knowledge of the operation of the bundled application may be required to determine where they occur.

When the bundled application is cloned (see discussion of FIG. 17), the storage volumes 2004 may also be cloned, including references to the original addresses of the containers 1320a-1320b of the original application. However, the containers 1320a-1320b of the clone may be assigned new addresses to enable distinguishing between the containers 1320a-1320b of the original application and the containers 1320a-1320b of the cloned application. These new addresses are used to route external traffic 2006 to and from the containers 1320a, 1320b.

Figure 21:
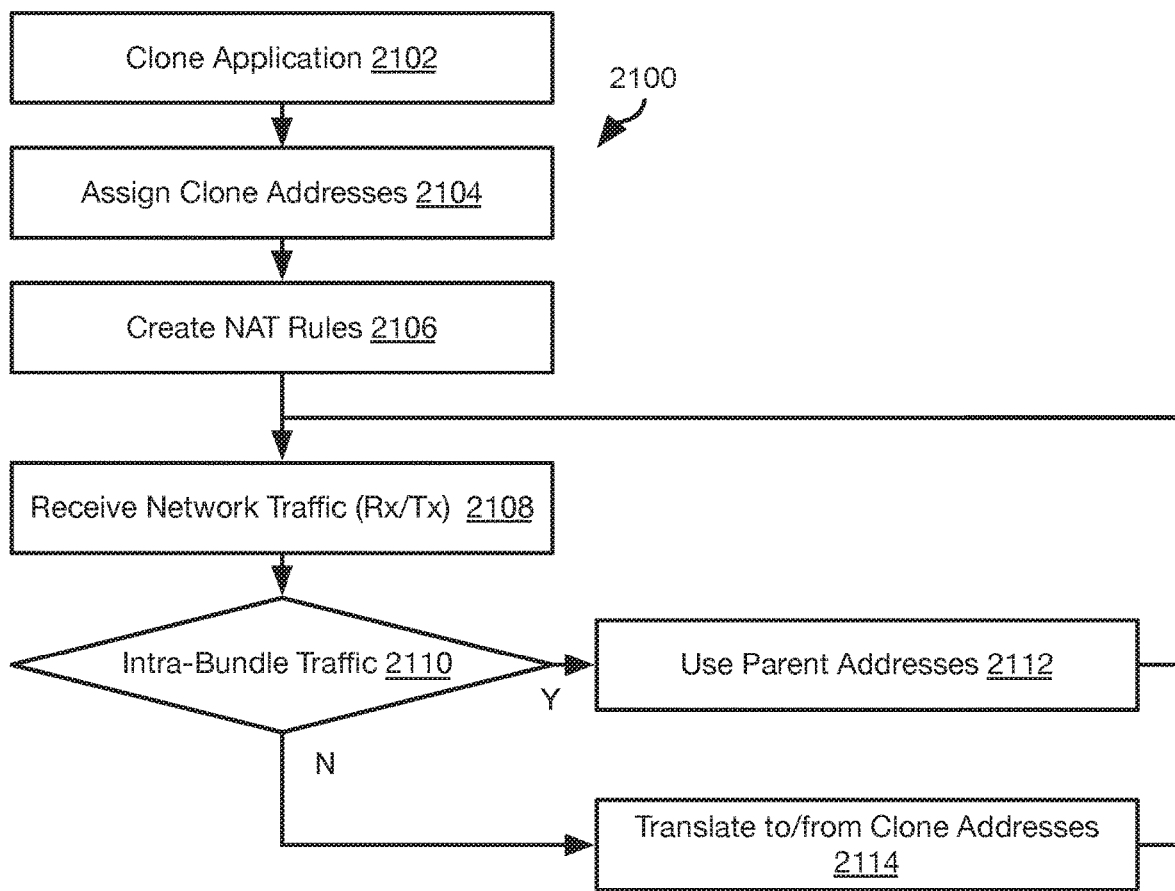
FIG. 21 is a process flow diagram of a method for implementing a fenced application clone in accordance with an embodiment of the present invention.

FIG. 21 illustrates a method that may be used to deal with this situation. The method 2100 may include cloning 2102 an application, such as in the manner described above in the discussion of FIG. 17. The method 2100 may presume that the original application continues operating. Where an application is simply moved, execution of the method 2100 may be omitted.

The method 2100 may include assigning 2104 new addresses to the containers 1320a-1320b of the clone application and creating 2106 NAT rules. The NAT rules may map the address for a container 1320a in the clone application to the address for the corresponding container 1320a in the parent application. A clone application may reproduce the topology of the parent application. Accordingly, each clone container may have a mapping in the NAT rules between the address of the each clone container and the address of the container of the parent application to which it corresponds in the topology and of which it the each clone container is a clone.

The NAT rules may further include an association among the addresses of the clone containers, i.e. an indication that all of the addresses of the clone containers belong to the same bundled application.

Figure 22:
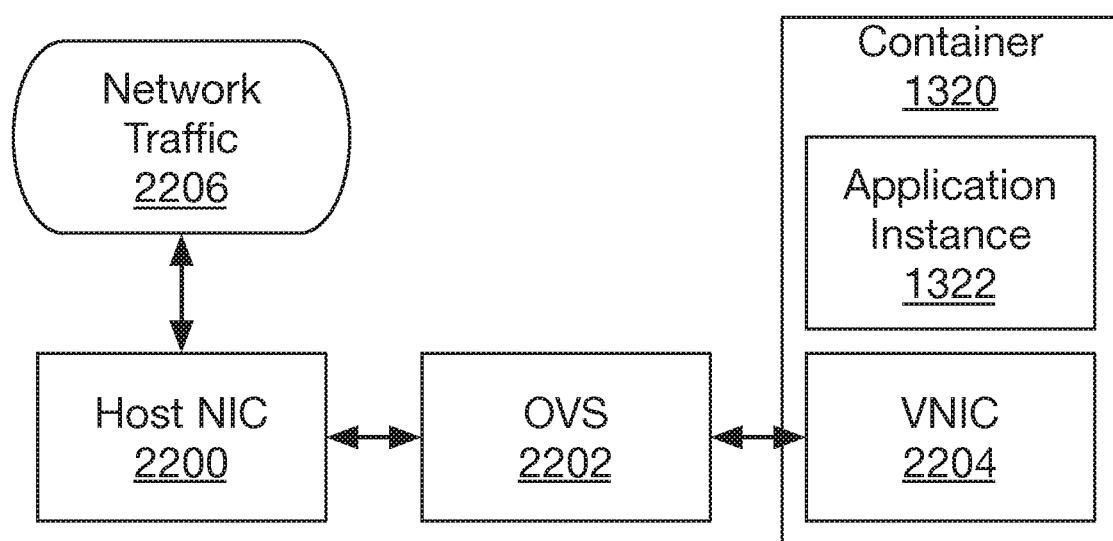
FIG. 22 is a schematic diagram of components for processing traffic in a bundled application in accordance with an embodiment of the present invention.

FIG. 22 illustrates an approach for virtualized network communication that may be used to implement the NAT approach described above with respect to FIG. 21.

A host computing device, such as a storage node 106 or compute node 110 may include a host network interface controller (NIC) 2200. The NIC 2200 may perform network communication and may have a static or dynamic IP address assigned to it. Accordingly, packets may be addressed to the host computing device using that IP address.

The host NIC 2200 may be associated with an open virtual switch (OVS 2202). The OVS 2202 inspects packets received from the host NIC 2200 and routes them to the container addressed by the packets. The OVS 2202 may also perform translation between parent and clone addresses for inbound and outbound traffic as described above. The container 1320 may implement a virtual NIC (VNIC) 2204 that receives these packets and provides them to the application instance 1322 executed by the container 1320 according to any network communication protocol known in the art.

Figure 23:
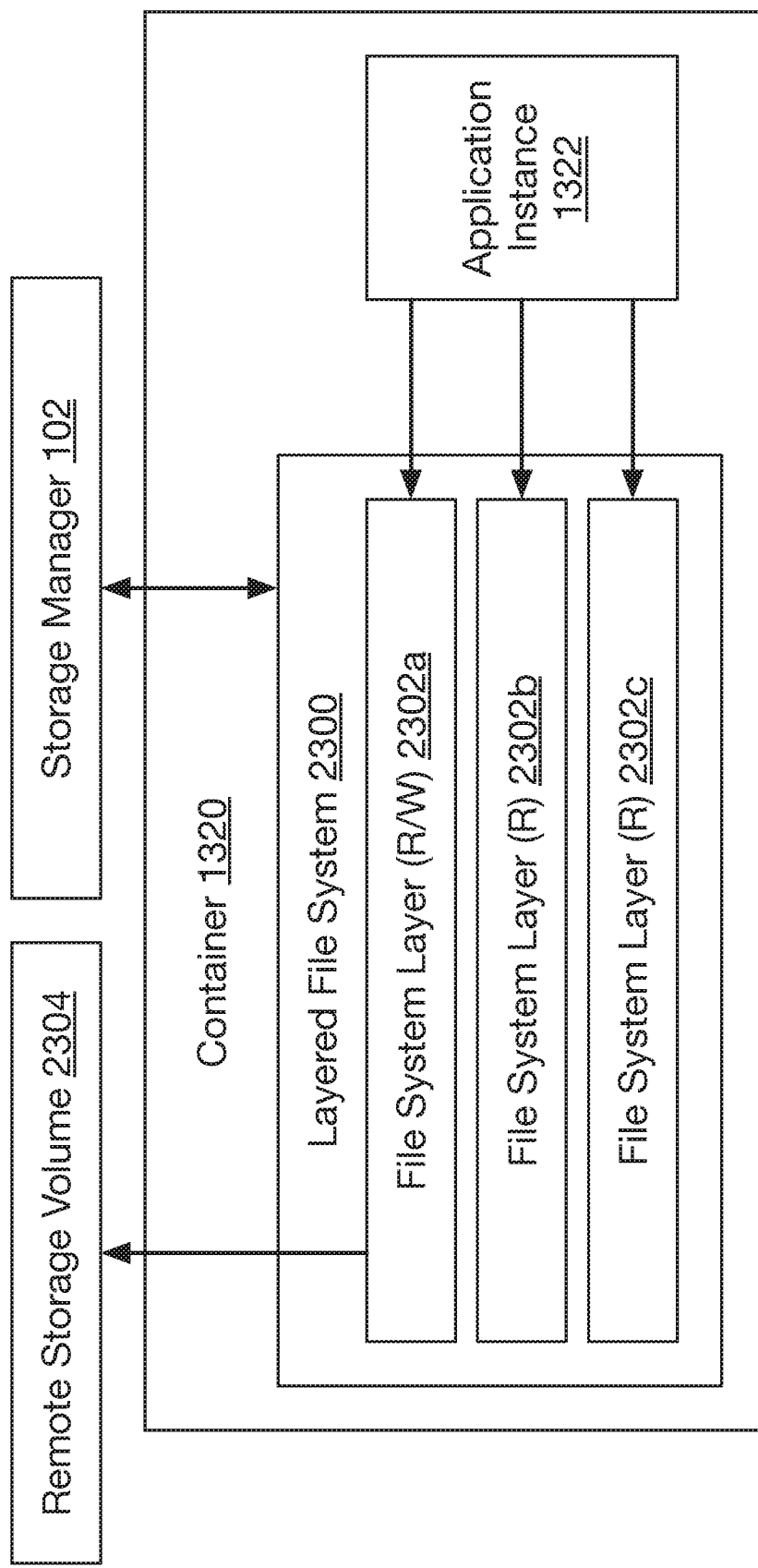
FIG. 23 is a diagram illustrating the use of a layered file system to improve application portability in accordance with an embodiment of the present invention.

Referring to FIG. 23, as noted above, containers 1320 may be implemented as DOCKER containers. However, DOCKER containers are not particularly suited for implementing stateful applications in which some or all of the state of an application is stored in persistent storage. This may be a disadvantage, particularly where a snapshot of an application is to be create and used for rolling back or cloning (see discussion of FIG. 17).

In the illustrated approach, a DOCKER container 1320 is modified to use an external graph driver plugin for storing persistent data. In the illustrated embodiment, the graph driver plugin implements a layered file system 2300. In the illustrated implementation, the layered file system includes various layers 2302a-2302c that are combined with one another to define a file system as known in the art of graph driver plugins for use with DOCKER containers. In the illustrated embodiment, only one layer 2302a is a read/write (R/W) layer and the remaining layers are read only layers. The R/W layer 2302a may be configured to mount a remote storage volume 2304 implemented by a storage node 106 according to the methods described herein (see, e.g., FIGS. 1 through 7). As described above, the storage volume 2304 may be a virtualized storage volume that is implemented without the container 1320 having data regarding a storage node 106 or device 108 on which the storage volume is actually stored.

In this manner, any persistent data written or changed by an application instance 1322 executed by the container 1320 will be performed on the remote storage volume 2304. Accordingly, when a snapshot of the container 1320 is made or the container is moved to a different location, the persistent data may be copied or recreated using the remote storage volume. No tracking of changes or other awareness of the persistent state of the application instance 1322 is required in order to achieve this functionality due to the use of the remote storage volume 2304 to implement the R/W layer 2302a.

Figure 24:
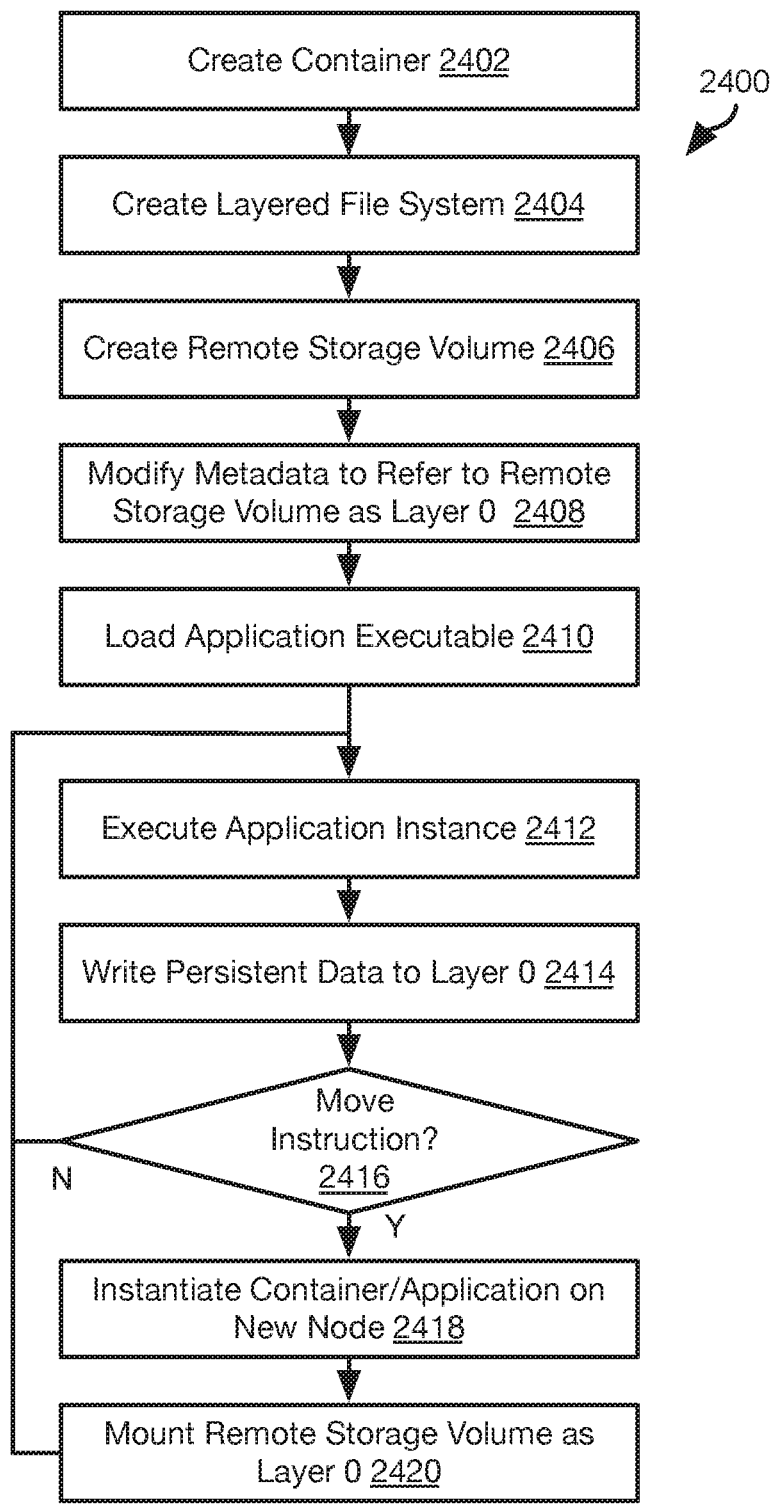
FIG. 24 is a process flow diagram of a method for creating and moving a portable application in accordance with an embodiment of the present invention.

FIG. 24 illustrates a method 2400 for using the architecture shown in FIG. 23. The method 2400 may be executed on a compute node 110 or hybrid node. The method 2400 may be executed as part of deployment of a bundled application 1300 in order to create and start a container 1320 on the compute node 110.

The method 2400 may include creating 2402 a container 1320, e.g. a DOCKER container, on the compute node 110 and creating 2404 a layered file system, such as by associating a graph driver plugin with the container 1320. A remote storage volume may also be created 2406, as described above with respect to FIGS. 1 through 7. Creating 2406 a storage volume may be performed by requesting allocation of a storage volume by the storage manager 102.

The method 2400 may include modifying 2408 metadata of the layered file system to refer to the remote storage volume as layer 0 (the R/W layer) of the layered file system.

An instance 1322 of an application executable may be loaded 2410 into the container 1320 as well. The application instance 1322 may be executed 2412, which may result in writing 2414 of persistent date data for the application instance 1322. These writes will be routed by the graph driver plugin to the remote storage volume and persistently stored therein.

If a move instruction is found 2416 to have been received, the method 2400 may include instantiating 2418 a new container at a new location, e.g., a different compute node. The container may be loaded with an instance 1322 of the executable application. The method 2400 may further include mounting 2420 the remote storage volume from step 2406 to the new container as layer 0 of the layered file system. This may include modifying the metadata for the new container as described above with respect step 2408. The state of the application instance 1322 may therefore be created using the data in the remote storage volume.

In some embodiments, the container to be moved may be frozen and copied to the new location, rather than creating a new container. In that case, a clone of the remote storage volume storing the persistent state data may be mounted to create a clone of the container.

The move instruction of step 2416 may be an instruction to move the application instance or be part of a process of cloning the application instance. In either case, execution of the move may be proceeded with creating a snapshot of the application as described above with respect to FIG. 16. Likewise, steps 2418 and 2420 may be executed as part of the rollback process of FIG. 17.

Figure 25:
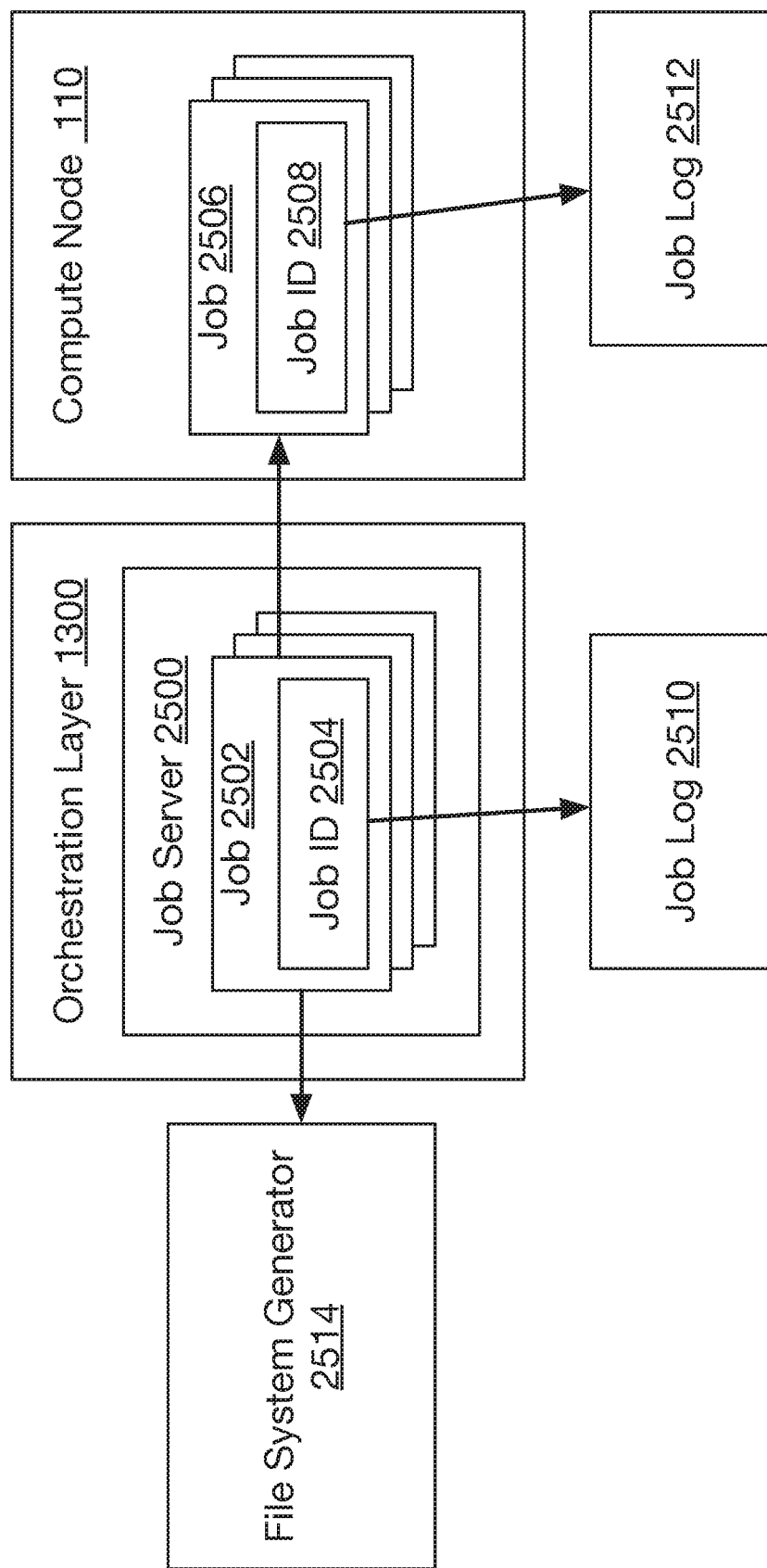
FIG. 25 is a schematic diagram of components for accessing job logs for a bundled application in accordance with an embodiment of the present invention.

Referring to FIG. 25, the creation, starting, and execution of containers 1320 of a bundled application 1300 may be implemented using a job server 2500. For example, a job 2502 for starting the bundled application 1300 may be started by the job server 2500 on the computing device implementing the orchestration layer 1300. The job 2502 may have a corresponding job identifier (ID) 2504. This job 2500 may invoke starting of one or more other jobs 2506 on one or more compute nodes 110, where the jobs 2506 each have corresponding job IDs 2508 and perform instantiation, configuration, loading of an instance 1322 of an application executable, and starting of the container 1320 and instance 1322. The jobs 2506 may perform any other tasks required to initiate execution of the instance 1322, including any tasks described herein as being part of initiating execution of the instance 1322.

Each job 2402, 2506 may write to a corresponding job log 2510 stored on the computing device executing the job 2502, 2506 or some other location, such as a remote storage volume.

The job IDs 2504, 2508 may be stored in memory and/or persistent storage by the orchestration layer 1300, reported to an external monitoring system, or otherwise be available for reading. For example, the orchestration layer 1300 may store a job hierarchy that maps a job ID 2504, 2508 to a host assigned by the job server 2500 to execute and to job ID 2508 of any other job spawned by that job corresponding to that job ID 2504, 2508.

The orchestration layer 1300 may execute or interact with a file system generator 2514 that facilitates visualization of the job logs 2510, 2512 while reducing corresponding network traffic and storage requirements. The file system generator 2514 may be a FUSE (File system in User Space) file system interface.

Figure 26:
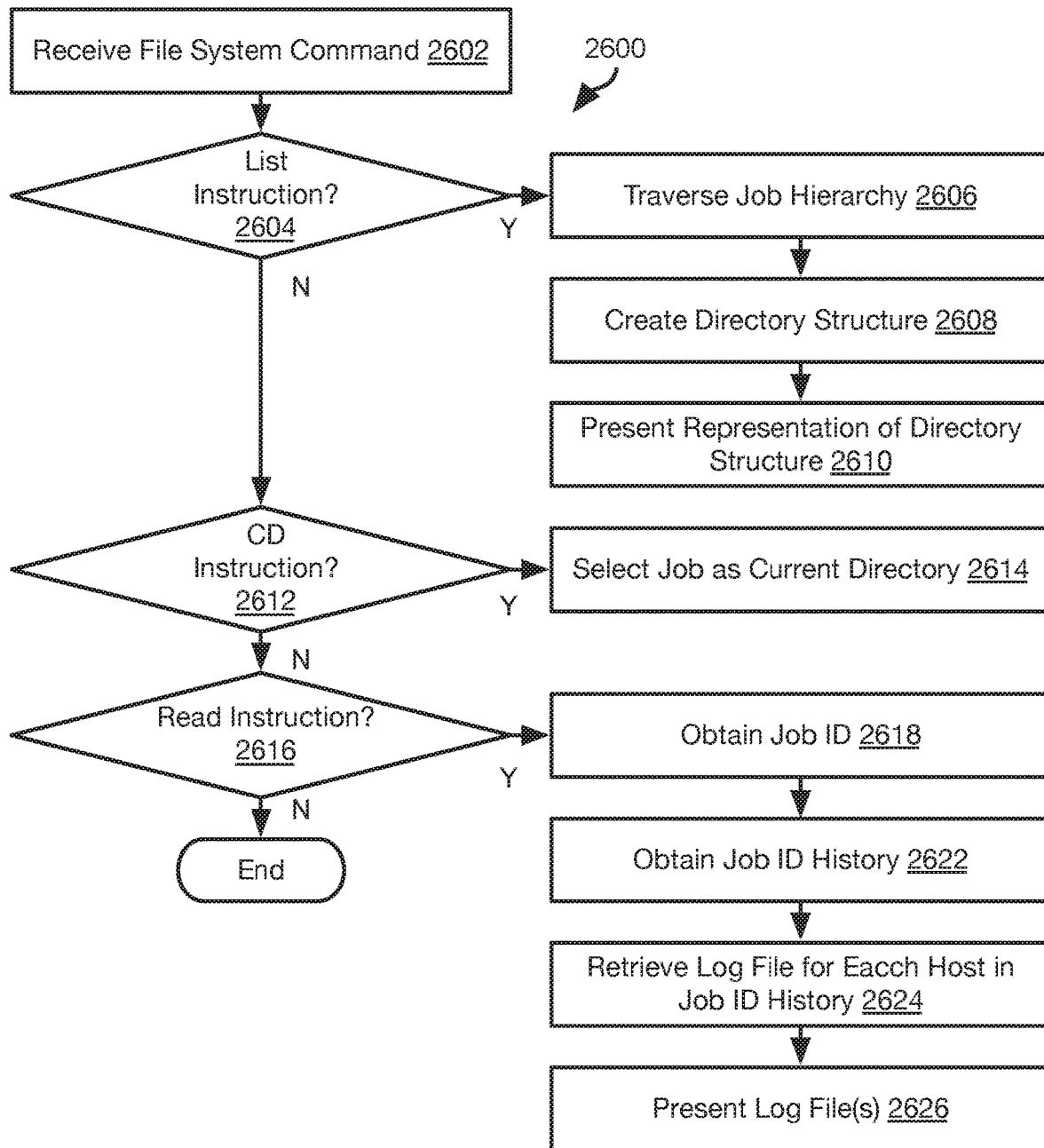
FIG. 26 is a process flow diagram of a method for accessing job logs for a bundled application in accordance with an embodiment of the present invention.

FIG. 26 illustrates an example method 2600 of operation of the file system generator 2514. The method 2600 may include receiving 2602 a file system command. File system commands may include any conventional file system command such as an instruction to list contents of a directory, change to a particular directory, read a file from a directory, or any other file system command known in the art. In this case, a "directory" may be a first job ID 2504, 2508 such that the contents of the directory are a job log for that job ID 2504, 2508 and any "sub-directories," which are one or more second job IDs 2508 of any jobs spawned by the job corresponding to the first job ID 2504, 2508.

If the file system command is found 2604 to be a list command, the method 2600 may include evaluating a directory referenced in the list command ("the subject directory"), which may be explicitly or implicitly set to a current directory that was last navigated to or a root directory by default. Where the current directory is explicitly given as an argument, the directory may be a job ID 2504, 2508.

The method 2600 may include traversing 2606 a job hierarchy below the subject directory. Accordingly, job IDs of jobs ("child jobs") spawned by the job corresponding to the subject directory may be obtained from the hierarchy. Likewise, a name of a job log for the subject directory may be obtained or generated. Where job logs are named according to a convention, the name of the job log may be obtained without actually performing a query to a host storing the job log for the subject directory.

The file system generator 2514 may then create 2608 a directory structure 2608 that lists the job IDs for the child jobs and the job log with the job IDs of child jobs being designated as sub-directories and the job log designated as a file.

The file system generator may then present 2610 a representation of the directory structure to a user, such as in the form of a user interface. For example, the representation may be presented in the form of a file system navigator wherein sub-directories and files are represented by selectable icons. The list instruction received at step 2604 may be received as selection of a sub-directory for viewing in such an interface.

In a similar manner, a change directory instruction may be received 2612. If so, a directory specified in the change directory instruction may be selected 2614 as the current directory. For example, upon selecting an icon representing a sub-directory (child job) of a directory, the contents of which are being displayed, the current directory may be set to that sub-directory. In some embodiments, in response to such a selection, the contents of the sub-directory may also be displayed as described above with respect to steps 2606-2610.

If a read instruction is found 2616 to be received, the method 2600 may include obtaining 2618 a job ID from the argument to the read instruction ("the subject job ID"). For example, where an icon representing a file is selected, the subject job ID corresponding to that file is obtained. The job hierarchy is then accessed to retrieve a host corresponding to the subject job ID. A query is then sent to that host requesting the job log corresponding to the subject job ID. In some embodiments, job logs are stored in a predictable location such as a directory/agent/jobID/, where agent is a directory corresponding to a software component executing a job on the host. Accordingly, the read request may reference this path when requesting the job log.

In some instances, a job corresponding to the subject job ID may be moved from one host to another, such as when a container is moved from one host to another due to moving or cloning of a bundled application. Accordingly, the job hierarchy may be updated for each move to list the new host for each job of the job hierarchy. The list of hosts for a particular job therefore provides a job ID history for that job. Accordingly, the method 2600 may include obtaining 2622 the job ID history for the subject job ID and retrieving 2624 the log file for the subject job ID from each host in the job ID history.

These log files may then be presented 2626 to the user, such as in a document viewer (VI, VIM, WORD, debugger, etc.).

Note that, in the above approach, log files remain on the host executing a job. Network traffic and centralized storage is not required to consolidate them for access. Instead, the directory structure of the job logs is simulated and job logs are only transmitted over the network when requested. This eliminates unnecessary traffic, particularly on start up when many actions are being taken and many entries are being made to job logs.

Figure 27:
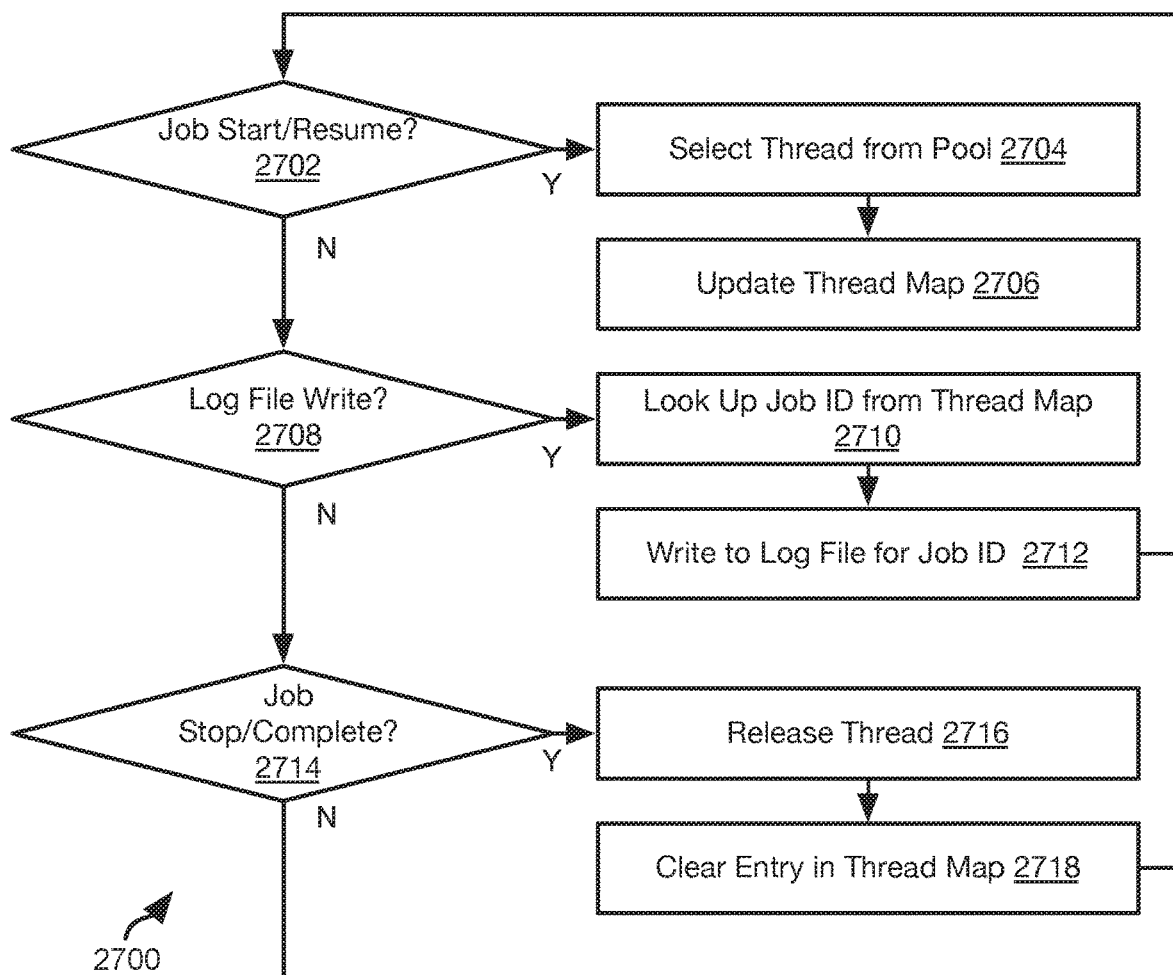
FIG. 27 is a process flow diagram of a method for writing to job logs for a bundled application in accordance with an embodiment of the present invention.

FIG. 27 illustrates a method 2700 for creating job logs on a host executing one or more jobs. The method 2700 may be executed by a software component executing on the host, such as an agent that coordinates with the orchestration layer 1300 to execute jobs initiated by the orchestration layer 1300.

The method 2700 may include detecting 2702 initiation of a new job or restarting of a new job. Jobs may be performed in stages and may have periods of inactivity while waiting for other jobs to complete. Accordingly, jobs may be temporarily paused or stopped and then restarted again.

In response to detecting initiation of a new job or restarting of an existing job, a thread is selected 2704 from a thread pool for the job and the thread then execution of the job proceeds within that thread. The method 2700 may further include updating 2706 a thread map to map an identifier of the selected thread to a job ID of the job detected at step 2702.

The method 2700 may further include detecting 2708 that a job executing within a thread is attempting to make a log write. If so, the identifier of the thread is used to look up 2712 the job ID being executed by that thread in the thread map. The log write is then made to the log file for that job ID.

If a job is found 2714 to be stopped or completed, the thread in which that job was executing is released 2716 back into the thread pool and the entry in the thread map for that thread is cleared 2718, i.e. the job ID of that job is removed.

Figure 28:
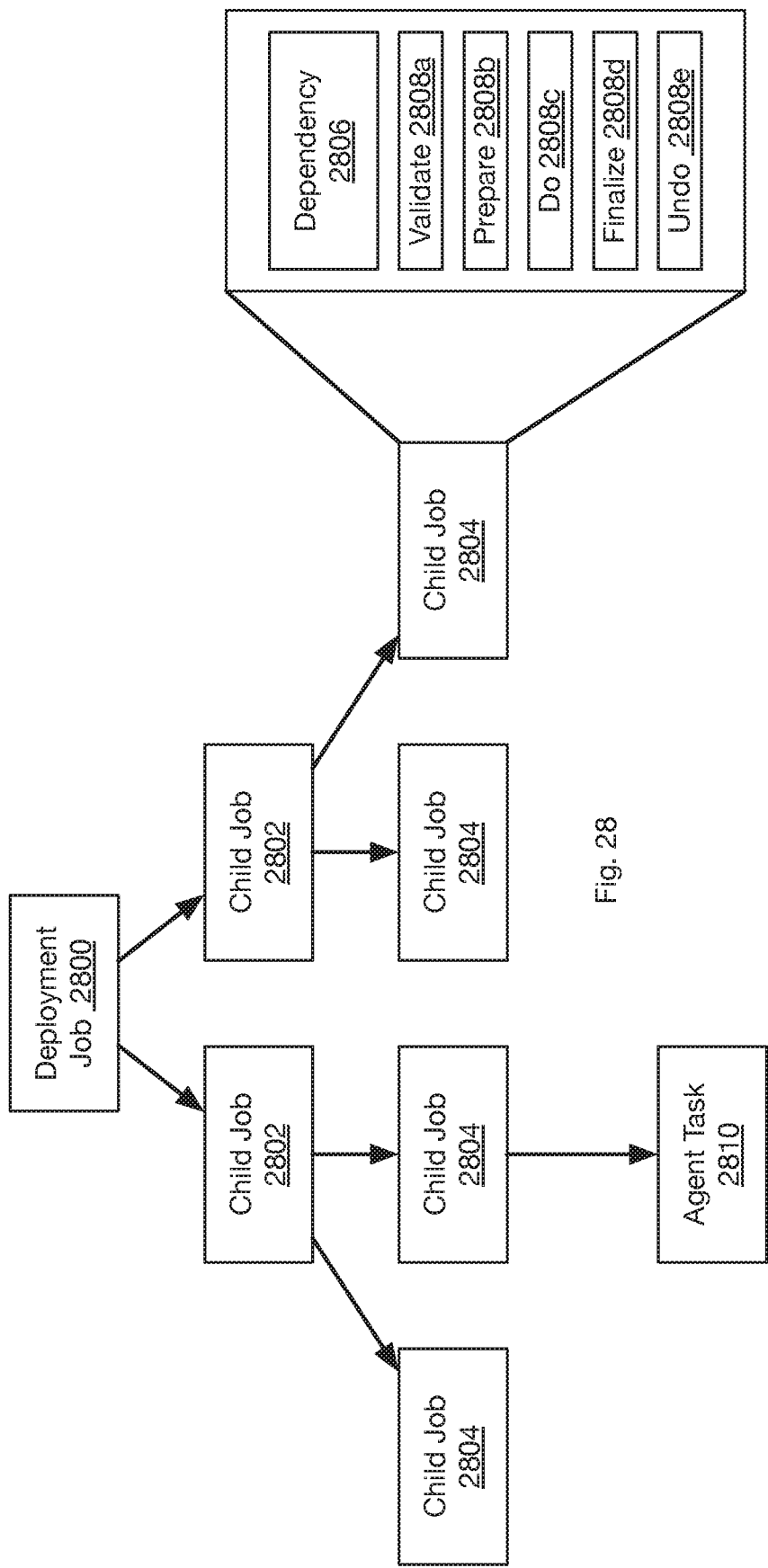
FIG. 28 is a diagram illustrating jobs for deploying a bundled application in accordance with an embodiment of the present invention.

FIG. 28 illustrates a job hierarchy that may be implemented by the orchestration layer 1300. The job hierarchy may have at its root a deployment job 2800. This job 2800 may ingest the bundled application 1302 and create child jobs 2802 to create roles 1312 of the bundled application 1302. The child jobs 2802 may themselves have child jobs 2804. For example, a child job 2802 to create a role 1312 may have child job 2804 to create the containers 1320 hosting applications instances 1322 for that role 1312.

Child jobs 2802, 2804 may implement, or have child jobs that implement, provisioning of computing resources (processor cores, memory) on compute nodes 110 or hybrid nodes, provision storage volumes on storage nodes 106 or hybrid nodes, or any other task ascribed herein to the orchestration layer.

The job hierarchy may have any number of layers. For example, a child job 2804 to create a container 1320 may include subtasks for creating the container 1320, loading an application instance 1322 into the container, starting the container 1320 and application instance 1322, and any other tasks for commencing operation of the container 1320 and application instance 1322.

Each child job 2802-2804 may include various attributes stored in a data structure representing the child jobs 2802, 2804 or otherwise associated with the child jobs 2802, 2804. For example, a child job 2802, 2804 may have a dependency 2806 with respect to another task. In particular, a first child jobs 2802, 2804 may be constrained by a developer to executed only after a second child job 2802, 2804 has completed.

A child job 2802, 2804 may also have various phases that are performed in order as part of completion of the child job 2802, 2804. In the illustrated embodiment, these tasks include a validate phase 2808*a*, prepare phase 2808*b*, a do phase 2808*c*, a finalize phase 2808*d*, and possibly an undo phase 2808*e*. The phases 2808*a*-2808*e* may be constrained to be executed in the order listed above in some embodiments. These phases may perform the following general functions:

The validate phase 2808*a* evaluates whether sufficient resources are available on a target node of the job to perform the corresponding local task on the target node, this may include storage, processor cores, memory, or other computing resource.

The prepare phase 2808*b* performs any preparatory actions specified by a developer prior to performing the job. These actions may be specified by the developer to be performed on the target node of the action or on some other impacted component of the distributed computing system. Where a job has child jobs, the prepare phase 2808*b* may invoke creation of these child jobs. For example, to create a bundled application 1302, a prepare phase 2808*b* may prepare roles 1312. To create a role 1312, the prepare phase 2808*b* may include preparing containers. To create a container 1320, the prepare phase 2808*b* may include preparing one or more storage volumes.

The do phase 2808*c* performs the job. The job may include creating a container on the target node, creating a storage volume on the target node, or any other action performed as part of deploying the bundled application 1302. Where a job includes invoking a task on a target node, the do phase 2808*c* may include performing this.

The finalize phase 2808*d* includes verifying that the job was completed successfully at the do phase 2808*c*. For example, one or more checks specified by a developer may be executed at step 2808*d*. Step 2808*d* may include sending, by the target node, a notification that the task corresponding to the job was completed successfully and receiving such a notification by the orchestration layer 1300. For example, a child job 2802, 2804 may initiate a synchronous channel with a component created according to the child job 2802, 2804 on the target node and evaluate its function. For a job with child jobs, the finalize phase 2808*c* may include verifying the successful completion of each of these child jobs.

The undo phase 2808*e* may be defined by a developer as logic for reversing the processing of the do phase 2808*c*, such as to remove a container, free a storage volume, or otherwise reverse the actions performed during the do phase 2808*c*. In this manner, rolling back of a task may be performed, such as where the finalize step 2808*d* indicates that a job did not complete successfully or a user determines that an action should be reversed.

The child jobs 2804, or descendants thereof in the job hierarchy, may invoke tasks 2810 on a target node according to the methods described below.

Figure 29:
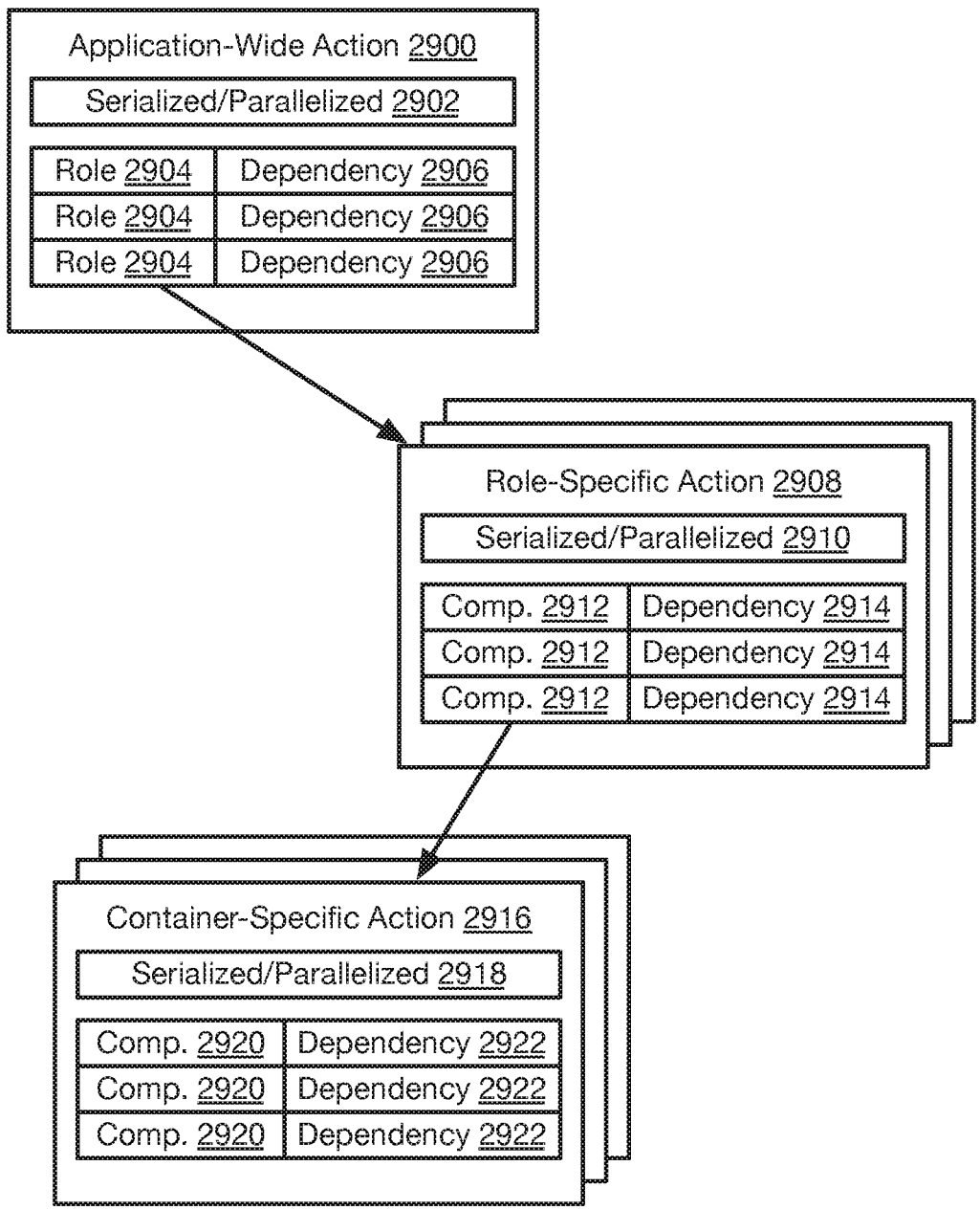
FIG. 29 is a diagram illustrating a dependency map for deploying a bundled application in accordance with an embodiment of the present invention.

Referring to FIG. 29, the dependency 2806 of a child job 2802, 2804 may be defined by the manifest 1304 that defines the instances of each role 1312 and the dependency between roles 1312. Dependency may be specified at various stages of deployment, such as creation of roles, e.g., instantiation of containers 1320 and loading of application instances 1322 into containers 1320, starting of roles 1312, e.g., commencement of execution of containers 1320, or the like. Other actions for which dependency may be specified may include stopping and restarting of roles 1312. The dependency may be specified by a developer of the bundled application 1302.

The manifest 1304 may have various forms as specified by a developer. For example, an order of creation and starting of roles may be specified explicitly, which is referred to herein as a "serialized" ordering. Accordingly, a manifest 1304 may include a listing of roles and an instruction to create them that is preceded by a "serialized" tag indicating that the roles are to be created in series. Where instructions are tagged as "serialized," each instruction may be permitted to execute only after a preceding instruction has completed execution.

In another form, instructions to take an action with respect to multiple roles may be specified to be "parallelized," such as by associating a corresponding tag with a listing of instructions. In this case, the instruction may be processed in parallel. Constraints on parallel execution of instructions may be specified by defining a dependency. For example, for roles RA and RB, a dependency may be specified as RA: depends_on(RB). In this case, an action (create, start, stop, restart, etc.) will not be performed for RA until this action is completed for RB.

A bundled application 1302 may include multiple roles 1312 and each role 1312 may itself include multiple components or multiple actions that are part of a given application-wide action (create, start, stop, restart, etc.). Creation of a container 1320 for a role may likewise include multiple components or multiple actions that are part of implementing a given application-wide action. A bundled application 1302 may likewise define sub-bundles of roles.

The manifest 1304 may therefore define a dependency map that defines a hierarchy wherein each node of the hierarchy specifies performance of an action (create, start, stop, restart) with respect to one or more entities as being serialized, parallelized, and possibly subject to dependency among entities. The type of ordering (serialized or parallelized) for a node may be the same as or different from the type of ordering for a parent node in the hierarchy.

Each entity may then itself be a specific executable instance or a sub node for which the action is to be performed subject to the specified ordering. An entity that is a sub-node may include the specification of an action with respect to multiple other entities as being serialized, parallelized, and possibly imposes dependency. A sub node may therefore include a specification of an order of execution (serialized, parallelized, subject to dependency) of an action for an entire application, a bundle of roles, a specific role, multiple instances of the same role, or components of an individual container.

For example, as shown in FIG. 29, the specification of an application-wide action 2900 (create, start, stop, restart, etc.) may include a parameter 2902 indicating whether the application-wide action 2900 is serialized or parallel. The specification 2900 may further include one or more roles 2904 for which the action will be taken. A role 2904 may define one or more dependencies 2906 with respect to one or more others of the roles 2904. Accordingly, the action will be taken with respect to each role 2904 either (a) in the order specified where the parameters 2902 indicates serialized execution or (b) in parallel subject to dependency constraints 2906.

Taking the action with respect to a role 2904 may include executing a role-specific action 2908. For example, where the action 2900 is creating the bundled application, the role specific action 2908 may be creating the role 2904.

The specification 2908 may include a parameters 2910 indicating that the action 2908 is serialized or parallel, which may be the same as or different from the parameter 2902. The specification 2908 may further include a listing of one or more components 2912. One or more components 2912 may include a dependency 2914 on one or more others of the components 2912. Components may include different executable components of an application instance, different instances of the same application (e.g. where a role includes multiple instances of the same application), containers, or a component of a container.

Where a component 2912 is a container, a container-specific action 2906 may be executed for that component 2912, which may include its own parameter 2912 specifying whether it is serialized or parallel and one or more components 2912 of the container for which the action is to be performed. As for other levels of the hierarchy, dependency 2912 between components of the container may be specified.

Accordingly, execution of a manifest 1304 or a hook 1310 defining an action may include traversing a hierarchy, such as that illustrated in FIG. 29. The application-wide specification 2902 may be executed, which may include executing the role-specific actions 2908 in the order specified or in parallel subject to the dependencies 2914. Executing role-specific actions 2908 may include executing the container-specific actions 2916 for each component 2912 subject to the dependencies 2914 or in series where specified.

Executing the container specific actions 2916 may include executing them for one or more components 2920 of the container in an order (serialized/parallelized) specified by a parameter 2918, possibly subject to one or more dependencies 2922 among components.

Figure 30:
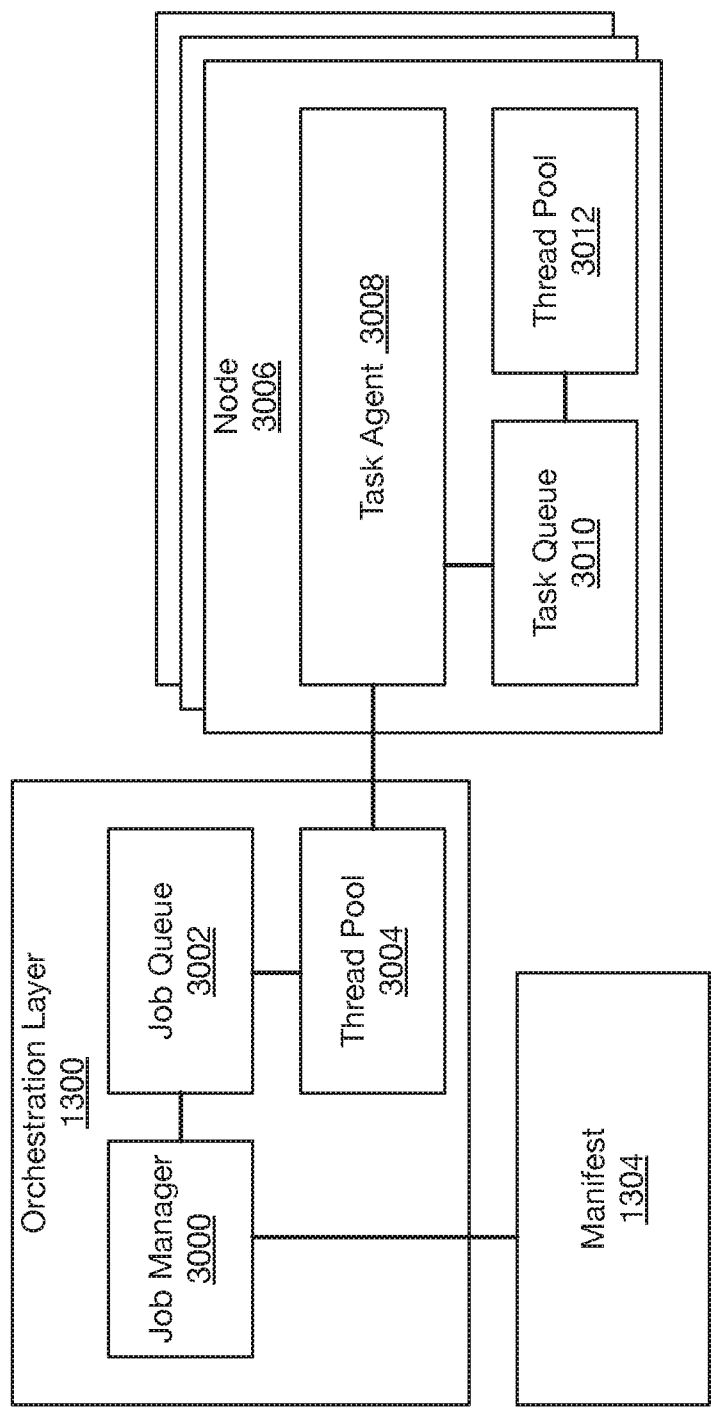
FIG. 30 is a diagram illustrating components for processing jobs to deploy a bundled application in accordance with an embodiment of the present invention.

Referring to FIG. 30, a job manager 3000 in the orchestration layer 1300 may ingest the manifest 1304 and create jobs 2800, 2802, 2804 corresponding to each action 2900, 2908, 2916 defined in the manifest 1304. The child jobs 2802, 2804 may be annotated with dependencies specified in the manifest 1304 or include a reference to the manifest 1304 such that dependencies for the tasks may be determined from its corresponding action 2900, 2908, 2916 in the dependency map.

These child jobs 2802, 2804 may be added to a job queue 3002. Jobs 2800, 2802, 2804 are selected from the queue 3002 and executed. For example, jobs may be selected from the queue 3002 and assigned to a thread from a thread pool 3004, which then executes a phase of the job 2800, 2802, 2804 assigned to the thread.

The jobs 2800, 2802, 2804 executed on the device hosting the orchestration layer 1300 ("the orchestration node") may invoke execution of one or more corresponding tasks 2810 on a target node 3006 (storage node 106, compute node 110, hybrid node). For example, a job executed by the orchestration layer may instruct the task agent 3008 to execute a task corresponding to the job on the node 3006. The task agent 3008 may add the task to its own local task queue 3010. Tasks from this queue 3010 may then be selected for execution and processed, such as within threads from a local thread pool 3012.

Figure 31:
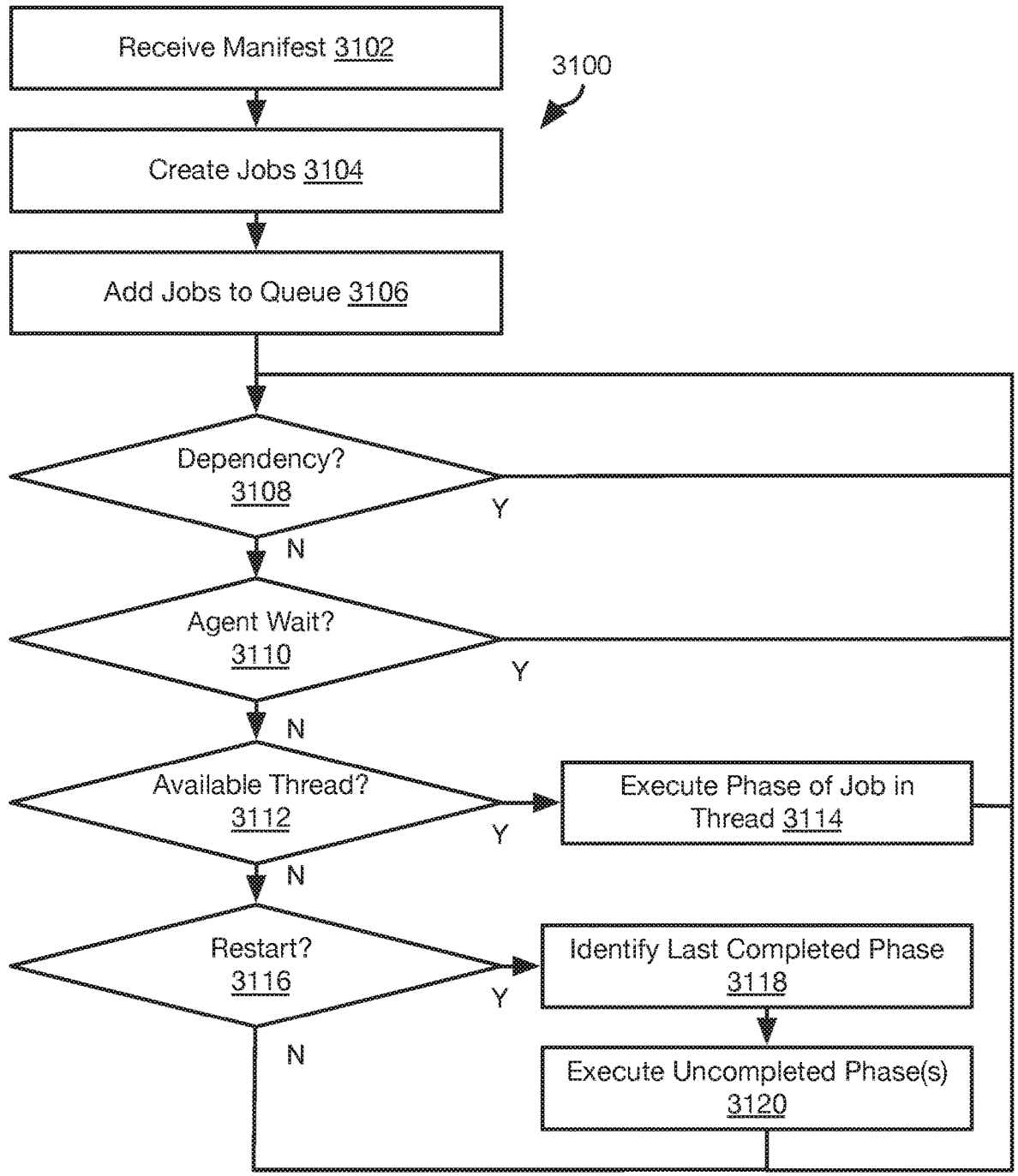
FIG. 31 is a process flow diagram of a method for processing jobs to deploy a bundled application in accordance with an embodiment of the present invention.

FIG. 31 illustrates a method 3100 that may be executed by the job manager 3000. The method 3000 may include receiving 3102 the manifest 1304 of a bundled application, including the dependency map (see FIG. 29). The method 3100 may include creating 3104 jobs 2800, 2802, 2804 for the various actions 2900, 2908, 2916 specified in the manifest 1304. In particular, a job including executable code for the phases 2808a-2808e of an action may be created. This executable code may be defined by the developer of the application. In other embodiments, only the do phase 2808c includes executable code specified by the developer. The remaining phases 2808a-2808b, 2808d-2808e may be implemented by default executable code that is not specific to the bundled application 1302. For example, parameters may be specified by the developer for the validate phase 2808a (i.e., the resource requirements for the task) but the executable code for performing validation is pre-defined by the orchestration layer 1300 independent of the bundled application 1302.

Note that some actions 2900, 2908, 2916 may be performed exclusively on a target node. Accordingly, jobs 2800, 2802, 2804 may be created by the orchestration layer 1300 only for actions at a certain level in the hierarchy. For example, jobs may be created 3104 relating to the creating the containers 1320 and application instances 1322 on one or more target nodes whereas sub-tasks for implementing this on the target nodes don't have corresponding tasks created and managed on the orchestration node.

Creating 3104 a job 2802, 2804 may include selecting a target node for the corresponding task 2810, i.e. the node on which a container, storage volume, or other software component is instantiated by the task 2810. Accordingly, this step may include evaluating any provisioning constraints 1314 of the bundled application 1302 that apply to the job 2802, 2804 and selecting the target node accordingly.

Step 3104 may include selecting a set of target nodes that satisfy the provisioning constraints 1314 for all roles 1312, containers, and storage volumes of the bundled application 1302. For a given entity (container, storage volume), the job to create that entity may be associated with an identifier for the target node from the set that meets the provisioning constraints 1314. The job may then be performed with respect to that target node according to the methods described herein.

The jobs 2800, 2802, 2804 may then be added 3106 to the job queue 3002. The jobs in the queue 3002 may then be processed according to the remaining steps of the method 3100 as the "subject job" until completed.

The subject job in the queue 3002 may be evaluated 3108 with respect to any dependencies 2806 of the subject job. In particular, whether any task on which the subject job depends has not been executed. If so, the subject job remains in the queue until the dependency 2806 is satisfied.

The method 3100 may further include evaluating 3110 whether the subject job is in the "agent wait" state. As described below with respect to FIG. 32, a job executing on the orchestration node may invoke performance of a local task by the task agent 3008 on a node selected for the subject job at step 3104. Following instructing the task agent 3008 to perform the local task, the subject job may enter the agent wait state. Accordingly, while the subject job is in the agent wait state, the subject job may remain in the queue 3002 and not be selected for processing by a thread from the thread pool 3004.

If the subject job is not found 3108 to have an unsatisfied dependency and is not found 3110 to be in the agent wait state, the method 3100 may include evaluating 3112 whether there is an available thread in the thread pool 3004. If so, a thread is selected from the thread pool 3004 and the subject job is then executed 3114 in the selected thread. This may be performed using the approach described below with respect to FIG. 32.

If the subject job is found 3116 to be restarted, the method 3100 may include identifying 3118 the last completed phase 2808a-2808e of the subject job. The method 3100 may then include executing 3120 any uncompleted phases 2808a-2808e of the subject job according to the method 3100.

In particular, it is possible that a crash on the orchestration node, target node, the job manager 3000, the task agent, or other component of the distributed computing system may interrupt completion of a job. Accordingly, as phases are completed, the status of the subject job may be recorded in a persistent manner, e.g., on a storage device mounted to the orchestration node or otherwise accessible by the orchestration node.

Accordingly, in the event of a crash of the orchestration node or the target node for the subject job, the job manager 3000 may read the persistent record for the jobs created at step 3104. Those tasks with remaining phases 2808a-2808e may then be added to the job queue 3002 and processed further according to the method 3100.

Figure 32:
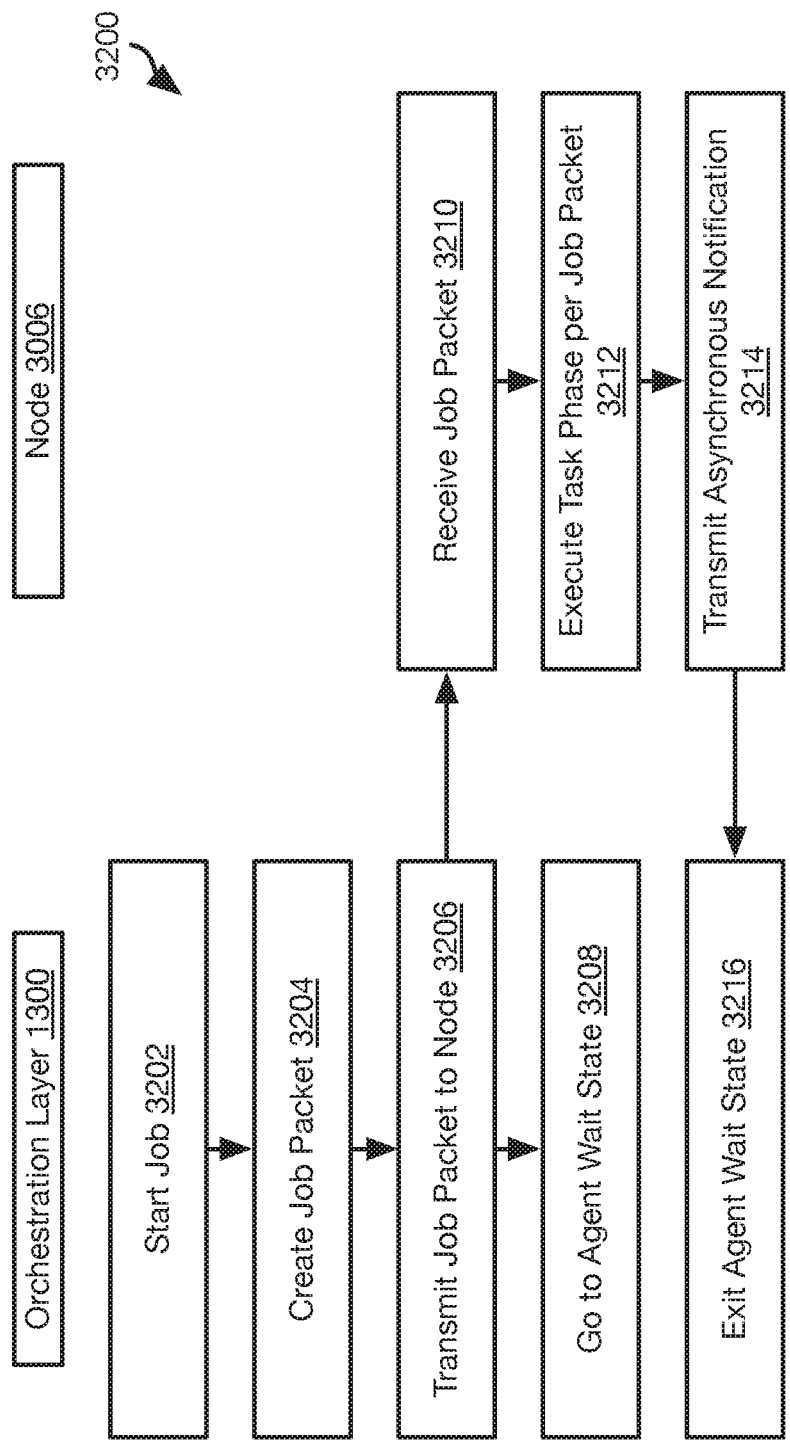
FIG. 32 is a process flow diagram of a method for processing tasks on a target node in accordance with an embodiment of the present invention.

FIG. 32 illustrates a method 3200 for processing the subject job once it is selected for processing by a thread from the thread pool 3004.

The method 3200 may include starting 3202, on the orchestration node, the subject job. The subject job then executes, which includes creating 3204 a job packet. The job packet may include sufficient information to enable the target node 3006 to execute the local task corresponding to the next unexecuted phase of the subject job. For example, where the subject job is to create a container 1320, the job packet may instruct the node 3006 to create a container. The executable code for creating a container may be present on the node 3006 such that the job packet refers to this executable. Likewise, for any phase 2808a-2808e of creating a container, the job packet may refer to an executable for performing that phase 2808a-2808e. The job packet may further include parameters controlling execution of the executable code in order to implement the subject job as defined in the bundled application 1302. In other embodiments, the job packet itself may include executable code that is executed on the target node 3006.

The job packet may then be transmitted 3206 to the node 3006 and the subject job may go 3208 into the agent wait state, such as once the node 3006 acknowledges receipt of the job packet or otherwise indicates that a task corresponding to the subject job has been started. Accordingly, the subject job may be returned to the job queue 3002 and the thread in which it was executing may be released to the thread pool 3004.

The node 3006, such as using the task agent 3008, receives 3210 the job packet and executes 3212 the phase as specified by the job packet. This may include adding a local task corresponding to the job packet to the task queue on the node 3006. When a thread is available, the local task may be selected from the queue and executed by a thread form the local thread pool 3012.

Note that each phase may itself spawn one or more other tasks. Accordingly, the local task may itself enter an agent wait state while these other tasks are completed. When these other tasks complete, the local task may then acknowledge completion either with or without first performing additional processing for the phase specified in the job packet.

Upon receiving notification of completion of the phase from the local task, the node 3060, such as by the task agent 3008, may transmit 3214 an asynchronous notification to the job manager 3000. The asynchronous notification may indicate a status of the phase indicated by the job packet, e.g., successfully completed, not completed, an error message, or any other data describing the outcome of execution of the phase.

This notification may be asynchronous in that the job manager 3000 does not need to coordinate receipt of the notification with execution of the subject job. As noted above, the subject job may be placed in the agent wait state and be returned to a queue. The job manager 3000 may therefore receive the notification and, in response to it, cause the subject job to exit 3216 the agent wait state. The job manager 3000 may then select the subject job to execute again once a thread is available, as described above with respect to the method 3100.

Alternatively, a synchronous notification may be used at step 3214 such that a communication channel between the subject job and the task agent 3008 or the component created on the target node according to the job packet. The notification may then be transmitted to the subject job through this channel. Accordingly, the subject job may be removed from the agent wait state by the orchestration layer 1300 in order to create the channel and receive the notification.

If the phase executed 3212 is the last phase, e.g., the finalize phase 2808e, the subject job is not returned to the job queue in some embodiments. The job manager 3000 may record the subject job as completed in that case. Any tasks that are dependent on the subject job may then be permitted to execute as described above with respect to the method 3100.

If the phase executed 3212 is the last phase of the subject job, the method 3200 may further include waking up a parent job 2802, 2804 in the job hierarchy. For example, upon spawning the subject job, the parent job may be removed from the agent wait state. Accordingly, upon completion of the subject job, the parent job may then execute another phase of the parent task, if any, or complete executing if no phases remain to be executed. In particular, the parent job may be processed in the same manner as the subject job according to the method 3100 in some embodiments.

Figure 33:
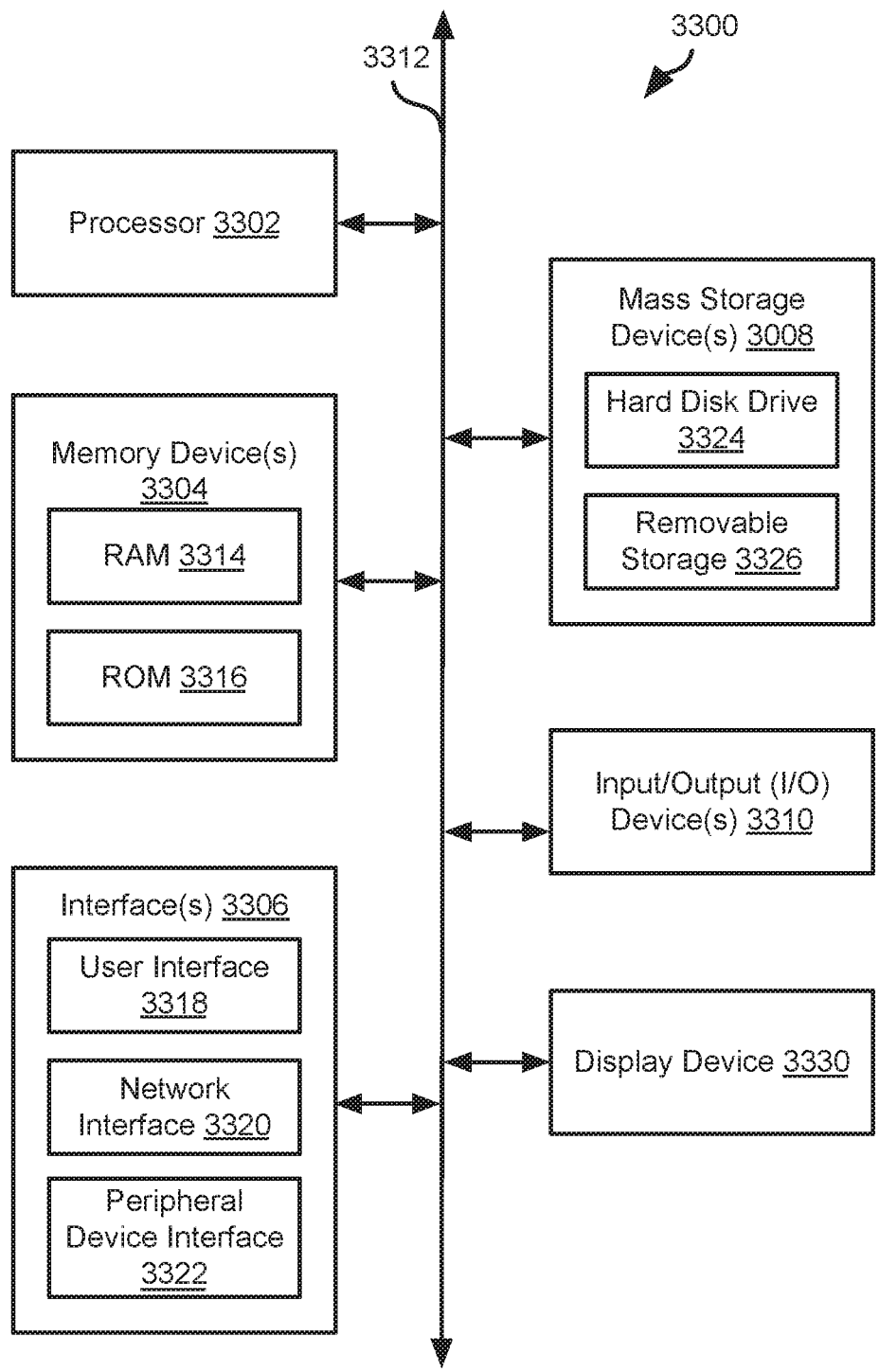
FIG. 33 is a schematic block diagram of an example computing device suitable for implementing methods in accordance with embodiments of the invention.

FIG. 33 is a block diagram illustrating an example computing device 3300. Computing device 3300 may be used to perform various procedures, such as those discussed herein. The storage manager 102, storage nodes 106, compute nodes 110, and hybrid nodes, may have some or all of the attributes of the computing device 3300.

Computing device 3300 includes one or more processor(s) 3302, one or more memory device(s) 3304, one or more interface(s) 3306, one or more mass storage device(s) 3308, one or more Input/output (I/O) device(s)

3310, and a display device 3330 all of which are coupled to a bus 3312. Processor(s) 3302 include one or more processors or controllers that execute instructions stored in memory device(s) 3304 and/or mass storage device(s) 3308. Processor(s) 3302 may also include various types of computer-readable media, such as cache memory.

Memory device(s) 3304 include various computer-readable media, such as volatile memory (e.g., random access memory (RAM) 3314) and/or nonvolatile memory (e.g., read-only memory (ROM) 3316). Memory device(s) 3304 may also include rewritable ROM, such as Flash memory.

Mass storage device(s) 3308 include various computer readable media, such as magnetic tapes, magnetic disks, optical disks, solid-state memory (e.g., Flash memory), and so forth. As shown in FIG. 33, a particular mass storage device is a hard disk drive 3324. Various drives may also be included in mass storage device(s) 3308 to enable reading from and/or writing to the various computer readable media. Mass storage device(s) 3308 include removable media 3326 and/or non-removable media.

I/O device(s) 3310 include various devices that allow data and/or other information to be input to or retrieved from computing device 3300. Example I/O device(s) 3310 include cursor control devices, keyboards, keypads, microphones, monitors or other display devices, speakers, printers, network interface cards, modems, lenses, CCDs or other image capture devices, and the like.

Display device 3330 includes any type of device capable of displaying information to one or more users of computing device 3300. Examples of display device 3330 include a monitor, display terminal, video projection device, and the like.

Interface(s) 3306 include various interfaces that allow computing device 3300 to interact with other systems, devices, or computing environments. Example interface(s) 3306 include any number of different network interfaces 3320, such as interfaces to local area networks (LANs), wide area networks (WANs), wireless networks, and the Internet. Other interface(s) include user interface 3318 and peripheral device interface 3322. The interface(s) 3306 may also include one or more peripheral interfaces such as interfaces for printers, pointing devices (mice, track pad, etc.), keyboards, and the like.

Bus 3312 allows processor(s) 3302, memory device(s) 3304, interface(s) 3306, mass storage device(s) 3308, I/O device(s) 3310, and display device 3330 to communicate with one another, as well as other devices or components coupled to bus 3312. Bus 3312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 3300, and are executed by processor(s) 3302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   providing a distributed computing system comprising a plurality of nodes, each node of the plurality of nodes comprising a computing device; and
   performing, by a first node of the plurality of nodes:
      receiving an application manifest for a bundled application;
      creating a plurality of jobs to create a plurality of application instances for the bundled application;
      processing each job of the plurality of jobs by (a) selecting a target node of the plurality of nodes for the each job and (b) transmitting an instruction to the target node to perform local processing corresponding to the each job; and
   adding, by the first node, the plurality of jobs to a queue;
   wherein each job of the plurality of jobs comprises a plurality of phases;
   wherein (b) comprises:
      (c) evaluating whether the each job is in a wait state;
      (d) when the each job is not in the wait state, select the each job from the queue and process the each job within a thread from a thread pool by transmitting an instruction to perform a current phase of the plurality of phases of the each job and placing the job in the wait state;
      (e) receiving notification of completion of the current phase;
      (f) in response to (e), removing the each job from the wait state; and
      (g) in response to (e) repeating (c) through (g) with a next phase of the plurality of phases of the each job as the current phase until all phases of the plurality of phases are completed.

2. The method of claim 1, wherein the local processing corresponding to the each job include creating a container on the target node, the container hosting an application instance of the plurality of application instances.

3. The method of claim 1, wherein each job of the plurality of jobs comprises a plurality of phases, wherein (b) comprises:
   (c) transmitting an instruction to the target node to perform a current phase of the plurality of phases of the each job;
   (d) waiting for completion of the current phase; and
   (e) repeating (c) and (d) with a next phase of the plurality of phases as the current phase until all phases of the plurality of phases are complete.

4. The method of claim 1, wherein the plurality of phases include:
   a validate phase that verifies a capacity of the target node to complete the each job; and
   a preparation phase that prepares the target node to complete the each job.

5. The method of claim 4, wherein the plurality of phases include:
   a do phase that performs a local function on the target node.

6. The method of claim 5, wherein the plurality of phases further include:
   a finalize phase that verifies completion of the local function.

7. The method of claim 1, wherein the application manifest further defines dependency among one or more jobs of the plurality of jobs, the method further comprising:
   performing (d) by the first node for the each job only after a second job on which the each job is dependent according to the application manifest has completed.

8. The method of claim 1, further comprising:
   detecting crashing of one of the first node and the target node for the each job; and
   in response to detecting crashing, performing (c) through (g) for uncompleted phases of the plurality of phases of the each job.

9. The method of claim 1, wherein the bundled application further includes one or more affinity rules and one or more anti-affinity rules, the method further comprising:
   selecting the target node for the plurality of jobs according to the one or more affinity rules and the one or more anti-affinity rules.

10. A system comprising:
    a distributed computing system comprising a plurality of nodes, each node of the plurality of nodes comprising a computing device;
    wherein a first node of the plurality of nodes is programmed to:
       receive an application manifest for a bundled application;
       create a plurality of jobs to create a plurality of application instances for the bundled application;
       process each job of the plurality of jobs by (a) selecting a target node of the plurality of nodes for the each job and (b) transmitting an instruction to the target node to perform local processing corresponding to the each job; and
    adding, by the first node, the plurality of jobs to a queue;
    wherein each job of the plurality of jobs comprises a plurality of phases;
    wherein (b) comprises:
       (c) evaluating whether the each job is in a wait state;
       (d) when the each job is not in the wait state, select the each job from the queue and process the each job within a thread from a thread pool by transmitting an instruction to perform a current phase of the plurality of phases of the each job and placing the job in the wait state;
       (e) receiving notification of completion of the current phase;
       (f) in response to (e), removing the each job from the wait state; and
       (g) in response to (e) repeating (c) through (g) with a next phase of the plurality of phases of the each job as the current phase until all phases of the plurality of phases are completed.

11. The system of claim 10, wherein the local processing corresponding to the each job include creating a container on the target node, the container hosting an application instance of the plurality of application instances.

12. The system of claim 10, wherein each job of the plurality of jobs comprises a plurality of phases, wherein the first node is programmed to perform (b) by:
    (c) transmitting an instruction to the target node to perform a current phase of the plurality of phases of the each job;
    (d) waiting for completion of the current phase; and
    (e) repeating (c) and (d) with a next phase of the plurality of phases as the current phase until all phases of the plurality of phases are complete.

13. The system of claim 10, wherein the plurality of phases include:
    a validate phase that verifies a capacity of the target node to complete the each job; and
    a preparation phase that prepares the target node to complete the each job.

14. The system of claim 13, wherein the plurality of phases include:
    a do phase that performs a local function on the target node.

15. The system of claim 14, wherein the plurality of phases further include:
    a finalize phase that verifies completion of the local function.

16. The system of claim 10, wherein the application manifest further defines dependency among one or more jobs of the plurality of jobs, the first node being further programmed to:
    perform (d) by the first node for the each job only after a second job on which the each job is dependent according to the application manifest has completed.

17. The system of claim 10, wherein the first node is further programmed to:
    detect crashing of one of the first node and the target node for the each job; and
    in response to detecting crashing, perform (c) through (g) for uncompleted phases of the plurality of phases of the each job.

18. The system of claim 10, wherein the bundled application further includes one or more affinity rules and one or more anti-affinity rules, the first node being further programmed to:
    select the target nodes for the plurality of jobs according to the one or more affinity rules and the one or more anti-affinity rules.

* * * * *